US012329174B2

(12) United States Patent
Killilea et al.

(10) Patent No.: US 12,329,174 B2
(45) Date of Patent: Jun. 17, 2025

(54) TREATMENTS, METHODS, AND KITS TO PROTECT AGRICULTURAL PRODUCTS FROM WILDFIRE SMOKE

(71) Applicant: COMESTAAG LLC, Osceola, WI (US)

(72) Inventors: T. Howard Killilea, North Oaks, MN (US); Andrew A. Demaster, Pacific Grove, CA (US)

(73) Assignee: COMESTAAG LLC, Osceola, WI (US)

( * ) Notice: Subject to any disclaimer, the term of this patent is extended or adjusted under 35 U.S.C. 154(b) by 0 days.

(21) Appl. No.: 18/428,512

(22) Filed: Jan. 31, 2024

(65) Prior Publication Data
US 2024/0225023 A1 Jul. 11, 2024

Related U.S. Application Data

(63) Continuation-in-part of application No. PCT/US2022/039010, filed on Aug. 1, 2022.

(60) Provisional application No. 63/309,637, filed on Feb. 13, 2022, provisional application No. 63/245,926, filed on Sep. 19, 2021, provisional application No. 63/228,158, filed on Aug. 1, 2021.

(51) Int. Cl.
A23B 7/16 (2006.01)
A23B 2/771 (2025.01)
A23B 2/788 (2025.01)
A23B 7/154 (2006.01)
A23B 7/157 (2006.01)
A23L 19/00 (2016.01)
C12G 1/00 (2019.01)

(52) U.S. Cl.
CPC ............... A23B 7/16 (2013.01); A23B 2/771 (2025.01); A23B 2/788 (2025.01); A23B 7/154 (2013.01); A23B 7/157 (2013.01); A23L 19/05 (2016.08); C12G 1/00 (2013.01)

(58) Field of Classification Search
CPC ... A23B 7/16; A23B 7/154; A23L 9/05; A23L 3/3544; A23L 3/358; C12G 1/00
USPC ........................................................ 426/305
See application file for complete search history.

(56) References Cited

U.S. PATENT DOCUMENTS

| 8,119,555 | B2 | 2/2012 | Banerjee |
| 8,563,470 | B2 | 10/2013 | Tam |
| 9,149,071 | B2 | 10/2015 | Kizer |
| 9,775,340 | B2 | 10/2017 | Piccolo |
| 9,907,336 | B2 | 3/2018 | Cashmore |
| 2004/0213755 | A1 | 10/2004 | Hochwalt |
| 2011/0123474 | A1 | 5/2011 | Jenkins |
| 2012/0021914 | A1 | 1/2012 | Berghaus |
| 2013/0096207 | A1 | 4/2013 | Yamashita |
| 2016/0354533 | A1 | 12/2016 | Hei |
| 2019/0141991 | A1 | 5/2019 | Emerson |
| 2019/0159446 | A1 | 5/2019 | Hernandez Aguilar |
| 2019/0364916 | A1 | 12/2019 | Jung |
| 2020/0178576 | A1 | 6/2020 | Behrens |
| 2021/0212321 | A1 | 7/2021 | Le |
| 2022/0159980 | A1 | 5/2022 | DeBlasio |
| 2022/0232824 | A1 | 7/2022 | Emerson |
| 2023/0232872 | A1 | 2/2023 | Hernandez |

FOREIGN PATENT DOCUMENTS

| CN | 110037025 B | 9/2020 | |
| WO | WO 2006077604 A1 | 7/2006 | |
| WO | WO-2010124131 A1 * | 10/2010 | ............... A01N 3/00 |
| WO | WO 2018050211 A1 | 3/2018 | |
| WO | WO 2019215645 A1 | 11/2019 | |
| WO | WO 2020/051238 A1 | 3/2020 | |
| WO | WO 2021/252403 A1 | 12/2021 | |
| WO | WO 2022/087632 A1 | 4/2022 | |

OTHER PUBLICATIONS

International Application Number PCT/US2022/039010, filed Aug. 1, 2022, International Search Report and Written Opinion, issued Nov. 18, 2022, 10 pages.
Mirabelli-Montan Ysadora, "Techniques for Mitigating the Effects of Smoke Taint While Maintaining Quality in Wine Production: A Review" Molecules, vol. 26, No. 6, Mar. 17, 2021, p. 1672, XP055974875, DOI: 10.3390/molecules26061672.
Database GNPD [online] Mintel; May 11, 2021 anonymous: "English Milk Tea", XP055974993, Database accession No. 8695569.
Database GNPD [online] Mintel; Mar. 2, 2020, anonymous: "Chocolate Covered Grapes", XP055974975, Database accession No. 7296461.
Botelho, "Effect of Cyclodextrins on Off-Odours Removal of Red Wine: An Innovative Approach", Ciência Téc. Vitiv. 26 (2) 63-68, 2011.
Culbert, "Development and Utilization of a Model System to Evaluate the Potential of Surface Coatings for Protecting Grapes from Volatile Phenols Implicated in Smoke Taint", Molecules, Aug. 27, 2021, 26, 5197. https://doi.org/10.3390/molecules26175197, 17 pages.
Dang, "Removal of Volatile Phenols from Wine Using Crosslinked Cyclodextrin Polymers", Molecules, Feb. 18, 2020, 25, 910; doi:10. 3390/molecules25040910, 14 pages.
Favell, "Development and Evaluation of a Vineyard-Based Strategy to Mitigate Smoke-Taint in Wine Grapes", J. Agric. Food Chem., 2019, 67, 14137-14142.

(Continued)

Primary Examiner — Subbalakshmi Prakash
(74) Attorney, Agent, or Firm — Mueting Raasch Group

(57) ABSTRACT

Methods, kits, and treatment compositions for treating agricultural products to reduce or preventing wildfire smoke taint or other types of taint, including treated agricultural products, are provided. One or more treatment compositions effective in reducing or preventing wildfire smoke taint are preferably applied to agricultural products such as, for example, wine grapes prior to and/or during wildfire smoke exposure.

26 Claims, No Drawings

(56) References Cited

OTHER PUBLICATIONS

Keshvardoostchokami, "Adsorption of phenol on environmentally friendly Fe3O4/chitosan/zeolitic imidazolate framework-8 nanocomposite: Optimization by experimental design methodology", *Journal of Molecular Liquids*, 323 (2021) 115064 ,10 pages.
Oberholster, "What We Know About Smoke Taint and Tools for Amelioration", *UC Davis Viticulture and Enology*, Mar. 28, 2019, 39 pages.
"Powder Activated Carbon", CalgonCarbon, Sales Specification Sheet, 11720—Mar. 15, 2022, calgoncarbon.com.
Szeto, "Uptake and Glycosylation of Smoke-Derived Volatile Phenols by Cabernet Sauvignon Grapes and Their Subsequent Fate during Winemaking", *Molecules*, Aug. 14, 2020, 25, 3720; doi:10.3390/molecules25163720, 17 pages.
"WPC Powder Activated Carbon", CalgonCarbon, Data Sheet, 2015, calgoncarbon.com.
Mintel, "Chocolate Covered Grapes" Product Details, http://www.gnpd.com, XP55974993AI.
Mintel, "English Milk Tea" Product Details, http://www.gnpd.com, XP55974975AI.

\* cited by examiner

TREATMENTS, METHODS, AND KITS TO PROTECT AGRICULTURAL PRODUCTS FROM WILDFIRE SMOKE

CROSS-REFERENCE TO RELATED APPLICATIONS

The present application is a continuation-in-part application of International Application Serial Number PCT/US2022/039010 filed on Aug. 1, 2022 and claims priority to U.S. Provisional Application Ser. No. 63/228,158, filed Aug. 1, 2021, U.S. Provisional Application Ser. No. 63/245,926, filed Sep. 19, 2021, and U.S. Provisional Application Ser. No. 63/309,637, filed Feb. 13, 2022, each of which are incorporated by reference in their entireties.

BACKGROUND

Wildfire smoke taint of wine grapes has been increasingly problematic in wine-growing regions around the world. Wine made from grapes negatively impacted by smoke is generally disfavored by consumers, and is often described as tasting like an "ashtray" and having undesirable sensory aspects like "medicinal", "metallic", "bitter", "smoky", "burnt", or "ashy" and/or having a negative mouthfeel. The off-flavors and/or off-aromas also often don't manifest fully, or at all, until after fermentation and into the wine aging process.

Peak wildfire season often coincides with the wine grape harvest season and the final ripening period leading up to harvest, during which time the wine grapes are most susceptible to smoke taint problems. Due to analytical testing resources typically being overwhelmed during the limited time period during which the grapes must be harvested and processed, oftentimes smoke taint testing is not possible and wine grape crops having any smoke exposure are left to rot on the vine. The economic losses associated with wildfire smoke exposure to agricultural products is significant. By way of example, during the 2020 harvest season in California alone, it has been estimated that between 165,000 and 325,000 tons of California wine grapes went unharvested due to actual or perceived concerns of quality loss due to wildfire smoke exposure. Moreover, according to one estimate, issues associated with wildfires cost the U.S. wine industry $3.7 billion U.S. dollars in 2020.

Various strategies have been attempted to try to mitigate wine taint. Blending smoke tainted wine with untainted wine is one such strategy. A problem with this approach, however, is that a very large excess of untainted wine is typically required to produce acceptable blends. For example, certain blended wines made from as low as about 10% of smoke tainted wine have been perceived negatively by customers. Attempts have also been made to remove problematic smoke-derived compounds from tainted wines. Such approaches, however, have not been sufficiently selective for such smoke-derived compounds present in the wine and have also tended to remove desirable flavor compounds, thereby negatively impacting the wine's flavor profile and perceived quality.

SUMMARY

The present disclosure provides treatment compositions for blocking and/or sequestering problematic compounds, particularly treatment compositions for preventing or minimizing wildfire smoke taint of agricultural products such as wine grapes, hopes, and other edible agricultural products susceptible to wildfire smoke taint. In preferred embodiments, the one or more treatment composition is capable of forming a surface-deposited treatment on agricultural products susceptible to wildfire smoke taint, and particularly wine grapes, which is effective in reducing or preventing smoke taint of the agricultural product when exposed to wildfire smoke. The present disclosure also provides method, kits, treated agricultural products, and other products relating thereto. The present disclosure also provides other end uses for the compositions other than treating agricultural products to protect against wildfire smoke.

The treatment compositions of the present disclosure preferably include a binder component, which may be organic, inorganic, or a combination thereof. The binder component preferably includes one or more organic or inorganic sorbent materials, preferably one or more organic or inorganic adsorbent materials. In preferred embodiments, the binder component includes a cyclic oligosaccharide, with cyclodextrins being preferred such cyclic oligosaccharides; a zeolite; a clay mineral; a diatomaceous earth; activated carbon; any other suitable porous sorbent material, preferably porous adsorbent particles, more preferably microporous adsorbent particles; or a combination thereof. The binder component preferably is capable of sequestering, under ambient conditions, one or more volatile aromatic compounds selected from guaiacol, 4-methyl guaiacol, 4-ethyl guaiacol, m-cresol, o-cresol, eugenol, thymol, syringol, 4-ethyl phenol, or thiophenol, and preferably at least guaiacol. The treatment compositions preferably include an organic component, which may function, for example, as a coating binder and/or at least some of the binding component. In preferred embodiments, the treatment composition is a liquid treatment composition, preferably an aqueous treatment composition.

In one embodiment, a method of treating an edible agricultural product to reduce or prevent smoke taint from wildfire smoke is provided. The method includes applying one or more (e.g., one, two, or three) treatment composition to an exterior surface of the agricultural product to form a surface-deposited treatment, preferably prior to the agricultural product contacting wildfire smoke. After the wildfire smoke taint risk has subsided, or after the agricultural product has been harvested, the method optionally includes washing the treated agricultural product and/or otherwise removing residual surface-deposited treatment.

In one embodiment, a product is provided that comprises an edible agricultural product, wherein an exterior surface of the agricultural product has one or more surface-deposited treatment present thereon. The surface-deposited treatment is optionally and preferably hardened. The surface-deposited treatment is preferably: (i) formed from the application of one or more (e.g., one, two, or three) treatment composition and (ii) effective in reducing or preventing smoke taint of the edible agricultural product upon exposure to wildfire smoke.

In one embodiment, a method is provided that includes providing one or more treatment composition or one or more concentrate for making the one or more treatment composition. The method preferably further includes causing the one or more treatment composition to be applied to an agricultural product, more preferably prior to the agricultural product contacting wildfire smoke.

In one embodiment, a method of processing wine grapes to make wine is provided. The method includes providing treated wine grapes, wherein the wine grapes are preferably treated with any of the treatment compositions disclosed herein. The treated wine grapes are optionally processed (e.g., washed) to remove at least some, or substantially all, or all, of the surface-deposited treatment. The wine grapes are optionally dried and then processed to make wine.

In one embodiment, a kit is provided. The kit preferably includes one or more concentrate for combining (e.g., diluting) with water to form one or more treatment composition. The one or more treatment composition may alternatively be provided in "ready-to-use" form with no dilution necessary. The kit preferably includes instructions for preparing the one or more treatment composition and applying the one or more treatment compositions to wine grapes, hops, or other edible agricultural product susceptible to wildfire smoke taint.

In one embodiment a method of reducing or preventing wildfire smoke taint of edible agricultural products that have not yet been harvested is provided. The method includes spraying (more preferably fogging, atomizing, and/or aerosolizing) one or more liquid treatment composition in the vicinity of the non-harvested edible agricultural products in the presence of wildfire smoke. The method further includes optionally continuing to spray (and preferably fogging, atomizing, and/or aerosolizing) the one or more liquid treatment composition in the vicinity of the non-harvested edible agricultural products until the wildfire smoke has diminished or is no longer present. After the wildfire smoke taint risk has subsided, or after the agricultural product has been harvested, the method optionally includes washing the treated agricultural product and/or otherwise removing residual surface-deposited treatment.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other claims are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the terms "at least one" and "one or more".

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints and all subranges (e.g., 1 to 5 includes 1, 1.5, 2, 2.75, 3, 3.80, 4, 5, etc. as well as 2 to 5, 1 to 4, 2 to 4, 1.5 to 3, etc.).

As used herein, the terms "room temperature" or "ambient temperature" refers to a temperature of 20° C. to 25° C. If humidity can affect a given parameter measured at room temperature or ambient temperature and a relative humidity is needed, then a relative humidity of 50% should be used, unless indicated otherwise herein.

The phrases "free of", "does not include", "does not include any", "does not contain" and the like used herein are not intended to preclude the presence of trace amounts (e.g., parts-per-billion (ppb) or parts-per-trillion (ppt) levels) of the pertinent structure or compound that may be unintentionally present, for example, as environmental contaminants.

As used herein, the terms "harden" and "hardened" are used in their broadest contexts as understood by persons of skill in the art. The terms are not intended to require any particular level of rigidity, firmness, scratch resistance, crosslinking, or the like. Rather, the terms are used for convenience to allow for efficient differentiation between liquid treatment compositions (e.g., liquid coating compositions) and surface-deposited treatments (e.g., coatings) subsequently formed from the liquid coating compositions in which all or substantially all of a liquid carrier is no longer present in the composition (e.g., due to evaporation or other drying or curing).

As used herein, parts-per-million ("ppm") is used merely for convenience as an alternative means to express small weight percentages. An analytical methodology to determine ppm is not required. Rather, a ppm value for an ingredient in a composition can be determined based on the starting ingredients used to make the composition.

As used herein, the terms "spray" or "sprayed" are used broadly and encompass, for example, misting and fogging, as well as droplets with linear or substantially linear paths of travel.

Unless indicated otherwise, the term "carboxyl-functional compound" as used herein refers to compounds having one or more carboxyl groups (—COOH), one or more salt groups formed from carboxyl groups (typically base-neutralized carboxyl groups), or a combination thereof.

Unless indicated otherwise, the term "hydroxyl-functional compound" as used herein refers to compounds having one or more hydroxyl groups (—OH), one or more salt groups formed from hydroxyl groups (typically base-neutralized acidic hydroxyl groups, e.g., on ascorbic acid), or a combination thereof.

The terms "treatment composition" and "coating composition" as used herein do not encompass the application of water alone to a substrate to be treated or coated. By way of example, dipping an agricultural product into water or well water does not constitute coating the agricultural product or applying a treatment composition to the agricultural product. However, by way of further example, an aqueous composition constituting 99% by weight water and 1% by weight of a cyclodextrin constitutes a treatment and a coating composition. The term "treatment composition" is broader than the term "coating composition", with a coating composition being an example of a treatment composition.

The term "aqueous" is broadly used herein to encompass a substance, solution or system having water as a medium, including, for example, substances, solutions or systems that are water-soluble, water-dispersible, and emulsions, including "oil-in-water" and "water-in-oil" microemulsions, nanoemulsions, microdispersions, nanodispersions, and the like.

The term "wildfire smoke" is used broadly herein and encompasses not only smoke resulting from a wildfire, but also airborne ash, tar, liquid droplets, and any other airborne particulates resulting from wildfire that can contact agricultural products.

The term "binding component" refers to the ability of a component to sequester (or "bind"), one or more compounds of wildfire smoke that can lead to smoke taint and is not intended to require that the component be capable of functioning as a binder (or "film former") of a coating composition, although in some embodiments the binding component may be capable of such function. The binding component may bind the one or more compounds through one or more covalent or non-covalent interactions. Examples of non-covalent interactions include ionic interactions, hydrogen bonding, dipole-dipole interactions, van der Waals interactions, and hydrophobic interactions. Although carbon dioxide and water are products of combustion, the ability of a compound or material to sequester one or more compounds present in wildfire smoke is not intended to refer to the ability of a compound or material to sequester water, carbon monoxide, or carbon dioxide.

The term "carbonaceous" means primarily containing elemental carbon—that is greater than 50 weight percent. Activated carbon and carbon black are examples of carbonaceous materials. By way of further example, oligomers and polymers are not carbonaceous materials.

As used herein, the term "chemically-different" in the context of a chemically-different composition (or part) refers to a composition that (i) includes a different concentration (e.g., other than a trivial concentration difference due, for example, to unavoidable/unintentional concentration variations that do not impact coating outcomes) of one or more ingredients relative to a comparison composition, (ii) includes one or more ingredients not present in the comparison composition and/or (iii) does not include one or more ingredients present in the comparison composition.

The terms "total solids" and "total non-volatiles" and the like are used interchangeably herein. As will be appreciated by persons having ordinary skill in the art, the amount of total solids in a component or composition may be calculated based on the amount of starting material(s) employed and the amount of solids in the starting material(s). The amount of solids (or non-volatiles) in starting materials is typically provided by the manufacturer and/or supplier of the material in, for example, a technical data sheet (TDS). If for some reason a reliable calculation is not possible, standard test methods for determining solids and volatile content are well known in the art. An example of such a standard test method is ASTM D2369-20. Care should be exercised in the event a composition includes a sensitive material that chars in the test conditions (e.g., certain sensitive biopolymers). In such situations, appropriate adjustments may need to be made such as, for example, use of a modified temperature to remove volatiles that avoids charring.

The term "Blockchain" is a public ledger of all transactions of a blockchain. One or more computing devices may comprise a blockchain network, which may be configured to process and record transactions as part of a block in the blockchain. Once a block is completed, the block is added to the blockchain, and the transaction record thereby updated. In many instances, the blockchain may be a ledger of transactions in chronological order or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Particle size may be determined by laser diffraction particle size analysis. An example of suitable equipment for laser diffraction particle size analysis is the Beckman Coulter LS 230 Laser Diffraction Particle Size Analyzer or equivalent, calibrated as recommended by the manufacturer.

The D-values—D50, D90, D95, and D99—are the particle sizes which divide a sample's volume into a specified percentage when the particles are arranged on an ascending particle size basis. For example, for particle size distributions the median is called the D50 (or ×50 when following certain ISO guidelines). The D50 is the particle size in microns that splits the distribution with half above and half below this diameter. The Dv50 (or Dv0.5) is the median for a volume distribution. The D90 describes the particle size where ninety percent of the distribution has a smaller particle size and ten percent has a larger particle size. The D95 describes the particle size where ninety five percent of the distribution has a smaller particle size and five percent has a larger particle size. The D99 describes the particle size where ninety nine percent of the distribution has a smaller particle size and one percent has a larger particle size. Unless specified otherwise herein D50, D90, D95, and D99 refer to $D_v50$, $D_v90$, $D_v95$ and $D_v99$, respectively. The D-values specified herein may be determined by laser diffraction particle size analysis.

In some embodiments, a material may qualify as one or more different recited materials of an embodiment. For example, a compound may be (i) both an antimicrobial agent and an organic component, (ii) both a binding component and an organic component, and so forth. Unless indicated otherwise herein, such materials should be considered in determining the concentrations or amounts of any material categories in which they fit under. Thus, for example, a composition that includes 0.25% by weight ("wt-%") of cyclodextrin is considered to be a composition that includes 0.25 wt-% of an organic component and 0.25 wt-% of a binding component, even if such composition does not include any other binding component or organic component. The discussions herein should be understood to explicitly disclose both "over-lapping" embodiments, e.g., as described above in which an ingredient can fulfill two or more material categories and "non-overlapping" embodiments in which each recited ingredient is fulfilled by a separate ingredient (e.g., where a composition indicated to include both a binding component and an organic component includes at least two separate such ingredients—as opposed to merely one ingredient that fulfills both material categories).

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the embodiments, and the equivalents of those structures. Any of the elements that are positively recited in this specification as alternatives may be explicitly included in the embodiments or excluded from the embodiments, in any combination as desired. Although various theories and possible mechanisms may have been discussed herein, in no event should such discussions serve to limit the claimable subject matter.

DETAILED DESCRIPTION

The treatment compositions of the present disclosure preferably reduce or eliminate the occurrence of quality issues (e.g., organoleptic taint issues) for agricultural products associated with exposure to wildfire smoke. Typically, the one or more treatment compositions are applied one or more times to the agricultural product prior to harvest. It is contemplated, however, that the one or more treatment compositions may additionally, or alternatively, be applied after harvest of the agricultural product. For example, such treatment may be useful if wildfire smoke exposure is expected to occur prior to the harvested agricultural product being processed or shipped out of the wildfire smoke exposure zone.

The treatment compositions of the present disclosure may be used to treat any agricultural products susceptible to smoke-mediated damage or taint. The treatment compositions may have utility in treating a wide variety of agricultural products, including fruits, and especially grapes, and hops (e.g., hops for use in brewing beer). Due to the organoleptic sensitivity of wines, the treatment compositions of the present disclosure are especially useful for treating wine grapes, and particularly prior to harvest and prior to exposure to wildfire smoke. Grapes are most sensitive to smoke taint when wildfire smoke exposure occurs after the onset of veraison, and especially during the period between seven days post veraison and harvest. Depending upon the timing of (i) wildfire events, (ii) wildfire smoke exposure risk, (iii) weather events (e.g., rain), and/or (iv) the application of other agricultural treatments, it may be necessary to apply the one or more treatments of the present disclosure multiple times spaced in time (e.g., days, weeks, and/or months apart) to ensure the agricultural product remains sufficiently protected from wildfire smoke taint.

The treatment compositions of the present disclosure may also have utility in addressing real and/or perceived organoleptic concerns relating to a first agricultural product being grown in close proximity to a second agricultural product that is different. For example, increasingly *cannabis* (e.g., industrial hemp or medicinal and/or recreational marijuana) is being grown in close proximity to wine grapes and other edible agricultural products. Vineyards, bulk purchasers of wine grapes, and wineries have expressed concerns that volatile organic compounds (e.g., terpenes and the like) present in *cannabis* could migrate into the wine grapes and negatively impact the organoleptic properties of downstream wine. Similar concerns have also occurred with *eucalyptus* trees grown in close proximity to wine grapes. Eucalyptol, a volatile organic compound present in *eucalyptus* trees, has been found above the sensory detections thresholds in some red wines grown in close proximity to *eucalyptus* trees. Some wineries have also reported that strong airborne aromas associated with nearby *cannabis* cultivation locations has negatively impacted customers' wine tasting room experiences. To address such real or perceived taint concerns, treatment compositions of the present disclosure may be applied to one or both of (i) an agricultural product for which organoleptic taint is a concern (e.g., wine grapes) or (ii) an agricultural crop grown nearby that may be an emitter of potentially problematic volatile organic compounds such as, e.g., aromatic compounds (e.g., *cannabis*, *eucalyptus*, lavender, and the like).

The compositions of the present disclosure can be delivered onto the surface of the agricultural products to be treated (preferably coated) in any suitable form. Typically, however, the treatment compositions will be liquid compositions, and more typically liquid coating compositions that include a sufficient amount of solids (i.e., non-volatiles) to form, upon drying, a surface-deposited coating on treated agricultural product surfaces. Preferably, the surface-deposited treatment is an adherent surface-deposited protective treatment, which is preferably a continuous or substantially continuous adherent coating on the exterior of the agricultural product. It is contemplated, however, that one or more such treatments may additionally or alternatively be applied in solid form (e.g., as sprayable powder). Any suitable application technique may be used to deliver the treatment composition onto agricultural products. For example, the treatment may be selectively applied to agricultural product (e.g., selective targeting of wine grape clusters as compared to foliage) or broadcast applied. Spraying is a preferred application technique, with examples of suitable equipment for spraying including airblast or boom sprayers. Additionally, or alternatively, sprayers that have been plumbed into an agricultural field (e.g., an orchard or vineyard) may be used. In some embodiments, an irrigation system may be used. In some embodiments, a spray plane or other aerial delivery system may be used. In some embodiments, a drone may be used.

When applied as liquid, the one or more treatment composition may include any suitable amount of solids. Preferably, the treatment composition includes at least 0.05, least 0.1, at least 0.15, at least 0.2, at least 0.25, or at least 0.50 weight percent (wt-%) of total solids, based on the total weight of the treatment composition. While the maximum amount of total solids in liquid embodiments is not particularly limited, typically the treatment composition will include less than 30, more typically less than 25, and even more typically less than 20, less than 15, less than 10, less than 5, less than 4, less than 3, less than 2, less than 1, less than 0.75, or less than 0.50 wt-% of total solids. In embodiments in which the one or more treatment composition is prepared from a liquid concentrate, the liquid concentrate preferably includes a sufficient amount of total solids to yield a final liquid treatment composition (after dilution such as, e.g., 10-, 20-, 50-, or 100-fold dilution) having a total solids as disclosed above.

In presently preferred embodiments, the treatment composition is applied as a liquid treatment composition. Liquid treatment compositions of the present disclosure typically include a liquid carrier and may be organic-solvent-based or water-based compositions (i.e., aqueous compositions that may optionally include one or more organic solvents). In preferred embodiments, the one or more liquid treatment composition is an aqueous composition, which may optionally include organic solvent (e.g., a water-miscible organic solvent such as ethanol). In such embodiments, the treatment composition preferably includes at least 50, at least 60, at least 70, at least 80, at least 90, at least 95, at least 97, or at least 99 wt-% of water, based on the total weight of the composition. In some embodiments, the treatment composition includes at least 1, at least 2, at least 3, at least 4, at least 5, at least 10, at least 15, at least 20, or at least 30 wt-% of one or more organic solvent, based on the total weight of the composition. Examples of suitable organic solvents may include methanol, ethanol (e.g., food-grade ethanol at any suitable proof such as, e.g., about 190 proof), isopropanol, butanol, acetone, ethyl acetate, acetonitrile, tetrahydrofuran, diethyl ether, tert-butyl ether, or a combination thereof. Food-grade organic solvents are preferred. Ethanol is a preferred organic solvent, with food-grade ethanol being preferred in some embodiments. In some embodiments, the treatment composition is not made using any organic solvent.

In preferred embodiments, the one or more treatment composition, when present as a surface-deposited treatment on an agricultural product, exhibits at least one and preferably both of: (i) a passive barrier property that reduces the adsorption of problematic compound(s) present in wildfire smoke onto the exposed exterior surface of the treatment and/or reduces or eliminates migration (e.g., diffusion) of such problematic compound(s) through the treatment to the underlying agricultural product and (ii) an active barrier property by which some or all of the problematic compound(s) are sequestered (e.g., by any suitable chemical or physical means such as binding, adsorbing, complexing or the like) during passage through the treatment such that the compound(s) either do not reach the underlying agricultural product or do so in a reduced amount. The binding component described herein preferably provides the active barrier property. In some embodiments, the passive barrier property is provided by the organic component (either alone or in combination with the binding component, if used).

To protect against smoke exposure, the one or more treatments of the present disclosure are preferably applied to a sufficient portion of the exterior of the agricultural product (e.g., fruit, and especially wine grapes) to provide a suitable level of protection. In embodiments in which the agricultural product is a fruit (e.g., wine grapes) or other edible product (e.g., hops), the fruit or other edible product is preferably substantially coated on its exterior with one or more surface-deposited treatment. Preferably, on average, more than 50%, more than 60%, more than 70%, more than 80%, preferably more than 90%, even more preferably more than 95%, and even more preferably more than 99% of the exterior surface area of the fruit or other edible product is coated.

In some embodiments in which the agricultural product grows as clusters or bunches (e.g., fruit clusters or bunches), depending on the timing of the treatment, it may not be possible to effectively treat surfaces located towards the interior of the cluster or bunch. For example, if wine grapes are treated after the grapes in a cluster have mostly grown together to restrict access to surfaces of interior grapes of the grape cluster, it may be sufficient to substantially coat the exposed exterior surfaces of the grape cluster. Preferably, on average, more than 50%, more than 60%, more than 70%, more than 80%, preferably more than 90%, even more preferably more than 95%, and even more preferably more than 99% of the exposed exterior surfaces of the clusters or bunches (e.g., grape clusters) are coated.

In some embodiments, in which the product to be treated is wine grapes, the treatment composition is applied prior to the grapes growing together to substantially restrict or prevent access to the surfaces of grapes located towards the interior of the cluster. In such embodiments, it may be advantageous for the treatment composition to also have a fungicide property (e.g., include a suitable fungicide in the composition).

Examples of varieties of wine grapes that may benefit from the treatment compositions of the present disclosure include Cabernet Franc, Cabernet Sauvignon, Chardonnay, Grenache, Malbec, Merlot, Montepulciano, Petite Sirah, Pinot Gris, Pinot Noir, Sangiovese, Sauvignon Blanc, Syrah, Tempranillo, and Zinfandel. While not intending to be bound by theory, it is believed that red wine grapes are most susceptible to yielding wine (i.e., red wine) with perceived smoke taint issues.

In preferred embodiments, the surface-deposited treatment is at least substantially separated from the agricultural product (e.g., removed) prior to ingestion of the product or ingestion of a processed version of the product (e.g., wine). For example, in the case of fruit, residual surface-deposited treatment may be substantially removed by one or more wash steps occurring prior to harvest (e.g., in the field, vineyard, or orchard) and/or after harvest (e.g., in a processing facility). Additionally, or alternatively, such removal may occur during processing of the agricultural product into a processed food or beverage product. For example, in the case of juice, wine, or other beverages or products, residual treatment composition can be removed during and/or after pressing or crushing of the fruit by, for example, filtering, settling, agglomerating, precipitating or any other suitable process for separating out residual treatment composition. While not intending to be bound by any theory, in the case of wine, it is believed preferable to remove at least some, more preferably a majority (i.e., more than 50 wt-%), and more preferably substantially all, or all, of the treatment composition prior to crushing the wine grapes to avoid liberating problematic wildfire smoke compounds associated with the surface-deposited treatment composition and/or avoid scavenging desirable intrinsic sensory compounds (e.g., flavorants such as intrinsic aromatics) present in the wine grapes.

In some embodiments, it may be preferable to remove at least some, more preferably a majority (i.e., more than 50 wt-%), and more preferably substantially all, or all, of the treatment composition within 24, 48, 72, or 168 after initial exposure to wildfire smoke.

In some embodiments, it may be preferable to remove at least some, more preferably a majority (i.e., more than 50 wt-%), and more preferably substantially all, or all, of the treatment composition within 24, 48, 72, or 168 after exposure to wildfire smoke has ceased.

The one or more treatment composition preferably includes one or both of (i) a binding component for sequestering one or more problematic compounds present in wildfire smoke and (ii) an organic component, preferably a non-volatile organic component. In embodiments including an organic component with a high passive barrier property relative to problematic compounds in wildfire smoke (e.g., volatile phenols), it may not be necessary to include a binding component (e.g., a separate binding component) to achieve suitable protection. In certain embodiments, the organic component includes an oligomer or polymer material having a high passive barrier property such as, for example, certain semi-crystalline or crystalline oligomers or polymers. Examples of such materials may include nanocellulose materials such as, for example, cellulose nanocrystals or cellulose nanofibers (e.g., having having average fibril widths in a range of about 3 to about 300 nanometers (nm), about 5 to about 100 nm, or about 5 to about 50 nm with aspect ratios in a range of about 5 to about 90, about 5 to about 25, or about 5 to about 15).

In some embodiments, an ingredient in the treatment composition may be both a binding component and an organic component. In some embodiments, the treatment comprises a multilayer treatment in which a first treatment is applied, and then a second treatment is applied (e.g., after the first treatment has dried). While such first and second treatments may be compositionally the same, typically such first and second treatments will be chemically-different compositions.

The chemistry of wildfire smoke can be complex and varied. While combustion of lignin present in plant matter can give rise to problematic volatile aromatic compounds (e.g., certain volatiles disclosed herein such as, e.g., volatile phenols disclosed herein), other compounds may also be introduced in view of the wide diversity of plant matter that burns in many wildfire events. Moreover, increasingly man-made materials are encountering fire in wildfire events (e.g., materials present in cars, houses, utilities delivery infrastructure, etc.), which can give rise to a large variety of chemistries beyond those present in natural plant matter.

In preferred embodiments, the binding component comprises a material or compound capable of sequestering, under ambient conditions, (i) one or more volatile phenols (e.g., one or more of guaiacol, 4-methyl guaiacol, 4-ethyl guaiacol, m-cresol, o-cresol, eugenol, thymol, syringol, or 4-ethyl phenol), (ii) one or more thiophenols (i.e., $C_6H_5SH$ or substituted versions thereof in which one or more hydrogen atom has been substituted, e.g., for an organic group such as a methyl or ethyl group), (iii) one or more compounds present in wildfire smoke that yields a negative mouthfeel (e.g., a bitter and/or metallic mouthfeel that persists) in sensory testing (iv) sulfur dioxide and/or other sulfur-containing compounds present in wildfire smoke; and/or (v) nitrogen dioxide and/or other nitrogen-containing compounds present in wildfire smoke. In preferred embodiments, the binding component is present in the one or more treatment composition in an amount effective to reduce the amount of one or more, two or more, three or more, four or more, five or more, six or more, seven or more, eight or more, nine or more, or all of guaiacol, 4-methyl guaiacol, 4-ethyl guaiacol, m-cresol, o-cresol, eugenol, thymol, syringol, 4-ethyl phenol, or thiophenol (i.e., $C_6H_5SH$) in the treated agricultural product, relative to an untreated control of the agricultural product, when exposed under ambient conditions to smoke containing lignin thermal degradation products.

For example, in the case of wine grapes, smoke exposed wine grapes can be converted to wine for purposes of testing in a micro-fermentation batch using the Micro-Fermentation Protocol, 8/28/2020 (v. 4), issued by the West Coast Smoke Exposure Task Force. While not intending to be bound by theory, it is believed that assaying wine for phenol levels is more predictive for smoke taint sensory issues than assaying the levels in the grapes directly or in the juice used to make the wine. Quantitative GC methods for detecting volatile phenol smoke markers in wine are well known, with an example of such a method provided in the Application Note issued by Agilent Technologies, Inc. entitled "Analysis of Free Volatile Phenols in Smoke-Impacted Wines by SPME", authored by Jessica Westland and Vanessa Abercrombie, dated May 5, 2021. As indicated in the Micro-Fermentation Protocol, most laboratories consider a concentration of guaiacol or 4-methyl guaiacol of 0.5 ppb in grape samples or 1.0 ppb in wine or juice as an elevated level for these compounds. To compare smoke exposed wine grapes treated with a treatment composition of the present disclosure relative to an untreated smoke exposed control, prior to crushing of the wine grapes, the residual treatment composition should preferably be substantially removed to avoid the potential for phenols captured in the treatment composition from liberating and interfering with the quantitation.

Gas chromatography-mass spectrometry ("GC-MS") is an example of an assay useful for assessing the ability of an ingredient, or an overall treatment composition, to bind volatile wildfire smoke components such as, for example, any of the volatile phenols referenced herein. An example of a method for determining whether a sample of a dry material can bind any of the phenols referenced herein (e.g., guaiacol or 4-methyl guaiacol) is provided in the Examples section below. While particulate materials in the form of powder were tested in the Examples section, a fully formulated liquid treatment composition can be tested in a like manner by applying the liquid treatment sample to the aluminum tray and allowing it to dry to form a hardened sample for testing. If no peak is observed for the tested phenol (e.g., guaiacol or 4-methyl guaiacol) using THF extraction, then the test should be re-run using methanol. Absence of a peak associated with the tested phenol in either solvent is an indication that the material does not bind the tested phenol, at least to a meaningful degree, as at least some phenol should liberate with the solvent extractions.

Gas chromatography (GC), gas chromatography-mass spectrometry ("GC-MS"), Fourier Transfer Infrared Spectroscopy (FTIR), and gravimetric assessment are examples of assays useful for assessing the ability of an ingredient, or an overall treatment composition, to bind volatile wildfire smoke components such as, for example, any of the volatile phenols or thiophenols referenced herein.

While several GC and GC-MS methods could be used to assess phenol and/or thiophenol capture (hereinafter "phenol capture" for brevity), two options include: 1) Direct inject by extracting the phenol from the capture agent and testing via direct inject into the GC or GC-MS system and 2) Head space GC or GC-MS, where volatiles in the headspace of a test vial are extracted and processed through the GC or GC-MS. Both gas chromatography methods are the same, however, when an unknown material is required to be detected, a mass spectrometer may be used to identify the unknown component. Direct inject and head space analysis are well known techniques to those skilled in the art. An example of a process could include exposing the capture agent to one or more volatile phenols, and then extracting the phenol from the capture agent with a solvent the phenol has a affinity to, then by direct inject GC or GC-MS determining how many milligrams (mg) of phenol was captured per gram (g) of capture agent. If headspace GC or GC-MS is used as an assay, the capture agent, after exposure to phenol can be placed in a head space GC or GC-MS test vial, and the vial heated to liberate the phenol (or thiophenol) from the capture agent, and the volatile phenol (or thiophenol) extracted from the vial into the GC or GC-MS for analysis to determine mg/g of phenol (or thiophenol) to capture agent.

FTIR analysis is also a well-known analytical technique. FTIR works by shining infrared light upon a sample and determining the wavelengths of light absorbed by the sample. The infrared region of the electromagnetic spectrum ranges from 700 nanometers (nm) to 1 millimeters (mm) and is broken up into the subregions of: near infrared (0.7 to 1.4 µm), short wavelength infrared (1.4 to 3 µm), mid wavelength infrared (3 to 8 µm), long wavelength infrared (8 to 15 µm), and far-infrared (15 to 1000 µm). Molecular bonds in the sample have vibrational modes, (e.g., symmetrical and antisymmetrical stretching, rocking, wagging, scissoring, etc.) that can be excited by application of light at the same frequency as the vibrational mode. When the sample is irradiated with IR light, depending on the composition of the sample, some wavelengths of the light will be absorbed while others will pass through the sample. The transmitted light is then measured to produce a spectrum showing the absorption profile as a function of wavelength. Organic matter and inorganic minerals have characteristic absorption profiles which can be used to identify sample constituents. This may be, done qualitatively or quantitatively by use of infrared libraries, manual identification, univariate analysis or multivariate analysis, FTIR can be used to determine the weight ratio of phenol to capture agent. This can be accomplished by quantifying a peak area in the FTIR spectrum unique to the phenol. As example would be to use the 1595 cm−1 or 1493 cm−1 peaks characteristic to the benzene rings in a phenol such as guaiacol.

In preferred embodiments, the binding component includes one or more ingredient that, when present in dry form, binds (e.g., adsorbs) one or more, two or more, three or more, four or more, five or more, six or more, and preferably all of the following volatiles in the vapor phase: (i) guaiacol, (ii) 4-methylguaiacol, (iii) 4-ethylguaiacol, (iv) 4-ethylphenol, (v) m-cresol, (vi) o-cresol, and (vii) thiophenol. Such one or more ingredient, when present in dry form, is preferably capable of binding at least about 1, at least about 3, at least about 4, at least about 5, at least about 10, at least about 20, at least about 30, at least about 40, at least about 50, at least about 60, at least about 70, at least about 80, at least about 90, at least about 100, at least about 150, at least about 200, at least about 250, at least about 300, at least about 350, at least about 400, at least about 450, or at least about 500 mg of one or more, two or more, three or more, four or more, five or more, six or more, and preferably all of volatiles (i)-(vii) in the vapor phase per gram of the ingredient. In general, more binding capacity is desirable. Typically, however, the one or more ingredient of the binding component, when present in dry form, will bind less than about 1,000, less than about 500, less than about 400, less than about 300, less than about 200, less than about 150, or less than about 100 mg of one or more, two or more, three or more, four or more, five or more, six or more, or all of volatiles (i)-(vii) in the vapor phase per gram of the ingredient. Useful conditions for assessing binding may include, for example, 180 minutes at 60° C. in a sealed vessel. The treatment composition preferably includes an amount of such one or more binding component ingredients effective to reduce, and preferably substantially reduce, the amount of volatile phenols and/or thiophenols in wildfire smoke that can infiltrate into treated agriculture products exposed to wildfire smoke.

In preferred embodiments, the overall treatment composition, when present in dry form (e.g., after hardening), is capable of binding at least about 1, at least about 3, at least about 4, at least about 5, at least about 10, at least about 20, at least about 30, at least about 40, at least about 50, at least about 60, at least about 70, at least about 80, at least about 90, at least about 100, at least about 150, at least about 200, at least about 250, at least about 300, at least about 350, at least about 400, at least about 450, or at least about 500 mg of one or more, two or more, three or more, four or more, five or more, six or more, and preferably all of volatiles (i)-(vii) from the preceding paragraph in the vapor phase per gram of the dry overall treatment composition. In general, more binding capacity is desirable. Typically, however, the overall treatment composition, when present in dry form, will bind less than about 1,000, less than about 500, less than about 400, less than about 300, less than about 200, less than about 150, or less than about 100 mg of one or more, two or more, three or more, four or more, five or more, six or more, or all of volatiles (i)-(vii) in the vapor phase per gram of the dry overall treatment composition. Useful conditions for assessing binding may include, for example, 180 minutes at 60° C. in a sealed vessel.

The binding component may comprise a single ingredient or a combination of two or more ingredients, which may be present in the one or more treatment compositions in any suitable amount, but preferably in an efficacious amount (e.g., as described above). Due to the wide variety of chemistries that may be present in wildfire smoke, in some embodiments, the binding component includes multiple different binding ingredients having different binding proclivities (i.e., a "cocktail" binding approach). Typically, the binding component is present in the one or more treatment compositions in an amount of at least about 0.05, at least about 0.1, at least about 0.15, at least about 0.2, at least about 0.25, at least about 0.5, at least about 0.75, or at least about 1 wt-% percent, based on the total weight of the treatment composition. Although the maximum amount of binding component is not particularly restricted, typically the binding component is present in the one or more treatment compositions in an amount of less than about 30, less than about 25, less than about 20, less than about 15, less than about 10, less than about 5, less than about 4, less than about 3, less than about 2, less than about 1, less than about 0.75, or less than about 0.50 wt-%, based on the total weight of the treatment composition.

The binding component may include one or more organic materials, one or more inorganic materials, or a combination thereof. In some embodiments, the binder component includes one or more organic or inorganic porous sorbent materials, more typically one or more organic or inorganic porous adsorbent material. In certain preferred embodiments, the binding component includes at least one porous adsorbent particulate material. Examples of suitable materials for the binding component may include oligomers or polymers with binding properties for one or more compounds present in wildfire smoke, activated carbons, carbon blacks, clay mineral, zeolites, metal-organic frameworks (MOFs), porous magnesium carbonate particles, porous silicon dioxide particles, porous titanium dioxide particles, porous magnesium dioxide particles, porous iron oxide, high surface-area organic or inorganic particulate materials other than those previously mentioned, and combinations thereof. It is preferable that at least one material of the binding component has one or more macromolecular cavities, more preferably one or more lipophilic/hydrophobic such cavities. Examples of such materials include cyclodextrins as well as, for example, certain adsorbent materials, more preferably microporous adsorbent materials. Such microporous sorbent materials typically "bind" compounds (often referred to as "guest" molecules) through one or more non-covalent interactions. Nonetheless, it is contemplated that the binding component of the present disclosure may be capable of covalently bonding with problematic smoke taint compounds.

Examples of suitable oligomers or polymers for inclusion in the binder component include cyclic oligosaccharides, oligomers or polymers including a cyclic oligosaccharide group, oligomers or polymers including a carbonyl functional group such as a pyrrolidone group (e.g., present in a structural unit derived from a vinylpyrrolidone monomer such as, e.g., n-vinylpyrrolidone), molecularly imprinted polymers (MIPs) preferably having an affinity for binding volatile phenols (e.g., having cavities that bind volatile phenols and preferably one or more of the problematic volatile phenols referenced herein), and combinations thereof. Cyclodextrins and cyclodextrin groups, which may optionally be modified, are examples of preferred cyclic oligosaccharides and cyclic oligosaccharide groups, respectively. Cyclodextrins can be produced, for example, via enzymatic degradation of plant starch. Preferred such cyclodextrins and cyclodextrin groups include from 6 to 12 glucose units, more typically 6 to 8 glucose units. Particularly preferred cyclodextrins and cyclodextrin groups include alpha-cyclodextrin, beta-cyclodextrin, gamma-cyclodextrin, modified versions thereof, and mixtures thereof. Unmodified versions of cyclodextrin are typically referred to as "natural" or "native" cyclodextrins. The use of one or more natural cyclodextrins may be preferred in some embodiments due to consumer perceptions.

In some embodiments, a mixture of different cyclodextrins may be desirable to provide a binding component capable of sequestering a broader range of compounds in wildfire smoke. To maximize their binding capacity, the cyclodextrins and cyclodextrin groups are preferably uncomplexed such that the binding pocket/cavity is available for sequestering problematic compounds (e.g., problematic volatile phenols and other problematic cyclic aromatics) present in wildfire smoke. Thus, in some embodiments, at least 50%, at least 60%, at least 70%, at least 80%, at least 90%, at least 95%, or at least 99%, or at least 99.9%, of the cyclodextrin molecules are uncomplexed and available for binding. Food-grade cyclodextrins are available and preferred in some embodiments. For example, food-grade cyclodextrins are available from Wacker-Chemie, including the CAVAMAX W6 Food, CAVAMAX W7 Food, or CAVAMAX W8 Food products from Wacker-Chemie.

As discussed above, modified cyclodextrins may be used. When modified, cyclodextrins are typically modified via reaction and/or substitution of one or more of the hydroxyl groups. Any suitable amount of hydroxyl groups may be replaced/substituted such as, for example, from about 1 to about 18, or from about 3 to about 16. Such modifications may be used, for example, to modify the cavity size, to modify the cavity complexing chemical properties, to modify the solubility in water (e.g., increase the solubility so more cyclodextrin may be dissolved), and/or to provide crosslinking properties. Examples of modified cyclodextrins include alkylated cyclodextrins (e.g., methylated cyclodextrins), hydroxyalkyl-modified cyclodextrins (e.g., a hydroxypropyl cyclodextrin), and cyclodextrins modified to include one or more acetyl groups, one or more alkoxyalkyl groups, one or more sulfoalkyl groups, one or more sulfoalkyl ether groups, one or more sugar groups, one or more nitrile groups, one or more phosphine groups, one or more alkylammonium groups, or a combination thereof. Such modifications are well known to persons of skill in the art in the pharmaceutical area for purposes of using cyclodextrin for complexing with pharmaceutical compounds, pharmaceutical delivery and/or release purposes. Wacker-Chemie markets a variety of modified cyclodextrins under its CAVAMAX line of commercial cyclodextrin products.

In some embodiments, one or more cyclodextrins may be used having a water solubility, at room temperature, of at least 10 grams (g) in 100 milliliters (ml) of water, at least 20 g in 100 ml of water, or at least 25 g in 100 ml of water.

In embodiments in which cyclodextrin is used, it may be beneficial to carefully select the other ingredients (e.g., other nonvolatile ingredients) of the treatment composition, if any are included, to avoid unsuitably interfering with the ability of cyclodextrin to bind volatile phenols present in wildfire smoke. For example, it may be preferable to minimize and/or avoid the use of ingredients that would tend to occupy the cavity of cyclodextrin such that it is not available for phenol capture. Thus, while not intending to be bound by theory, in some embodiments, it may be preferable to avoid the use of lipophilic compounds having a size such that they can reside within the cavity of cyclodextrin. While not intending to be bound by theory, in some embodiments, it may be desirable to include one or more relatively hydrophilic non-volatile ingredients (e.g., water-dispersible oligomers and/or polymers such as water-dispersible polypeptides and/or polysaccharides) in the treatment composition along with cyclodextrin to enhance volatile phenol capture by the cyclodextrin present in dried applied treatment composition. Nonetheless, while not intending to be bound by theory, it is contemplated that certain ingredients, such as, for example, propylene glycol, which is believed to decrease the cavity size of cyclodextrin such that is can effectively sequester smaller compounds may be included in the treatment composition.

Examples of oligomers or polymers including a pyrrolidone group include polyvinylpolypyrrolidone (PVPP), polyvinylpyrrolidone (PVP), and combinations thereof.

In some embodiments, the binding component may include one or more organic or inorganic porous sorbent materials, preferably one or more organic or inorganic porous adsorbent materials, even more preferably one or more organic or inorganic microporous adsorbent materials, which may be food-contact safe or even edible. In some embodiments, the binding component includes one or more microporous adsorbent material (e.g., other than a cyclodextrin) having a porous structure that includes pores (or cavities) which are similar in size to the cavities present in one or more of natural alpha-cyclodextrin, natural beta-cyclodextrin, or natural gamma-cyclodextrin. Open pores (e.g., through pores and blind pores), which have indirect or direct access to the surface of a solid, are preferred over closed pores, which are completely surrounded by an impenetrable solid. Accordingly, in some embodiments, the porous adsorbent material includes pores having diameters (e.g., maximum, mean, and/or median pore diameters) and/or volumes (e.g., maximum, mean, and/or median pore volumes) within +/−100%, within +/−50%, within +/−40%, within +/−30%, within +/−20%, within +/−15%, within +/−10%, or within +/−5% of at least one of the cavity diameters and/or cavity volume of natural alpha-cyclodextrin, beta-cyclodextrin, or gamma-cyclodextrin (e.g., available from Wacker Chemie).

In some embodiments, the porous adsorbent material has pores, preferably open pores, with widths that are less than 10,000, preferably less than about 5,000, more preferably less than about 2,000, even more preferably less than about 1,000, even more preferably less than about 500, less than about 200, less than about 100, less than about 50, less than about 20, less than about 15, less than about 10, less than about 9, less than about 8, less than about 7.5, less than about 7.0, or less than about 6.5 Angstroms. Such pores preferably have widths (e.g., maximum, mean, and/or median widths) of greater than about 1, greater than about 2, greater than about 3, greater than about 4, greater than about 5, greater than about 6, greater than about 6.5, greater than about 7, greater than about 7.5, greater than about 8, greater than about 8.5, or greater than about 9 Angstroms.

The distribution of pore sizes in a porous material (e.g., carbonaceous porous materials, clay minerals, zeolites, and the like) can affect its adsorption characteristics. Preferred porous adsorbent materials (e.g., other than cyclodextrin), which are typically present as particles in the treatment composition, preferably have at least one, more preferably at least two, and, in some embodiments, all of the following: micropores, mesopores, or macropores. Preferred porous adsorbent materials include at least some micropores. In accordance with the nomenclature used by The International Union of Pure and Applied Chemistry (IUPAC), pores in an adsorbent material are referred to herein as: "micropores" if the pores have widths not exceeding 2 nanometers (<2×10-9 m); "macropores" if the pores have widths exceeding 50 nm; and "mesopores" if the pores have widths between 2 nm and 50 nm. While not intending to be bound by theory, pores having diameters greater than 500 nm do not usually contribute significantly to the adsorbancy of porous materials. Accordingly, for practical purposes, pores having diameters in the range 50 nm to 500 nm, more typically 50 to 300 nm or 50 to 200 nm, can be classified as macropores. While not intending to be bound by theory, it is believed that the micropores are particularly useful for adsorbing aromatic compounds such as, e.g., phenols (e.g., any of those disclosed herein) and the mesopores and/or macropores are useful for purposes of such compounds being able to access and be adsorbed by the micropores. That is, the mesopores and macropores are believed to function as "highways" to allow such compounds to reach and be adsorbed by the micropores, although some adsorption may also happen with mesopores. Accordingly, preferred porous adsorbent materials are rich in micropores. That is, preferably a substantial portion (e.g., at least 10%, at least 15%, at least 20%, at least 25%, at least 30%, at least 35%, at least 40%, at least 45%, or at least 50%) of the total pore volume of a porous adsorbent material is micropore volume (i.e., pore volume attributable to micropore volume).

The full range of diameters, volumes, and distribution of pores (e.g., micropores, mesopores, and macropores) is often not accessible by a single analytical technique.

A wide range of pore sizes from 0.35 nm to over 100 nm can be analyzed with high accuracy using, for example, vacuum-volumetric adsorption techniques. Such analytical techniques are typically performed by first cleaning the surfaces of the sample and then dosing the sample with an adsorbing gas, in a system typically held at the boiling point of the gas (e.g., N2 at 77 Kelvin) and recording the resulting difference in volume or mass once thermodynamic equilibrium is achieved. The dosing procedure continues over a range of predefined pressures created at a constant temperature, which is used to determine the size, pore volume, and surface area. Analysis of the pore size distribution is carried out by applying a data fitting method, with the modem method of density functional theory (DFT) being very reliable for siliceous/oxidic materials using a non-local DFT method and for carbonaceous materials using quenched solid DFT method. Anton-Paar sells adsorption analyzers (e.g., under its AUTOSORB IQ line of analyzers) suitable for use in running such assays and generating such data via DFT data fitting.

Measuring pores sized from 3.2 nm to larger than 400 microns is typically accomplished using mercury intrusion porosimetry (MIP), which involves forcing the non-wetting liquid mercury into smaller and smaller pores with increased pressure. The pore size can be calculated using the Washburn equation. The pore size distribution can be obtained by monitoring the volume of intruded mercury into the pores as a function of applied pressure to produce a porosimetry curve. By relating the pressure at which intrusion is seen to the size of the pore being filled, a pore size distribution can be calculated. Anton-Paar sells mercury pore size analyzers (e.g., under its POREMASTER line of analyzers such as the POREMASTER 60 analyzer) suitable for use conducting such MIP measurements.

The feedstock material used to incorporate the adsorbent material(s) into the one or more treatment compositions is preferably present in a suitably small form such that it can be effectively incorporated into the treatment for efficient application to substrate and to maximize the likelihood of wildfire smoke compounds interacting with the material(s). Fine particulates (e.g., powder such as free-flowing powder) of sufficiently small size are preferred feedstocks. While not intending to be bound by theory, it is believed the use of powders of sufficiently small particle size may be advantageous in terms of achieving a "tortuous path" in hardened surface-deposited treatments through which problematic compounds must successfully migrate through without being sequestered to reach the exterior surface (e.g., cuticle) of the underlying treated agricultural product, thereby reducing the chances of successful migration through the treatment.

Examples of suitable adsorbent materials may include carbonaceous adsorbent materials (e.g., activated carbon, preferably food-contact safe activated carbon particles); clay minerals, including swelling clay minerals (e.g., clay minerals that expand in water); diatomaceous earth, preferably from a deposit formed in a freshwater environment; zeolites (e.g., natural zeolites, synthetic zeolites, or a mixture thereof); perlites; and combinations thereof. Microporous adsorbent materials of volcanic origin may be used. Examples of suitable clay minerals include smectites, with bentonite and montmorillonite being preferred such examples. Other suitable clay minerals may include vermiculite. In some embodiments, it may be advantageous to include a clay mineral in the binding component that is of a structure other than a 1:1 clay (kaolin clay is a 1:1 clay). Examples of preferred such clay minerals are classified as 2:1 clay, with montmorillonite being an example of a 2:1 clay mineral. While not intending to be bound by theory, it is believed that high-surface-area clay minerals such as, for example, smectites (and particularly bentonite and montmorillonite) are preferable over low-surface-area clay minerals such as kaolinites for use as a binding component. It is believed that clay minerals with higher surface areas (much of which is generally internal surface area) can more effectively adsorb problematic wildfire smoke compounds such as, for example, any of the volatile phenols disclosed herein. Thus, in some embodiments, the binding component includes an inorganic particulate material (e.g., a clay mineral or other mineral) having a total surface area that is greater than that of kaolinite (e.g., at least 5%, at least 10%, at least 20%, at least 50%, at least 100%, at least 200%, at least 300%, or at least 400% greater than kaolinite).

Any suitable zeolite or combination of zeolites may be used. Zeolites may include crystalline aluminosilicates having pores, e.g., channels, or cavities of uniform, molecular-sized dimensions. Zeolites may include natural zeolites, modified zeolites, and synthetic zeolites. Suitable zeolites may include zeolite BETA (Na7(Al7Si57O128) tetragonal), zeolite ZSM-5 (Nan(AlnSi96-nO192) 16H2O, with n<27), zeolite A, zeolite X, zeolite Y, zeolite K-G, zeolite ZK-5, zeolite ZK-4, and any combination thereof. In some embodiments, an intermediate silicate/aluminate zeolite is used (e.g., zeolites having an SiO2:AlO2 molar ratio of less than 10:1, preferably from about 2:1 to about 10:1). In some embodiments, zeolite particles have a D50 of about 3 to about 5 microns are used.

Organoclays derived from clay minerals (e.g., any of those disclosed herein) may be used. For example, organoclays in which at least some of the natural cations in the clay mineral have been replaced by organocations. Commercial supplies of such organoclays are readily available. The BENTONE line of rheology modifier products from Elementis, which are derived from bentonite, are examples of such commercial products. In some embodiments, it may be preferable to use an organoclay specifically designed for use in water treatment applications. Examples of such commercially available organoclay products for water treatment applications include the OrganoClay MCM-830P product available from Ecologix Environmental Systems. In some embodiments, it may be advantageous to use organoclay (e.g., the MCM-830P product) in combination with activated carbon. Depending on the size of the organoclay solids, it may be necessary to further mill the material to be suitably sized (e.g., pellet-sized material may need to be milled down to powder-sized particulates) for use in the treatment compositions disclosed herein.

Carbonaceous materials derived from synthetic or natural sources may be used. Suitable carbonaceous materials consist primarily of carbon, and preferably have a carbon content of at least about 80, preferably at least about 85, and more preferably at least about 90, at least about 95, or at least about 98 wt-%. Porous carbonaceous materials are preferred, with activated carbon being particularly preferred. Carbonaceous materials may be provided, for example, by carbonizing or pyrolyzing bituminous coal, softwood pulp, hardwood pulp, coconut shells, almond shells, grape seeds, walnut shells, macadamia shells, kapok fibers, cotton fibers, cotton linters, and the like. One or more activating steps may be used to provide activated carbonaceous materials. In some embodiments, a carbonaceous material, more preferably an activated carbon, is used that is not derived from fossil fuels. An example of such an activated carbon is an activated carbon derived from coconut shells. In some embodiments it may be preferable to use a food-grade carbonaceous material, more preferably an activated carbon, suitable for food-contact and/or ingestion.

Carbonaceous materials, including activated carbon, of any suitable surface area may be used. Preferred carbonaceous materials, with activated carbon being particularly preferred, have a surface area of at least about 200, at least about 300, at least about 400, preferably at least about 500, at least about 600, at least about 700, at least about 750, at least about 800, at least about 900, at least about 1,000, at least about 1,200, or at least 1,500 square meters per gram (m2/g). The upper limit of surface area is not particularly restricted, but due to practical considerations will typically be less than about 3,000, less than about 2,000, or less than about 1,500 m2/g. A useful method for measuring the surface area of porous materials is the nitrogen Brunauer-Emmett-Teller (BET) method (a standard gas adsorption method). Equipment for measuring the surface area of porous materials, including activated carbon, using the nitrogen BET method is readily available from equipment manufacturers such as Anton Paar. Porous inorganic adsorbent materials (e.g., zeolites, clay minerals, and the like) or other non-carbonaceous porous materials included in treatment compositions of the present disclosure may also have surface areas pursuant to the values disclosed in this paragraph. As previously discussed, preferred porous inorganic adsorbent materials have a surface area (i.e., total surface area) greater than that of kaolinite.

Any suitable activated carbon may be used. In some embodiments, the activated carbon has a carbon tetrachloride activity of at least about 45, at least about 50, at least about 60, at least about 70, or at least about 80 (i.e., weight percent pickup of carbon tetrachloride). A useful method for assessing carbon tetrachloride activity is provided by ASTM D3467-04(2020). In some embodiments, the activated carbon has an iodine number (ASTM D4607-14(2021)) of at least about at least about 500, at least about 600, at least about 700, at least about 800, at least about 1,000, at least about 1250, at least about 1,500, at least about 1,750 or at least about 2,000 mg/g. Iodine number is a relative indicator of porosity. While the upper amount of iodine number is not restricted, in some embodiments it may be less than about 2,000, less than about 1,500, less than about 1,200, or less than about 1,100 mg/g.

In some embodiments, the binding component, or one or more materials used to formulate the binding component, has an oil absorption of at least 30, at least 40, at least 50, at least 60, at least 70, at least 80, at least 90, or at least 100 grams of linseed oil per 100 grams of inorganic material. An example of a useful test method for determining oil absorption is ASTM D 281-95 (Reapproved 2002) using Procedure A (weighing bottle). In preferred such embodiments, one or more materials used to formulate the binding component has an oil absorption greater than that of comparably-sized particles of kaolin clay (e.g., kaolin clay particles having a D50 value that differs by no more than 10% of the D50 value of the one or more particles having a greater oil absorption value), preferably the oil absorption value is at least about 5% greater, at least about 10% greater, at least about 20% greater, at least about 50% greater, at least about 100% greater, at least about 150% greater, or at least about 200% greater than the comparably-sized particles of kaolin clay. While not intending to be bound by theory, it is believed that for certain particles the oil absorption value is correlated to the propensity of the particles to function as porous adsorbent materials.

Due to potential perception issues from winemakers and grape growers, in some embodiments, it may be preferable for the binding component to be based on one or more materials already known for use in wine fining or other wine processing steps.

The binding component can include any suitable MOFs. In some embodiments, one or more MOFs are used including ions selected from $Li^+$, $Na^+$, $Rb^+$, $Mg^{2+}$, $Ca^{2+}$, $Sr^{2+}$, $Ba^{2+}$, $Sc^{3+}$, $Ti^{4+}$, $Zr^{4+}$, $Ta^{3+}$, $Cr^{3+}$, $Mo^{3+}$, $W^{3+}$, $Mn^{3+}$, $Fe^{3+}$, $Fe^{2+}$, $Ru^{3+}$, $Ru^{3+}$, $Os^{3+}$, $Os^{2+}$, $Co^{3+}$, $Co^{2+}$, $Ni^{2+}$, $Ni^+$, $Pd^{2+}$, $Pd^+$, $Pt^{2+}$, $Cu^{2+}$, $Cu^+$, $Au^+$, $Zn^{2+}$, $Al^{3+}$, $Ga^{3+}$, $In^{3+}$, $Si^{4+}$, $Si^{2+}$, $Ge^{4+}$, $Ge^{2+}$, $Sn^{4+}$, $Sn^{2+}$, $Bi^{5+}$, $Bi^{3+}$, and combinations thereof. Preferably the MOFs include only non-toxic metals. The one or more MOFs may include ligands (e.g., anions) formed from organic acids such as, for example, citric acid, malic acid, tartaric acid, retinoic acid, pantothenic acid folic acid, nicotinic acid, oxalic acid, butyric acid, caproic acid, caprylic acid, capric acid, lauric acid, myristic acid, palmitic acid, stearic acid, arachidic acid, behenic acid, myristoleic acid, palmitoleic acid, oleic acid, linoleic acid, alpha-linoleic acid, arachidonic acid, eicosapentaenoic acid, erucic acid, docosahexaenoic acid, and combinations thereof.

In some embodiments, the binding component includes particles. In preferred embodiments, the particles comprise any of the binding component ingredients disclosed herein, including in any combination. In some embodiments, given particles include both an organic material (e.g., a cyclodextrin) and an inorganic material (e.g., a zeolite, a clay mineral, a MOF, a diatomaceous earth, a perlite, and the like), preferably in the form of inorganic particles—for example, as aggregate particles and/or core/shell particles. In some embodiments, the particles are inorganic particles that have been coated with one or more organic materials (e.g., cyclodextrin and/or one or more saccharide, peptide, or lipid components or any other suitable oligomers or polymers). The particles preferably have a D50 of less than about 50 microns, more preferably less than about 20 microns, less than about 10 microns, less than about 5 microns, less than about 3 microns, less than about 1 micron, less than about 0.5 micron, or less than about 0.3 microns. In some embodiments the particles have a D90, or even a D95 or D99, of the aforementioned. Any suitable method may be used to form particles including two or more such materials. Spray drying of an aqueous or solvent-based liquid including two or more such materials is an example of a useful method for forming such particles.

Other ingredients that may optionally be included in the treatment composition, which may bind phenols and other problematic compounds may include, for example, triacetin, triethyl citrate, acetyl triethyl citrate, tributyl citrate, acetyl tributyl citrate, acetyl tri-2-ethylhexyl, non-ionic surfactants (e.g., polyoxyethylene (POE) compounds, POE (4) lauryl ether, POE 20 sorbitan monolaurate, POE (4) sorbitan monolaurate, POE (6) sorbitol, POE (20) C16, C10-C13 phosphates, and the like), and any combination thereof. Additionally, cellulose acetate flake or filaments may, in some instances, be included.

In certain preferred embodiments, the binding component includes both a cyclic oligosaccharide (preferably a cyclodextrin, and more preferably two or more chemically-different cyclodextrins), and activated carbon particles. In one embodiment, the binding component includes both activated carbon particles and a polymer having cyclodextrin groups.

In some embodiments, at least some voids are formed in the surface-deposited treatment upon drying of a liquid applied treatment (e.g., after application on the surface of the agricultural product). For example, the liquid applied treatment may include a material with a water-soluble core material surrounded by a less water soluble and/or insoluble shell material (e.g., a less water soluble and/or insoluble polymer), whereupon drying a void is formed that is available to capture volatile taint compounds present in wildfire smoke such as any of the volatile phenols described herein. Such voids are preferably of a size described elsewhere herein in the context of porous adsorbent materials (e.g., the micropores of activated carbon and/or the pores of cyclodextrins). Such materials having voids upon drying are known in the coating industry for other purposes such as, for example, hollow latex particles for opacifying paints.

While not intending to be bound by theory, it is believed that the inclusion of a sufficient amount of inorganic particles in the treatment composition may help minimize the amount of certain wildfire-smoke-related substances that deposit on the surface of the hardened surface-deposited treatment. For example, it is believed that a hardened treatment having a suitable amount of inorganic particles located at the outer surface can perform better in such respect than a surface made up exclusively of relatively "tacky" materials such as, for example, certain tacky biopolymers or waxes. By minimizing the amount of wildfire-smoke-related substances that deposit on the surface of the treated agricultural product in the first place, the less the chances that such substances can migrate through the coating treatment and contact the exterior surface (e.g., cuticle) of the treated agricultural product and potentially cause smoke taint issues. In some embodiments, it may be preferable to use an inorganic material other than an inorganic microporous adsorbent material at the surface of the coating treatment to minimize the amount of volatile compounds that may penetrate into the coating treatment.

In presently preferred embodiments, the treatment composition of the present disclosure includes an organic component, which is preferably non-volatile (although volatile organic compounds may also be present, for example, such as organic solvents like ethanol). The organic component preferably facilitates formation of a coating, which also may be referred to as a "film", on the treated surfaces of a live agricultural product. The organic component is preferably a component capable of film formation, although in some embodiments it may not be necessary that film coalescence occurs during formation (e.g., "hardening" under ambient conditions) of a coating (after application of the treatment composition to substrate) to achieve a desired minimum balance of coating properties. In some embodiments, the organic component constitutes at least 20 wt-%, at least 30 wt-%, and more preferably a majority (i.e., more than 50% by weight) of the total solids present in the one or more treatment composition. The organic component can provide numerous benefits, including, for example, (i) to assist in delivering, protecting, and/or retaining one or more other ingredients (e.g., a binding component) in the treatment; (ii) to assist in formation of a surface-deposited treatment (e.g., a continuous or substantially continuous coating that is preferably at least substantially free of pores and preferably sufficiently adherent); (iii) to contribute to the passive and/or active barrier properties of a treatment; (iv) and/or to facilitate removal (e.g., washing away) of the treatment when such removal is desired. When using particulate matter in the binding component (e.g., activated carbon particles, clay mineral particles, other porous inorganic particles, and the like), it can be especially advantageous to use a non-volatile organic component to assist in formation of a more effective surface-deposited treatment. The term "organic component" as used herein does not include activated carbon or other carbonaceous particles (e.g., carbon black particles and the like).

In some embodiments, the organic component is selected and included in a sufficient amount in the one or more treatment composition to be capable of forming a continuous or substantially continuous coating on a treated substrate surface to provide at least a partial barrier capable of reducing the transmission of one or more of water, water vapor, oxygen, carbon dioxide, and (preferably) one or more problematic compounds present in wildfire smoke (e.g., any of the problematic phenols disclosed and/or problematic compound(s) leading to negative perceived wine mouthfeel). Any suitable organic component may be used. Typically, the organic component will include a substituted or unsubstituted hydrocarbon having at least 10 carbon atoms, at least 12 carbons atoms, at least 14 carbon atoms, at least 16 carbon atoms, at least 18 carbon atoms, at least 25 carbon atoms, at least 30 carbon atoms, at least 35 carbon atoms, or at least 40 carbon atoms. Preferably, the organic component is non-volatile under ambient conditions. Stated otherwise, the organic component preferably contributes to the total solids of the treatment composition. A useful method for assessing whether a given compound is non-volatile is ASTM D6886-12, which involves a gas chromatography (GC) method and the relative elution from a GC column relative to methyl palmitate. Any compound of the organic component (e.g., substituted or unsubstituted hydrocarbon) that elutes after methyl palmitate is considered to be a non-volatile compound. If a trace amount of the compound also happens to elute before methyl palmitate, the compound is still considered to be non-volatile.

The organic component can be present in the treatment composition in any suitable amount to achieve a desired balance of coating properties. Preferably, the treatment composition includes at least 0.05, at least 0.1, at least 0.15, at least 0.20, at least 0.25, or at least 0.50 wt-% of the organic component. The maximum amount of organic component present in such liquid compositions, as applied, is not particularly restricted. In some embodiments, the organic component is present in the treatment composition in an amount of less than 30, less than 25, less than 20, less than 15, less than 10, less than 5, less than 4, less than 3, less than 2, less than 1, less than 0.75, or less than 0.50 wt-%, based on the total weight of the treatment composition.

In some embodiments the organic component includes an oligomer or a polymer. Bio-sourced oligomers and polymers are preferred in some embodiments.

The organic component may include a lipid, a saccharide, an oligosaccharide, a polysaccharide, a peptide, an oligopeptide, a polypeptide, or a combination thereof, preferably which include one or more active hydrogen groups. In preferred embodiments, the organic component is bio-sourced. For purposes of convenience, peptides, oligopeptides, and polypeptides are referred to collectively hereinafter as a "peptide component" and saccharides, oligosaccharides and polysaccharides are referred to hereinafter collectively as a "saccharide component." Moreover, for further purposes of convenience, unless noted otherwise, hereinafter oligopeptides and polypeptides are referred to collectively as "polypeptides" and oligosaccharides and polysaccharides are referred to collective as "polysaccharides." Lipids tends to help impart hydrophobicity properties to coatings, which may be desirable, for example, to help resist water vapor permeation, protect against problematic polar wildfire compounds and/or to avoid or reduce premature washing away of the surface-deposited surface treatment (e.g., due to rain, fog, or dew). Examples of lipids include fatty acids, fatty acid salts, fatty-acid-containing glycerides (e.g., monoesters and/or diesters of fatty acid and glycerol), monoesters of a fatty acid such as a monoester of a fatty acid and a hydroxyl-functional compound other than glycerol (e.g., ascorbic acid or a salt thereof), oils (e.g., triglycerides), phospholipids, glycolipids, sterols, and waxes. Polysaccharides and polypeptides tend to help impart good mechanical properties to coatings, but can sometimes suffer from poor barrier properties (e.g., relative to polar compounds such as water vapor). In some embodiments, the use of polysaccharides and/or polypeptides in the organic component may be desirable due to one or both of (i) their solubility in water which is generally relatively high and which may facilitate efficient incorporation into water-based treatments and/or efficient removal (i.e., washing away) of residual treatment from treated surfaces and/or (ii) good protection against hydrophobic, non-polar, and/or low-polarity compounds present in wildfire smoke.

In some embodiments, it may be beneficial to use a semi-crystalline or crystalline organic component to improve one or more passive barrier properties (e.g., resistance to gas transmission of problematic gases in wildfire smoke such as the phenols disclosed herein). Semi-crystalline materials (e.g., semi-crystalline polymers) typically have a highly ordered molecular structure with sharp melt points. Such materials remain solid until a given quantity of heat is absorbed and then rapidly change into a low viscosity liquid, They do not gradually soften with a temperature increase. Semi-crystalline materials also have anisotropic flow behavior, shrinking less in the direction of flow vs. transverse to flow. While not intending to be bound by theory, it is believed that the ordered packing of semi-crystalline or crystalline materials (e.g., semi-crystalline or crystalline polymers) may help reduce gas transmission through coatings formulated using the materials.

In some embodiments, it may be preferable to control/minimize the amount of lipid and/or other tacky, oily, and/or relatively hydrophobic materials included in the treatment composition, if any, to minimize the uptake of hydrophobic, non-polar, and/or low-polarity compounds present in wildfire smoke. Accordingly, in some embodiments, the one or more treatment composition, based on total non-volatiles, includes (if any) less than 50, less than 40, less than 30, less than 20, less than 15, less than 10, less than 5, or less than 1% of lipids, waxes, and/or oils. Water will tend to exhibit a high contact angle relative to coatings having a relatively high amount of lipids, waxes, and/or oils. In some embodiments, the treatment composition of the present disclosure, when hardened into a smooth coating (surface roughness can skew the measurement), and not intended to result in super hydrophobic surface, exhibits a contact angle, relative to a static bead of deionized water, of less than 110, more preferably less than 105, even more preferably less than 100, less than 99, less than 98, less than 97, less than 96, less than 95, less than 94, less than 93, less than 92, less than 91, or less than 90 degrees. A super hydrophobic surface is a surface that exhibits a contact angle relative to a static bead of deionized water, of greater than 145 degrees. In other embodiments, the one or more treatment composition may yield a surface-deposited treatment exhibiting a super hydrophobic contact angle relative to water.

In some embodiments, treatment compositions of the present disclosure are "hybrid" treatment compositions that include, for example, (a) both one or more lipids and one or more polysaccharides and/or polypeptides or (b) one or more polysaccharides and one or more polypeptides, optionally further including one or more lipids. If desired, in certain preferred embodiments, crosslinking may be used to, for example, increase the mechanical properties of lipid-based coatings, the barrier properties of polypeptide-based coatings and/or polysaccharide-based coatings, and one or both of the barrier and/or mechanical properties of hybrid coatings. In some embodiments, the organic component is dispersible in water or soluble or at least partially soluble in water.

The treatment composition can include any suitable amount of the organic component (typically comprising one or more lipid, polypeptide, and/or polysaccharide) to achieve the desired result. Typically, the organic component will constitute at least about 25 wt-%, at least about 30 wt-%, at least about 40 wt-%, at least about 50 wt-%, at least about 60 wt-%, at least about 70 wt-%, at least about 80 wt-%, at least about 85 wt-%, at least about 90 wt-%, at least about 95 wt-%, at least about 96 wt-%, at least about 97 wt-%, at least about 98 wt-%, or 99 wt-% or more, based on the total weight of solids in the treatment composition. While the maximum amount of the organic component in the treatment composition is not restricted, it may be less than 100 wt-%, no more than about 99 wt-%, no more than about 98 wt-%, no more than about 97 wt-%, no more than about 96 wt-%, no more than about 95 wt-%, no more than about 90 wt-%, no more than about 80 wt-%, no more than about 70 wt-%, no more than about 60 wt-%, no more than about 50 wt-%, no more than about 40 wt-%, or no more than about 30 wt-%, based on the total weight of solids in the treatment composition.

In certain preferred embodiments, the organic component includes at least one bio-sourced material. In some such embodiments, the organic component consists only of bio-sourced material(s). In some such embodiments, the organic component, and optionally the treatment composition, is not made using any ingredients from feedstocks derived from petroleum (e.g., paraffin is an example of a material that is often derived from petroleum) or natural gas. A useful method for assessing whether an ingredient (e.g., the organic component) or the overall treatment composition includes fossilized carbon (e.g., as present in petroleum or other fossil fuels) is ASTM D6866-18, method B, which distinguishes carbon resulting from biomass-derived inputs from those derived from fossil-fuel based inputs. Biomass contains an amount of Carbon-14 that is easily differentiated from other material such as fossil fuel that do not contain Carbon-14. Accordingly, the percentage of carbon from renewable sources can be determined using the aforementioned ASTM. In some embodiments, at least 10%, at least 20%, at least 40%, at least 50%, at least 60%, at least 80%, at least 90%, at least 95%, at least 99%, or 100% of the carbon present in the organic component, the binder component, and/or the overall treatment composition is bio-sourced carbon.

In preferred embodiments, the organic component includes one or more compounds having one or more active hydrogen groups. Thus, in preferred embodiments, the organic component includes one or more active hydrogen compounds ("AHC"). While not intending to be bound by any theory, the presence of active hydrogen groups in the organic component can provide various benefits including, for example, polarity, hydrophilicity, water-dispersibility (e.g., via neutralized acid or base groups), hydrogen bonding or other preferential interactions (e.g., other Van der Waals bonding), and/or cross-linking sites. While not intending to be bound by theory, it is believed that such interactions (e.g., hydrogen bonding) can help provide a higher level of passive barrier resistance relative to phenols (e.g., any of those referenced herein) and other problematic gaseous compounds that may be present in wildfire smoke. Examples of suitable active hydrogen groups include carboxyl groups (or anhydride groups); hydroxyl groups; amine groups (typically primary or secondary amine groups); or any other suitable active hydrogen group having a hydrogen attached to an oxygen atom (O), sulfur atom (S), or nitrogen (N) atom such as, for example, in the groups: —SH, =NH, —NH$_2$, —S(=O)$_2$(OH), —S(=O)OH, or acid groups including P, O, and H such as phosphonic or phosphinic groups; salt groups thereof (e.g., base-neutralized acid groups); or any combination thereof. Hydroxyl groups and carboxyl groups are particularly preferred. In some embodiments, the active hydrogen group is an acidic hydroxyl group capable of forming a salt group with a suitable base. In some embodiments, the organic component includes two or more different active hydrogen groups such as for, example, one or more carboxyl groups and/or salts thereof and one or more hydroxyl groups. The organic component may include one or more functional groups other than active hydrogen groups such as, for example, oxirane groups or carbon-carbon double bonds (e.g., aliphatic or cycloaliphatic carbon-carbon double bonds). In some embodiments, one or more active hydrogen groups and/or other functional groups present in the organic component assist with crosslinking of the composition.

The one or more active hydrogen groups can be located at any location of a compound, including, for example, at terminal ends (e.g., at an end of a polymer or oligomer backbone), at pendant locations (e.g., at locations attached at non-terminal locations of a backbone or compound), or combinations thereof. The one or more active hydrogen compounds can include one or more, two or more, three or more, or four or more active hydrogen groups located at pendant locations, and optionally in addition to one or more active hydrogen groups located at terminal locations (e.g., terminal backbone locations). In some embodiments, the organic component includes at least one AHC that includes two or more different types of active hydrogen groups, including any combination of the specific active hydrogen groups referenced herein (e.g., one or more hydroxyl groups and one or more carboxyl groups or salt groups thereof, one or more hydroxyl groups and one or more amine groups, one or more amine groups and one or more carboxyl groups or salt groups thereof, and so on).

The organic component can include compounds having any suitable acid value (i.e., greater than 0), if any. As discussed herein, in some embodiments it may be advantageous to use one or more materials including acid groups (e.g., carboxyl groups or salt groups thereof) to provide, for example, one or more of: cross-linking sites, polarity, or hydrophilicity (including, e.g., water-dispersing groups). In some embodiments, the organic component overall and/or one or more AHC included in the organic component has an acid value of at least 2, at least 5, at least 8, at least 10, at least 11, at least 12, at least 13, at least 14, at least 15, at least 16, at least 17, at least 18, at least 19, at least 20, at least 20, at least 25, at least 30, at least 40, at least 50, at least 60, at least 70, at least 80 at least 90, or at least 100 milligrams ("mg") KOH per gram ("g") of the material (whether the organic component or the AHC, as pertinent). Typically, the organic component overall and/or one or more AHC included in the organic component will have an acid value of less than 400, less than 300, less than 200, less than 150, less than 125, less than 100, less than 50, less than 30, less than 25, less than 20, less than 15, less than 10, less than 8, less than 5, or less than 1 mg KOH per gram of the material. In some embodiments, the organic component overall and/or one or more AHC included therein has an acid value of from at least about 10 to less than about 400, at least about 50 to less than about 300, or at least about 75 to less than about 250 mg KOH per gram of the material. Acid numbers are typically expressed as milligrams of KOH required to titrate a 1 gram sample to a specified end point. Methods for determining acid numbers are well known in the art, and are shown, for example, in ASTM D974-04 entitled "Standard Test Method for Acid and Base Number by Color-Indicator Titration". Acid number is conveniently measured for the feedstock(s) used to make the organic component, as opposed to attempting to measure the acid number of those ingredients after present in the fully formulated treatment composition.

The organic component overall, or one or more compounds included therein, may have any suitable hydroxyl value (i.e., non-zero), if any. As discussed herein, in some embodiments it can be advantageous to use one or more materials including hydroxyl groups to provide, for example, one or more of cross-linking sites or polarity. In some embodiments, the organic component overall and/or one or more AHC included therein has a hydroxyl value of at least 5, at least 8, at least 10, at least 15, at least 20, at least 25, at least 30, at least 40, at least 50, at least 60, at least 70, at least 80 at least 90, or at least 100 mg KOH per gram of the material. Typically, the organic component overall and/or one or more AHC included therein has a hydroxyl value of less than 400, less than 300, less than 200, less than 150, less than 125, less than 100, less than 50, less than 30, less than 25, less than 20, less than 15, less than 10, less than 5, or less than 1 mg KOH per gram of the material. In some embodiments, the organic component overall and/or one or more AHC included therein has a hydroxyl value of from at least about 5 to less than about 400, at least about 10 to less than about 200, or at least about 20 to less than about 100 mg KOH per gram of the active hydrogen component. Hydroxyl numbers are typically expressed as milligrams of potassium hydroxide (KOH) equivalent to the hydroxyl content of 1 gram of the hydroxyl-containing substance. Methods for determining hydroxyl numbers are well known in the art, and are shown, for example, in ASTM D1957-86 (Reapproved 2001) entitled "Standard Test Method for Hydroxyl Value of Fatty Oils and Acids". Hydroxyl number is conveniently measured for the feedstock(s) used to make the organic component, as opposed to attempting to measure the acid number of those ingredients after present in the fully formulated treatment composition.

In some embodiments, the organic component (and/or the overall treatment composition) includes more than 50 weight percent ("wt-%") hydroxyl-functional compounds, based on total solids. In some embodiments, the organic component (and/or the overall treatment composition) includes more than 50 weight percent ("wt-%") of carboxyl-functional compounds, based on total solids.

In aqueous embodiments in which the organic component includes hydroxyl (e.g., an acidic hydroxyl group capable of forming a salt group) and/or carboxyl-functional groups, typically at least some of the hydroxyl or carboxyl-functional groups are neutralized with base. Any suitable base can be used, although in some embodiments it may be advantageous to use a fugitive base such as, e.g., a suitable nitrogen-containing volatile base. Examples of suitable fugitive bases may include ammonium hydroxide (resulting in ammonia), amines (e.g., morpholine, dimethylethanolamine, and the like), and combinations thereof. In some embodiments, the one or more base is a metallic salt (e.g., NaOH, KOH, Ca(OH)$_2$, Mg(OH)$_2$, etc.), either alone or in combination with a fugitive base. Non-limiting examples of such bases include sodium bases (e.g., NaOH), potassium bases (e.g., KOH), and combination thereof, which may be optionally combined, for example, with non-metallic bases such as ammonia. In certain preferred embodiments, a base is used that forms a water-emulsifiable or water-soluble salt with a carboxyl-functional compound (e.g., a fatty acid having 7 or more, 8 or more, or 9 or more carbon atoms).

In some embodiments, the organic component includes a carboxyl-functional compound and another active hydrogen compound that is chemically different (e.g., an active hydrogen compound that is not carboxyl-functional, an active hydrogen compound that is carboxyl-functional but is chemically distinct in another respect, and so on).

In some embodiments, the organic component includes a first AHC having one or more, more typically a plurality of cationic group (e.g., —NH$_3^+$ or =NH$_2^+$) and a second AHC having one or more, more typically a plurality of anionic groups (e.g., —COO$^-$). In polypeptides, cationic groups may be provided, for example, by structural units derived from arginine, histidine, and lysine anionic groups from structural units derived from aspartic acid and glutamic acid. In some embodiments, the organic component includes: (i) a polysaccharide having anionic groups and a polypeptide having cationic groups and/or (ii) a polysaccharide having cationic groups and a polypeptide having anionic groups. For example, one such combination is pectin having carboxylate anionic groups and a polypeptide having, for example, structural units with cationic groups formed from arginine, histidine, and/or lysine. While not intending to be bound by theory, it is believed that pairing of such anionic and cationic groups can lead to beneficial electrostatic complexation, for example, between a polypeptide having cationic groups and a polysaccharide having anionic groups, or vice versa, which can lead to improved coating properties.

The organic component can be any suitable compound, or combination of compounds, such as a monomer or other low-molecular-weight compound (e.g., a compound having a number average molecular weight (Mn) of less than 500, less than 400, less than 300, less than 200, or less than 100 Daltons), an oligomer, a polymer, or any combination thereof. Compound(s) of the organic component can exhibit any suitable molecular weight. In some embodiments, the one or more compounds (preferably one or more AHC) exhibit an Mn of less than 100,000, less than 50,000, less than 20,000, less than 10,000, less than 8,000, less than 6,000, less than 4,000, less than 3,000, less than 2,000, less than 1,000, less than 500, or less than 200. The organic component may include one or more compounds (preferably one or more AHC) that exhibit an Mn of at least 100, at least 200, at least 500, at least 1,000, at least 2,000, at least 3,000, at least 4,000, at least 6,000, at least 8,000, at least 10,000, at least 15,000, at least 20,000, or at least 50,000. Gel permeation chromatography (GPC) using polystyrene standards is a useful method for determining Mn.

The one or more compounds of the organic component can be saturated or unsaturated. In some embodiments, the organic component includes one or more compounds having one or more non-aromatic carbon-carbon double bonds such as one or more aliphatic and/or cycloaliphatic carbon-carbon double bonds. Examples of preferred such unsaturated compounds include unsaturated fatty acids (e.g., mono- or poly-unsaturated fatty acids) and/or salts thereof, esterified compounds of such unsaturated fatty acids (e.g., glycerides), and combinations thereof. Cis double bonds are preferred double bonds for edible treatment composition embodiments.

In some embodiments, the organic component includes one or more of fatty acids and/or salts of fatty acids, which may be saturated, unsaturated (i.e., may contain one or more non-aromatic carbon-carbon double bonds), or a mixture thereof (i.e., one or more saturated fatty acids and/or salts thereof and one or more unsaturated fatty acids and/or salts thereof). The total fatty acid content of the treatment composition, if any is present, typically exhibits an iodine value of less than 400, less than 350, less than 300, less than 250, less than 200, less than 150, than 120, less than 100, less than 70, less than 50, less than 40, less than 30, less than 20, less than 15, less than 10, less than 5, less than 1, or 0 centigrams of iodine per gram of total fatty acid contents. In some embodiments, the total fatty acid content of the treatment composition, if any is present, exhibits an iodine value of greater than 0, greater than 1, greater than 5, greater than 10, greater than 15, greater than 20, greater than 30, greater than 40, greater than 50, greater than 60, greater than 70, greater than 80, greater than 90, greater than 100, greater than 120, or greater than 150 centigrams of iodine per gram of total fatty acid contents. The iodine value corresponding to total fatty acid content of the treatment composition can conveniently be determined, for example, based on iodine values of fatty acid feedstock(s) used to make the composition and the proportion of such feedstock(s) relative to one another if more than one is used. In some embodiments, the treatment composition does not include any unsaturated fatty acids or salts thereof.

In some embodiments, the treatment composition includes one or more glycerides, also commonly referred to as acylglycerols or acylglycerides. If desired, the composition can include any combination of mono-glycerides (monoacylglycerols such as 1-monoacylglycerols or 2-monoacylglcerols), di-glycerides (diacylglycerols such as 1,3-diacylglycerols or 1,2-diacylglycerols), or triglycerides (triacylglycerols). Mono-glycerides are preferred glycerides, with fatty-acid-containing mono-glycerides being particularly preferred. Preferred fatty-acid-containing mono-glycerides include 2,3-dihydroxypropyl palmitate, 1,3-dihydroxypropan-2-yl palmitate, a monolaurin (1-monolaurin and/or 2-monolaurin), and mixtures thereof. The total glyceride content in the treatment composition, if any is present, typically exhibits an iodine value of less than less than 400, less than 350, less than 300, less than 250, less than 200, less than 150, less than 120, less than 100, less than 70, less than 50, less than 40, less than 30, less than 20, less than 15, less than 10, less than 5, less than 1, or 0 centigrams of iodine per gram of total glyceride content. In some embodiments, the total glyceride content in the treatment composition, if any is present, exhibits an iodine value of greater than 0, greater than 1, greater than 5, greater than 10, greater than 15, greater than 20, greater than 30, greater than 40, greater than 50, greater than 60, greater than 70, greater than 80, greater than 90, or greater than 100, greater than 120, or greater than 150 centigrams of iodine per gram of total glyceride content. The iodine value corresponding to total glyceride content of the treatment composition can conveniently be determined, for example, based on iodine values of glyceride feedstock(s) used to make the treatment composition and the proportion of such feedstock(s) relative to one another if more than one is used. In some embodiments, the treatment composition does not include any unsaturated glycerides.

In some embodiments, the total glyceride and fatty acid content in the treatment composition, if any of either are present, exhibits an iodine value of less than 250, less than 200, less than 150, less than 120, less than 100, less than 70, less than 50, less than 40, less than 30, less than 20, less than 15, less than 10, less than 5, less than 1, or 0 centigrams of iodine per gram of total glyceride and fatty acid content. In some such embodiments, the total glyceride and fatty acid content of the treatment composition exhibits an iodine value, if any, of greater than 0, greater than 1, greater than 5, greater than 10, greater than 15, greater than 20, greater than 30, greater than 40, greater than 50, greater than 60, greater than 70, greater than 80, greater than 90, or greater than 100, greater than 120, or greater than 150 centigrams iodine per gram of total glyceride content. The iodine value corresponding to total glyceride and fatty acid content of the treatment composition can conveniently be determined, for example, based on iodine values of glyceride and fatty acid feedstock(s) used to make the composition and the proportion of such feedstock(s) relative to one another. In some embodiments, the treatment composition does not include any unsaturated glycerides or fatty acids.

The overall treatment composition can exhibit any suitable iodine value, if any. In some embodiments, the composition exhibits an iodine value of greater than 0.1, greater than 1, greater than 2, greater than 3, greater than 4, greater than 5, greater than 6, greater than 7, greater than 8, greater than 9, greater than 10, greater than 15, greater than 20, greater than 30, greater than 40, greater than 50, greater than 60, greater than 70, greater than 80, or greater than 90 or greater than 100, greater than 120, or greater than 150 centigrams of iodine per gram of solids in the treatment composition. Typically, the treatment composition exhibits an iodine value, if any, of less than 250, less than 200, less than 150, less than 100, less than 70, less than 50, less than 40, less than 30, less than 20, less than 15, less than 10, less than 5, or less than 1 centigrams of iodine per gram of solids in the treatment composition.

An example of a useful test method for determining iodine value is as follows. Prepare Starch Solution by dissolving 5 grams of soluble starch with 100 milliliters (ml) of deionized (D.I.) water. Add 400 ml of boiling D.I. water, stir until clear, and allow to cool. This solution will not keep for more than a few days and should be made fresh as needed. Prepare Potassium Iodide Solution by dissolving 150 grams of Potassium Iodide in 1,000 ml of D.I. water. A small portion of the sample under test shall be weighed by difference into an Erlenmeyer iodine flask, the amount of sample taken being such that from 10 to 30% of an iodine solution (Wijs Iodine Monochloride Solution-Fisher Scientific Co. Cat. No. SI106-4) will be absorbed. Pipette 20 ml of chloroform into each sample flask. Stopper the flasks, add a Teflon stirring bar and stir until the samples dissolve. Prepare two flasks for blanks by pipetting 20 ml of chloroform into separate flasks. Pipette into each flask (2 flasks for each sample and 2 flasks for blanks) 25 ml of the iodine solution. Stopper the flasks, stir for 30 seconds, then let stand with occasional swirling for 30 minutes in a dark place at room temperature. At the end of the standing time, pipette 20 ml of Potassium Iodide Solution and 80 ml of D.I. water, stopper and stir. Add 2 ml of the Starch Solution and immediately titrate with 0.1N sodium thiosulfate (Fisher Scientific Cat. No. SS368-1). Calculate the iodine value as the difference in the average volume (in milliliters) of 0.1N sodium thiosulfate required for the blank less the average volume (in milliliters) required for the sample, multiplied by 1.269 and divided by the sample weight in grams. The iodine value is calculated using the following equation: [(Average volume blank−Average volume sample)×1.269]/[Sample Weight in grams]. The iodine value is reported as the centigrams of iodine absorbed per 1 gram of the material.

As discussed above, in some embodiments the organic component includes a saturated or unsaturated fatty acid, both, and/or salt(s) thereof. The fatty acids can be a short-chain fatty acid (SCFA), medium-chain fatty acid (MCFA), long-chain fatty acid (LCFA), very long-chain fatty acid (VLCFA), or combination thereof. In some embodiments, one or more fatty acids are used that have a carbon chain length (including the carbonyl carbon atom) of 8 or more, 9 or more, 10 or more, 11 or more, 12 or more, 13 or more, 14 or more, 15 or more, 16 or more, 17 or more, or 18 or more carbon atoms. The one or more fatty acids typically have a carbon chain length (including the carbonyl carbon atom) of 25 or less, 22 or less, 20 or less, 19 or less, 18 or less, 17 or less, 16 or less, 15 or less, or 14 or less. In some embodiments, one or more fatty acids are used that have a carbon chain length (including the carbonyl atom) of 12 to 18 (i.e., 12, 13, 14, 15, 16, 17, and/or 18). In some embodiment even-numbered fatty acids are preferred, with C12, C16 and C18 fatty acids being particularly preferred. The organic component may also, or alternatively, include one or more fatty acids having a carbon chain length (including the carbonyl atom) of 7 to 13 (i.e., 7, 8, 9, 10, 11, 12, and/or 13).

Examples of suitable saturated fatty acids for the organic component include capronic acid, caprylic acid, capric acid, lauric acid, myristic acid, palmitic acid, stearic acid, arachic acid, behenic acid, and combinations thereof. Preferred saturated fatty acids include myristic acid, palmitic acid, stearic acid, lauric acid, and combinations thereof. In some embodiments, the organic component includes one or more antimicrobial fatty acids or salts or esters thereof, with lauric acid being particularly desirable because it is an antimicrobial agent effective against both bacteria, including gram-positive and gram-negative bacteria, and fungus.

In some embodiments, the organic component includes one or more unsaturated fatty acids, which can be mono-unsaturated fatty acids, polyunsaturated fatty acids, or a combination thereof. Preferred unsaturated fatty acids for edible embodiments include one or more or two or more cis carbon-carbon double bonds, and more preferably are free of trans carbon-carbon double bonds. Examples of preferred cis configuration monounsaturated fatty acids include 9-cis-hexadenoic acid (also referred to as palmitoleic acid), 9-cis-octadenoic acid (also referred to as oleic acid), 13-cis-decosenoic acid (also referred to as erucic acid), and combinations thereof, with oleic acid being particularly preferred due to its ample supply and low cost. In some embodiments, it may be advantageous to use one or more polyunsaturated fatty acids selected from omega-3-fatty acids, omega-6-fatty acids, or a mixture thereof—typically, one or more isomer of linoleic acid, one or more isomer of linolenic acid, or a combination thereof. In certain edible embodiments, it is preferred to use only isomers of linoleic acid and/or linolenic acid in which all of the carbon-carbon double bonds are in the cis configuration. Other suitable cis configuration polyunsaturated acids may include 5,8,11,14-all-cis-eicosatetraenoic acid (also referred to as arachidonic acid), eicosapentaenoic acid ("EPA") ($C_{20}H_{30}O_2$), and docosahaxaenoic acid ("DHA", $C_{22}H_{32}O_2$). Examples of preferred polyunsaturated fatty acids include a non-conjugated linoleic fatty acid (preferably a cis, cis isomer), a conjugated linoleic fatty acid (preferably a cis, cis isomer), an alpha-linolenic fatty acid (preferably a cis, cis, cis isomer), a gamma-linolenic fatty acid (preferably a cis, cis, cis isomer), isomers of any of these, or a combination thereof. Examples of feedstock sources of linoleic fatty acid include safflower, sunflower, soya, rapeseed, and canola. Examples of feedstock sources of linolenic acid include flaxseed, walnut, chia, hemp, rapeseed, canola, and *perilla*.

In some embodiments in which the treatment composition includes fatty acid, at least some, a majority, or even all of the fatty acid is present in an at least partially esterified form (e.g., glyceride form or other esterified form such as described further below). Thus, for example, any of the fatty acids described above can be used in any suitable glyceride form, with mono-glycerides (i.e., fatty acid mono-esters of glycerol) being a preferred glyceride form.

In some embodiments, the organic component includes an alkali soluble polymer, which preferably can be washed away from a substrate using an aqueous wash (e.g., a mixture of water and ammonia). Examples of commercially available such alkali soluble polymers include the JONRYL 60 and 63 acrylic resin products from BASF.

In some embodiments, the organic component includes one or more, two or more, three or more, or four or more hydroxyl-functional lipids. Examples of suitable hydroxyl-functional lipids include fatty acids that include one or more hydroxyl groups and fatty acid esters that include one or more hydroxyl groups in a fatty acid portion and/or other portion. Examples of hydroxyl-functional fatty acid esters include glycerides having one or more fatty acid structural units (e.g., monoglycerides) or two or more fatty acid structural units (e.g., diglycerides). The organic component can include any of the fatty acids or fatty acid monoglycerides or other monoesters disclosed in WO2020/051238 (by Braden et al.), each of which is incorporated by reference herein, including any of the depicted formulas or structures (see, e.g., Formula I in claims 1 or 2 and the specific compounds depicted in claims 12 or 18).

Examples of suitable monoglycerides include those having the structure of either of the structures of Formula 1a (structure on left) or 1b (structure on right) below:

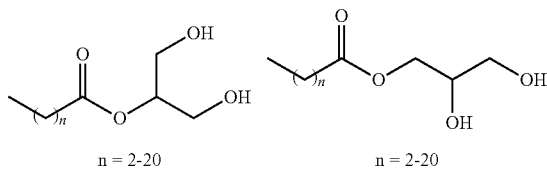

n = 2-20          n = 2-20

Preferred "n" are as described previously herein for the carbon chain length of fatty acids (not counting the carbonyl carbon). Although the above structures depict saturated, unsubstituted fatty acid chains, the fatty acid chains may include one or more groups or atoms in place of hydrogen and may include one, two, or three of more carbon-carbon double bonds. For example, in some embodiments, one or more active hydrogen groups (e.g., hydroxyl groups) or other functional groups (e.g., an oxygen atom to form an oxirane group) are present as substituents in place of one or more hydrogen in the depicted —$CH_2$— groups.

2,3-dihydroxypropyl palmitate, 1,3-dihydroxypropan-2-yl palmitate, 2,3-dihydroxypropyl stearate (e.g., CAS Registry No. 123-94-4), 1,3-dihydroxypropan-2-yl stearate (e.g., CAS Registry No. 621-61-4), 1-monolaurin, 2-monolaurin, and mixtures thereof are examples of preferred monoglycerides, and are each shown below:

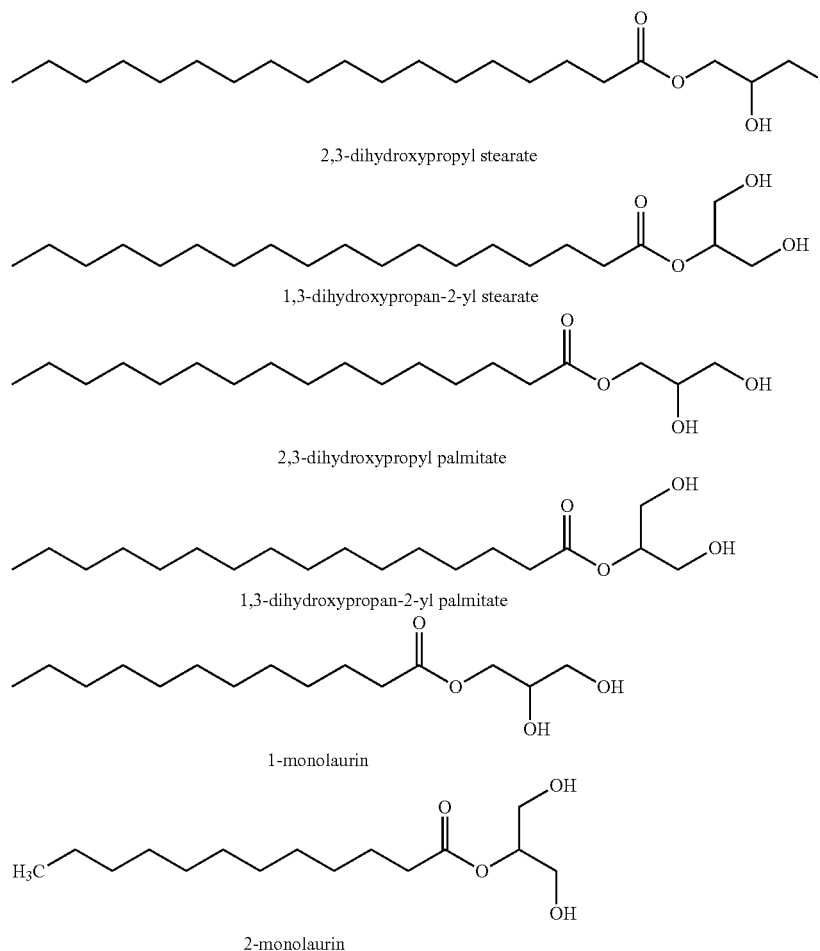

In some embodiments, a glyceride is used having one or more fatty acid portions that includes a functional group, preferably a reactive functional group. Examples of suitable functional groups include functional groups including one or more heteroatoms (e.g., O, N, P, S, or Si) or aliphatic or cycloaliphatic carbon-carbon double bonds.

In some embodiments one or more of the glycerides, preferably monoglycerides, are derived from grape seeds. A representative manufacturing process for preparation of a mixture of monoacylglycerides is provided in FIG. 2.3 of GRAS Notice No. 886, which is accessible online on the FDA's website. See also, for example, GRAS Notice No. 648, which is accessible online on the FDA's website. The EDIPEEL product commercially available from Apeel of Goleta, California is an example of a commercially available coating product based on such materials, and according to GRAS Notice No. 648 is a mixture of monoacylglycerides and primarily containing 2,3-dihydroxypropyl palmitate and 1,3-dihydroxypropan-2-yl palmitate. In some embodiments, the EDIPEEL product or a similar chemical composition is the base treatment composition to which one or more additional ingredients disclosed herein (e.g., the binding component) are included.

In some embodiments, the treatment composition includes one or more mono-, di-, and/or tri-esters (more typically monoesters) of a fatty acid and a hydroxyl-functional compound other than glycerol, where the monoester (and/or di-ester and/or tri-ester) includes one or more, preferably two or more, more preferably three of more active hydrogen groups (e.g., hydroxyl group(s)). Preferably, the monoester comprises an active hydrogen group capable of forming a salt (e.g., a carboxyl group or an acidic hydroxyl group), with such group preferably located on a structural unit derived from the hydroxyl-functional compound. The hydroxyl-functional compound is preferably one or both of: i) more polar than glycerol and (ii) more soluble in water than glycerol (e.g., under ambient conditions). The hydroxyl-functional compound other than glycerol may be saturated or unsaturated and preferably has three or more active hydrogen groups, more preferably four or more (e.g., for our more hydroxyl groups). Ascorbic acid, or a salt thereof, is a preferred example of such a hydroxyl-functional compound other than glycerol. The monoester, which may optionally be a salt (e.g., an ammonium salt), may be derived from any suitable saturated or unsaturated fatty acid, although typically the fatty acid will be a C12 or higher fatty acid. Typically, and especially in water-based coating embodiments, the monoester is derived from a C20 or lower fatty acid, preferably C18 or lower, more preferably C12, C14, or C16 or C18. Preferred such monoesters include ascorbyl laurate, ascorbyl myristate, ascorbyl palmitate, ascorbyl stearate, a salt thereof (e.g., an ammonium salt of ascorbyl palmitate and/or an ammonium salt of ascorbyl stearate), or a combination thereof. The treatment composition can include any suitable amount of one or more such monoesters. In some embodiments, more than 50 wt-%, more then 60 wt-%, more than 70 wt-%, more than 80 wt-%, more than 90 wt-%, more than 95 wt-%, more than 99 wt-%, or up to about 100 wt-% of the lipid (or the total solids) present in the treatment composition is a monoester of a fatty acid and a hydroxyl-functional compound other than glycerol.

In some embodiments, the organic component includes one or more of lauric acid and/or a salt thereof, one or more of a glycerol laureate (i.e., a monoacylglyceride, diacylglyceride, or triacylglyceride in which at least one fatty acid chain, or all fatty acid chains, is a lauric acid fatty acid chain) or a combination thereof. Monolaurin is a preferred glycerol laureate. As used herein, unless indicated otherwise, the term "monolaurin" refers to 1-monolaurin (i.e., in which the fatty acid chain is positioned at the 1 or 3 position of glycerol), 2-monolaurin, or a mixture thereof in any proportion. In preferred embodiments, the one or more lauric acid and/or glycerol laureates are bio-sourced (e.g., derived from coconuts).

In some embodiments, the treatment composition includes (a) one or more monoesters, typically one or more fatty acid monoesters, more typically one or more monoacylglycerols and/or one or more fatty-acid monoester of ascorbic acid or salts thereof and (b) one or more fatty acids and/or salts thereof. In some such embodiments, the treatment composition includes more than 50 wt-% of (a), based on the combined weights of (a) and (b). For example, the treatment composition can include (a) from 50 to 99 wt-% (e.g., 60 to 95 wt-% or 70 to 90 wt-%) of a first group of compounds selected from one or more monoesters of fatty acids (e.g., fatty acid monoglycerides) and (b) from 1 to 50 wt-% (e.g., 5 to 40 wt-% or 10 to 30 wt-%) of a second group of compounds selected from one or more fatty acids and/or fatty acid salts (preferably fatty acid salts), based on the total combined weight of components (a) and (b). In other such embodiments, the treatment composition includes more than 50 wt-% of (b) (e.g., from 50 to 99 wt-%, 60 to 95 wt-% or 70 to 90 wt-% of (b)), based on the combined weights of (a) and (b). When used, the total combined amounts of components (a) and (b) in the treatment composition typically comprises at least 20 wt-%, at least 30 wt-%, at least 40 wt-%, at least 50 wt-%, at least 60 wt-%, at least 70 wt-%, at least 80 wt-%, at least 85 wt-, at least 90 wt-%, at least 95 wt-%, at least 96 wt-%, at least 97 wt-%, at least 98 wt-%, at least 99 wt-%, or at least 99.9 wt-% of the total solids present in the treatment composition.

In some embodiments, the treatment composition, based on total solids, includes at most 10 wt-%, at most 5 wt-%, at most 2 wt-%, at most 1 wt-%, or at most 0.1 wt-%, if any, monoester compounds not having an active hydrogen group (e.g., waxes such as monoesters of a fatty acid and fatty alcohol).

In some embodiments, the treatment composition includes, based on the combined weight of glyceride (preferably a glyceride of a saturated or unsaturated fatty acid, more preferably a mono-glyceride of a saturated or unsaturated fatty acid) and carboxyl-functional AHC(s), at least: 0.1, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 weight percent of one or more carboxyl-functional AHC.

In some embodiments, the treatment composition includes, based on the combined weight of glyceride (preferably a glyceride of a saturated or unsaturated fatty acid, more preferably a mono-glyceride of a saturated or unsaturated fatty acid) and carboxyl-functional active hydrogen component, no more than: 99.9, 99, 98, 97, 96, 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, or 0.5 weight percent of one or more carboxyl-functional AHC.

In preferred embodiments, the treatment composition comprises less than 10 wt-%, less than 5 wt-%, or less than 1 wt-%, if any, of diacylglycerides, based on the weight of total solids present in the treatment composition.

In some embodiments, the treatment composition includes less than 10 wt-%, less than 5 wt-%, or less than 1 wt-%, if any, of triacylglycerides, based on the weight of total solids present in the treatment composition.

In some embodiments, the treatment composition comprises less than 10 wt-%, less than 5 wt-%, or less than 1 wt-%, if any, of monoacylglycerides, based on the weight of total solids present in the treatment composition.

In some embodiments, the organic component includes one or more polysaccharides, one or more polypeptides, or a combination thereof, which typically include a plurality of active hydrogen groups. Preferred such materials include carboxyl-functional polysaccharides and carboxyl-functional polypeptides, which may optionally contain one or more active hydrogen groups in addition to carboxyl groups or salt groups thereof, with pectin and derivatives thereof and gelatin and derivatives thereof being exemplary such compounds. In some embodiments, the organic component includes one or more carboxyl-functional lipids and one or more carboxyl-functional polysaccharides and/or carboxyl-functional polypeptides.

Examples of polypeptides for use in the organic component include gelatin, zein, globulin, albumin (e.g., ovalbumin and/or conalbumin), whey protein, casein, hemp protein, brown rice protein, alfalfa protein, chia protein, pea protein, flax protein, silk fibroin (e.g., silk fibroin), soy protein, egg white powder, isinglass, other protein isolates, and mixtures thereof. In some embodiments, the organic component includes an amphiphilic polypeptide. Examples of silk fibroin and barrier coating compositions including silk fibroin are provided in U.S. Publ. No. 2020/0178576. In some embodiments, preferred polypeptides are carboxyl-functional polypeptides such as those containing, and more preferably rich in, structural units provided by amino acids such as aspartic acid and/or glutamic acid. In some embodiments, preferred polypeptides are amino- and amide-functional polypeptides such as those containing, and more preferably rich in, structural units provided by amino acids such as arginine, asparagine, glutamine, histidine, lysine, and combinations thereof.

Examples of suitable polysaccharides may include pectin, alginate, carrageenan, arabinoxylan, chitin, chitosan, *psyllium*, cellulose (e.g., carboxy methyl cellulose), hyaluronic acid, agarose, agaropectin, salts or derivatives thereof, and mixtures thereof. In some embodiments, a cellulose such as a nanocellulose (e.g., cellulose nanofiber) may be used. Pectin is an example of a preferred polysaccharide. In some embodiments, the organic component includes a polysaccharide including xylose structural units, arabinose structural units, or combinations thereof. Polysaccharides included in the treatment compositions of the present disclosure can include any suitable side functional groups including, for example, one or more, two or more, or three or more selected from hydroxyl groups, carboxyl groups (or salts or alkyl esters thereof), amine group, and amide groups. Carboxyl-functional polysaccharides are preferred in some embodiments such as, for example, polysaccharides having any of the acid number disclosed herein. The pectin used may be either high methoxy ("HM") pectin having a degree of esterification ("DE") of 50 or above (e.g., 60 or above, 70 or above, 80 or above, etc.) or low methoxy ("LM") pectin having a DE of less than 50 (e.g., less than 40, less than 30, less than 20, less than 10, etc.), or a mixture thereof. The pectin may also be either amidated or non-amidated, or a mixture thereof. While not intending to be bound by theory, an advantage of using pectin in the organic component is pectin can provide a clean mouth feel if any were to carryover into the ultimate processed product (e.g., as opposed to a slimy mouth feel), as well as enable crosslinking. Preferred pectins for use in food-contact and/or edible embodiments of the present disclosure are derived from edible feedstocks (e.g., apple pomace, citrus peels, plums, or gooseberries).

As discussed above, in some embodiments, the treatment composition is a hybrid treatment composition that includes one or more lipids and one or more non-lipid oligomers or polymers. In preferred such embodiments, the organic component includes both a lipid having one or more active hydrogen groups and a non-lipid material (e.g., a non-lipid oligomer or polymer) having one or more, and preferably a plurality, of active hydrogen groups. Preferred non-lipid materials include polypeptides, polysaccharides, and combinations thereof. The one or more lipids (e.g., a saturated or unsaturated: fatty acid, monoglyceride, diglyceride, oil, wax, phospholipid, derivative thereof (e.g., salt thereof), or mixture thereof) are preferably present in the hybrid treatment composition in an amount of at least 1 wt-%, at least 2 wt-%, at least 5 wt-%, least 10 wt-%, at least 15 wt-%, at least 20 wt-%, at least 25 wt-%, or at least 30 wt-% to no more than 80 wt-%, no more than 70 wt-%, no more than 60 wt-%, no more than 55 wt-%, no more than 50 wt-%, no more than 45 wt-%, no more than 40 wt-%, no more than 35 wt-%, or no more than 30 wt-%. The one or more non-lipid material (preferably non-lipid oligomer or polymer AHC (e.g., a saturated or unsaturated biopolymer having one or more active hydrogen groups) such as, for example, a polysaccharide (e.g., pectin, alginate, carrageenan, arabinoxylan, chitosan, carboxy methyl cellulose and/or *psyllium*), a polypeptide (e.g., gelatin, zein, albumin, globulin, whey protein, casein, hemp protein, brown rice protein, alfalfa protein, chia protein, pea protein, silk fibroin, soy protein, and/or flax protein), or a combination thereof) are preferably present in an amount of at least 20 wt-%, at least 30 wt-%, at least 40 wt-%, at least 45 wt-%, at least 50 wt-%, at least 55 wt-%, at least 60 wt-%, at least 65 wt-%, or at least 70 wt-% to no more than 99 wt-%, no more than 98 wt-%, no more than 95 wt-%, no more than 90 wt-%, no more than 85 wt-%, no more than 80 wt-%, no more than 75 wt-%, to more than 70 wt-%. The above weight percentages (wt-%) for (i) lipid and (ii) non-lipid materials in hybrid treatment compositions are based on the total combined amounts of components (i) and (ii) in the treatment composition. In preferred such hybrid coating embodiments, the total combined amounts of components (i) and (ii) in the treatment composition comprises at least 50 wt-%, at least 60 wt-%, at least 70 wt-%, at least 80 wt-%, at least 85 wt-%, at least 90 wt-%, at least 95 wt-%, at least 96 wt-%, at least 97 wt-%, at least 98 wt-%, at least 99 wt-%, or at least 99.9 wt-% of the total solids present in the treatment composition.

To ensure good compatibility between the lipid and non-lipid materials, in some embodiments, it may be advantageous to include one or more compatibilizers in the treatment composition that show good affinity to both one or more of the lipid and one or more of the non-lipid materials (e.g., polysaccharides and/or polypeptides). For example, a suitable compatibilizer may be a compound (preferably an edible compound in some embodiments) that includes one or more structural portions showing good compatibility with polysaccharides and/or polypeptides and one or more other structural portions showing good compatibility with lipids. For example, such a compatibilizer may have one or more structural portions with polarity properties that are substantially matched to that of the polysaccharide and/or polypeptide and one or more other structural portions have polarity properties that are substantially matched to that of the lipid material.

In some embodiments, at least some, or substantially all or all, of the organic component is provided by one or more of: coconut milk, coconut water, dehydrated coconut milk, dehydrated coconut water, a coconut milk extract (e.g., with one or more compounds removed or reduced other than water), a coconut water extract (e.g., with one more compounds removed or reduced other than water), a nut extract, or a combination thereof.

In some embodiments, the organic component includes a synthetic dimer (e.g., a dimer fatty acid), synthetic oligomer, synthetic polymer, or a combination thereof. Such materials can be included in addition, or as an alternative, to the other ingredients for the organic component disclosed herein (e.g., biosourced polysaccharides, polypeptides, and/or lipids). Examples of useful synthetic polymers may include a polyester, an alkyd, an addition polymer (e.g., a free-radical polymerized addition polymer such as a vinyl polymer, an emulsion polymerized latex polymer, an organic-solution polymerized acrylic, a poly(acrylic acid), or the like), or a copolymer and/or mixture thereof.

The treatment composition can include any suitable amount of one or more additives. Preferably, each of the one or more additives is present in an efficacious amount. Examples of suitable such additives may include, for example, anti-microbial agents (e.g., anti-bacterial and/or anti-fungal), insecticides or other pesticides, or a plant nutrient. In some embodiments, the treatment composition includes one or more additive in a concentration of least 0.01 parts-per-million ("ppm"), at least 0.1 ppm, at least 1 ppm, at least 10 ppm, at least 20 ppm, at least 50 ppm, at least 100 ppm, at least 250 ppm, at least 500 ppm, at least 1,000 ppm, at least 1,500 ppm, at least 2,000 ppm, or at least 2,500 ppm, based on the total weight of the composition.

The one or more treatment composition may include one or more wetting additives, preferably in efficacious additive amounts, to help improve the wetting out of the surface to be coated. Examples of wetting additives may include monoacylglycerides, lysophospholipids, glycoglycerolipids, glycolipids, ascorbyl esters of a fatty acid, esters of lactic acid, esters of tartaric acid, esters of malic acid, esters of fumaric acid, esters of succinic acid, esters of citric acid, esters of pantothenic acid, sucrose ester of a fatty acid, dioctyl sodium sulfosuccinate, and fatty alcohol derivatives.

The one or more treatment composition may include one or more thickeners. When used, the thickener is preferably used in an efficacious amount, for example, to increase the viscosity of the treatment composition, increase stability of the treatment composition, and/or reduce or prevent tackiness or stickiness of the hardened surface-deposited treatment. The one or more thickeners are typically used in an amount of at least 0.1 wt-%, at least 1 wt-%, at least 2 wt-%, or at least 5 wt-%, based on total solids in the one or more treatment composition. The one or more thickeners are typically present in an amount of less than 30 wt-%, less than 20 wt-%, less than 10 wt-%, or less than 5 wt-% of total solids in the one or more treatment composition. Examples of thickeners include a polysaccharide (e.g., a starch, a vegetable gum, *psyllium*, or pectin), a polypeptide, or a mixture thereof such as, for example, guar gum, agar-agar, arrowroot starch, cornstarch, katakuri starch, potato starch, sago starch, tapioca, alginin, guar gum, locust bean gum, xantham gum, carrageenan, carboxymethyl cellulose, and mixtures thereof.

In some embodiments, the one or more treatment composition includes one or more antimicrobial agents (e.g., in addition to any ethanol that may optionally be present in the treatment composition). Examples of suitable antimicrobial agents may include citric acid, malic acid, ascorbic acid, erythorbic acid, sorbic acid, thiodipropionic acid, ascorbyl palmitate, lauric acid, monolaurin, parabens (e.g., methyl and ethyl parabens), nisin, benzoic acid, triclosan, other weak acids or salts thereof, or a combination thereof. In preferred embodiments, an edible antimicrobial agent is used. Preferred antimicrobial agents are GRAS listed for direct or indirect food-contact, more preferably direct food-contact and/or as a direct food-additive. Additional examples of antimicrobial agents that may have utility in compositions of the present disclosure include clove oil, clove extract, vanilla extract, lemongrass oil, a terpene, a terpenoid, a phenol compound, a spearmint oil, thyme, curcumin, carvacrol, bay leaf oil, peppermint oil, acacia oil, oil of winter green, limonene, eugenol, eucalyptol, menthol, farnecol, carvone, hexanal, thyme oil, dill oil, oregano oil, orange peel oil, neem oil, lemon peel oil, cumin seed extract, rosemary oil, thymol, eugenyl acetate, vanilla oil, citronellal, methyl salicylate, methyl jasmonate, vanilla, and derivatives and combinations thereof. When selecting such antimicrobial agent(s) or other additive(s), care should be used to ensure that the particular antimicrobial agent (e.g., terpene, spearmint oil, and the like) or other additive(s) are not used in an amount that could negatively impact the organoleptic properties of wine resulting from treated grapes. Examples of suitable fungicides, in addition or alternative to the aforementioned antimicrobials, some of which are fungicides, may include thiabendazole ("TBZ"), ortho-phenylphenol ("OPP"), sodium ortho-phenylphenate ("SOPP"), enilconazole, fludioxonil, propiconazole, azoxystrobin, difenoconazole, and mixtures thereof. In some embodiments, honey may be used as an antimicrobial, with raw honey being preferred for its enhanced antimicrobial activity relative to conventional processed honey. In some embodiments, a selenium-containing antimicrobial agent can be used such as, for example, the SELDOX materials available from SelenBio of Austin, Texas. Preferred selenium-containing antimicrobial agents are organoselenium compounds that are preferably capable of catalytically creating an antimicrobial effect via, for example, reactions between oxygen and thiols. Examples of such selenium-containing antimicrobial agents are provided in U.S. Pat. Nos. 8,236,337 and 9,370,187.

When present, such antimicrobials are typically used in a concentration of at least about 10 part-per-billion (ppb), at least about 50 ppb, at least about 100 ppb, at least about 500 ppb, at least 1 part-per-million (ppm), or at least 10 ppm. The maximum amount can vary widely depending upon the particular antimicrobial compound(s) used, but will typically be less than about 2 wt-%, less than about 1 wt-%, less than about 0.1 wt-%, less than about 100 ppm, less than about 50 ppm, less than about 20 ppm, less than about 10 ppm, or less than about 5 ppm.

The one or more treatment composition may also include one or more emulsifiers. Examples of suitable emulsifiers may include lecithin (e.g., lecithin from soy, sunflower, or canola feedstocks), a sucrose ester of fatty acids (see, e.g., the line of food-grade sucrose ester emulsifiers commercially available from Sistema B.V.), mono- and diglycerides, propylene glycol monoesters, lactylated esters, polyglycerol esters, sorbitan esters, fruit acid esters, acetylated monoglycerides, phosphate esters, an ester of citric acid (e.g., an ester of citric acid and glycerol such as citric acid mono-esterified, di-esterified, or tri-esterified with glycerol; stearyl citrate), a grape seed extract emulsifier, sucrose acetate isobutyrate, dioctyl sodium sulfosuccinate, glycerol monostearate, glycerol monooleate, glycerol palmitostearate, a phosphatidic acid, a phosphatidylcholines, a phosphatidylcholine, a phosphatidylcholine, or a combination thereof. In some embodiments, canola lecithin such as that described in GRAS Notice No. 682 (by Cargill) is used. In some embodiments, the emulsifier is a fatty acid carboxylic acid salt (e.g., any of those described herein), a phosphate salt (e.g., any of those described in International Publ. No. WO2021/252403) or a combination thereof.

The one or more treatment composition may optionally include one or more adhesion promoters in an efficacious amount (e.g., in an amount sufficient to measurably improve adhesion). Higher molecular weight adhesion promoting compounds (e.g., monomers, oligomers, and/or polymers) can be used at higher concentrations, if desired. Suitable adhesion promoters may include phosphoric acid, a phospholipid, any other suitable phosphorylated edible compound, or a combination thereof. While not intending to be bound by theory, it is believed that certain phosphorus-containing compounds can beneficially associate with natural endogenous metal compounds (e.g., iron compounds) present in the plant skin.

Any of the ingredients or compositions disclosed in International Publ. No. WO2021/252403, the entire contents of which are incorporated herein by reference, may be used in conjunction with the treatments of the present disclosure.

In some embodiments, the one or more treatment composition is an emulsion such as, for example a so called "oil-in-water" emulsion or a "water-in-oil" emulsion, with oil in water being preferred due to cost and VOC considerations. Thus, for liquid coating composition embodiments, the continuous phase may be either organic-solvent-based or water-based. In some embodiments, the composition comprises a miniemulsion (preferably oil-in-water), which is also sometimes referred to as a nanoemulsion. The emulsion may also be modified to include a dispersant or colloid stabilizer (e.g., glycerol, lipid, lecithin, sodium lauryl sulfate, an oligosaccharide, a polysaccharide, or any of the emulsifiers referenced in Food Emulsifiers and Their Applications, Springer-Science+Business Media, B. V., 1997, edited by Gerard L. Hasenhuettl and Richard W. Hartel).

The one or more treatment composition may also include other optional ingredients that do not adversely affect the treatment composition or a dried coating resulting therefrom. Such optional ingredients are typically included to enhance composition esthetics, to enhance composition nutrition or health benefits, to facilitate manufacturing, processing, handling, and application of the composition, and to further improve a particular functional property of a treatment composition or a dried coating resulting therefrom. Examples of such other optional ingredients that may be included in compositions of the present disclosure include a plasticizer, a wax, an amino acid, a dispersing agent, an anti-microbial agent, a probiotic, a vitamin or other nutrient, an enzyme, plant hormone, a colorant, an oxygen-scavenging agent, a compatibilizer, a leveling agent, a wetting agent, an adhesion promoter, an antioxidant, a thickening agent, an antifoaming agent, a surfactant, an evaporation inhibitor, a pH modifier (buffers, acids, and bases), or combinations thereof.

In some embodiments, the one or more treatment composition includes a plasticizer. Any suitable plasticizer may be used. Examples of suitable plasticizers may include glycerol, a fatty acid, an oil (preferably an edible oil, more preferably an edible plant-based oil), sorbitol, a polyalkylene glycol (e.g., a propylene glycol, a polyethylene glycol (e.g., having number average molecular weights of 400 to 10,000), and the like), triethyl citrate, triacetin, diethyl sebacate, dibutyl sebacate, glycol monostearate, or a mixture thereof. The plasticizer can be a polyol such as, for example, a polyol having a molar mass of less than 500 g/mol, less than 400 g/mol, less than 300 g/mol, less than 200 g/mol, or less than 100 g/mol.

Any suitable amount of plasticizer may be used, if any. When used, the one or more treatment composition will typically include at least about 2 wt-%, at least about 5 wt-%, at least about 10 wt-%, at least about 15 wt-%, or all least about 20 wt-% of plasticizer, based on the weight of total solids present in the composition. The upper amount of plasticizer is not particularly limited. When used, the one or more treatment composition will typically include no more than about 50 wt-%, no more than about 40 wt-%, no more than about 30 wt-%, no more than about 20 wt-%, no more than 15 wt-%, or no more than 10 wt-% of plasticizer, based on the weight of total solids present in the treatment composition.

In some embodiments, the one or more treatment composition includes one or more compounds capable of preferentially interacting or associating with another component of the treatment composition such as, for example, via a functional group (e.g., an active hydrogen group) present on the component, which preferably results in one or more desirable coating properties when enough such interactions occur. For example, the interaction or association can be a covalent bond formation, an ionic interaction (e.g., an ionic bond formation such as a salt bridge), or another type of association (e.g., Van der Waals bonding) that may optionally, and preferably in some embodiments, be reversible. For example, in certain embodiments, the treatment composition includes one or more compounds capable of coordinating, complexing and/or chelating (hereinafter "coordinating" for brevity) with one of more active hydrogen compounds via, for example, one or more active hydrogen groups such as salts of carboxyl groups (e.g., carboxylates). Examples of such compounds include polyvalent metal compounds. Preferred polyvalent metal compounds are capable of entering into a "crosslinking" reaction, which is reversible in some embodiments. While not intending to be bound by theory, in some embodiments, the crosslinking reaction may be a coordination or chelation that does not result in a covalent linkage. For convenience, herein the polyvalent metal compound is referred to as a "polyvalent metal crosslinking agent" or "PMCA" for short.

In some embodiments, the PMCA is present in one or more modifier compositions used to modify a base treatment composition. Such a multi-part methodology avoids potential pot-life storage stability issues.

In some embodiments, the PMCA includes a metal atom, such as, e.g., a transition metal atom, in a form (e.g., an oxidation state) capable of coordinating with an active hydrogen group (e.g., a carboxylic acid or carboxylate group) under ambient conditions (e.g., 25° C. and 50% relative humidity) to form a reversible crosslink.

Preferred PMCAs include a polyvalent metal atom such as bismuth (Bi), calcium (Ca), cobalt (Co), iron (Fe), magnesium (Mg), manganese (Mn), zinc (Zn), or a combination thereof. Although edible PMCAs are preferred, it is within the scope of the invention, in for example embodiments in which the coating composition is not intended for human consumption, to use PMCAs including polyvalent metals such as, for example, beryllium, cadmium, copper, zirconium, barium, strontium, aluminum, antimony, nickel, tin, tungsten, and the like. The polyvalent atom is preferably present in the PMCA in a form (e.g., an oxidation state) that facilitates crosslinking with one or more active hydrogen compounds. Although the PMCA can be of any suitable form, it is typically a complex or an oxide of a polyvalent metal. Accordingly, the PMCA may be an organometallic compound, a fully inorganic compound, or a mixture thereof. In some embodiments, the PMCA is a salt. The PMCA may be either soluble or insoluble in water. When insoluble, the PMCA may be provided as finely divided powder, which may optionally be suspended or otherwise dispersed in liquid coating compositions. In some embodiments, the PMCA may be provided as a colloid.

In some embodiments, the treatment of the present disclosure may fulfill one or more purposes other than wildfire smoke protection, thereby eliminating the need for the application of one or more other agricultural treatments. For example, the treatment may also function as a fungicide, an insecticide, a pesticide, a hormonal treatment (e.g., including a pheromone), a fertilizer, or a protectant against sunburn or cracking, thereby reducing or eliminating the need to apply a separate such treatment. Thus, in some embodiments, the treatment composition includes one or more agrochemicals such as a fungicide, an insecticide or other pesticide, a hormone (e.g., a pheromone), a herbicide, a fertilizer or other nutrient for plants, or a combination thereof. Examples of agrochemicals are provided in Intl. Publ. No. WO2019/215645 and U.S. Publ. No. 2021/0212321. Some or all of the agrochemical may optionally be complexed with one or more ingredients of the binding component. For example, some or all of the one or more agrochemicals (e.g., one or more lipophilic agrochemicals) may be complexed (e.g., as a so-called "guest molecule") with cyclodextrin, zeolite, clay mineral, perlite, metal-organic framework, or any other suitable microporous adsorbent material included in the treatment composition.

In some embodiments, the coating treatment may include one or more compounds capable of functioning as a fertilizer, plant nutrient, or herbicide. Such agrochemical(s) may reach the soil to be accessible by plant roots either via one or more of: over-spray when the treatment composition is initially applied; washing away of the deposited treatment composition from agricultural products to due environmental forces such as rain, fog, or condensation; or intentional washing away of the treatment composition via application of water or other removal treatment. Examples of fertilizer compounds may include suitable nitrogen-containing and/or phosphorus containing compounds such as urea, ammonium phosphate, or the like. etc.

The one or more agrochemical(s) may be included in any suitable amount, including any of those already disclosed herein in the context of particular additives. When used, the one or more agrochemical(s) are preferably each present in the one or more treatment compositions in an efficacious amount. In some embodiments, the one or more treat composition includes at least 0.01 ppm, at least 0.1 ppm, at least 1 ppm, at least 25 ppm, at least 100 ppm, at least 250 ppm, at least 500 ppm, or at least 1,000 ppm of the one or more agrochemicals. While the upper amount is not particularly limited, in some embodiments, the one or more agrochemicals are each present in an amount of less than 10,000 ppm, less than 5,000 ppm, less than 4,000 ppm, less than 3,000 ppm, less than 2,000 ppm, less than 1,000 ppm, or less than 500 ppm.

By way of further example, in some embodiments, the treatment includes cyclodextrin (or another binder component ingredient) complexed with a fungicide, preferably a fungicide for grapes (e.g., a fungicide effective for preventing and/or treating powdery mildew or *Botrytis* on grapes). In some embodiments, the fungicide is an organic fungicide, which may optionally be lipophilic to better complex with cyclodextrin or another cyclic saccharide component present in the composition. While not intending to be bound by theory, once present on the treated grape surfaces, it is believed that the fungicide will liberate over time, thereby making additional cyclodextrin cavities (or other binder component cavities) available for purpose of binding wildfire compounds.

In some embodiments in which one or more agrochemicals are used, and particularly one or more lipophilic agrochemicals, it may be desirable to use an excess of cyclodextrin relative to the one or more agrochemicals (e.g., fungicide, insecticide, pesticide, and/or hormone) such that at least some cyclodextrin cavities are unoccupied upon application of the treatment to the agricultural product and available to complex wildfire smoke compounds. While not intending to be bound by theory, it is believed that a larger number of cyclodextrin cavities will become available over time as the one or more agrochemicals migrate out of the cavities. In some embodiments, the treatment composition includes a molar excess of cyclodextrin relative to the one or more agrochemicals, such as, for example, more than 1, more than 1.1, more than 1.2, more than 1.3, more than 1.5, more than 2, more than 3, more than 4, more than 5, more than 10, more than 20, more than 50, or more than 100 moles of cyclodextrin per mole of agrochemical (e.g., lipophilic organic agrochemical). In some embodiments, the treatment composition includes at least 0.01, at least 0.2, at least 0.05, at least 0.1, at least 0.2, at least 0.25, at least 0.4, at least 0.5, at least 0.6, at least 0.8, or at least 0.9 moles of agrochemical (e.g., lipophilic organic agrochemical) per mole of cyclodextrin.

As previously discussed, preferably at least a majority, more preferably substantially all, or all, of the surface-deposited treatment is removed prior to consumption of the agricultural product, and in the case of wine grapes, preferably prior to crushing. In some embodiments, such removal may occur prior to or during harvest. Any suitable wash composition may be used to facilitate removal. In some embodiments, well water or tap water may be used. In other embodiments, a wash solution may be used that incorporates one or more materials other than water.

While not intending to be bound by theory, in some embodiments, the use of neat well or tap water may cause the treated fruit or other agricultural product to unsuitably swell. In the case of wine grapes, such swelling may cause the cuticle to crack and/or result in undesirable dilution of resulting wine. Thus, in some embodiments, it may be advantageous to use a wash solution that substantially avoids swelling (e.g., causes the treated agricultural product to swell by no more than: 2% by volume, 1% by volume, 0.5% by volume, 0.1% by volume, if any). In some embodiments, a wash solution may be used having a solute concentration that is substantially matched to that of the treated agricultural product (e.g., wine grapes) to substantially avoid diffusion of water into the agricultural product. This may be achieved, for example, by using a wash solution having an osmotic potential substantially matching that of the osmotic potential of the agricultural product. In the case of wine grapes, care should be used to select one or more solutes that will not negatively impact the sensory profile of the resulting wine. It may be advantageous for the one or more treatment compositions of the present disclosure to have a color, or other visual parameter (e.g., glossiness level), that is different from the color, or other visual parameter, of the agricultural product to be treated to enable easy visualization as to whether the agricultural product has been effectively treated. Similarly, the treatment coloration or other visual parameter can also enable easy visualization as to whether the surface-deposited treatment has been effectively removed after any wash step(s). In some embodiments, the inclusion of an efficacious amount of activated carbon, clay mineral, and/or inorganic filler (e.g., kaolin clay) in the one or more treatment composition may be sufficient to provide such contrasting coloration relative to the agricultural product. A food-grade colorant, preferably derived from biosourced materials, may also be used if desired.

While not intending to be bound by theory, in some embodiments, removal of the applied treatment via one or more wash steps may not be necessary, especially if the treatment composition is formulated using ingredients that are suitable for entry into the winemaking process. For example, substantial portions of the treatment composition may naturally be removed prior to harvest of the treated agricultural product, e.g., via contact with dew, fog, or other natural forces. Again, while not intending to be bound by theory, if smoke exposure has passed portions of entrapped volatile organic compounds (e.g., phenol compounds) may outgas back into the environment. Additionally and/or alternatively, the volatile organic compounds may be sufficiently bound by any residual coating treatment entering the winemaking process are sufficiently bound that they do not negatively impact the flavor profile of the wine.

In some embodiments where a wash is used to remove at least some of the applied treatment, the washed agricultural product is subjected to one or more drying steps to remove residual wash composition. It may be advantageous to employ such one or more drying steps when dilution of a downstream product (e.g., wine in the case of wine grapes) and/or microbial problems (e.g., unsuitable fungal growth) may be of concern if the wash composition is not suitably removed. For example, one, two, or all of the following drying aspects may be employed: blowing air, exposure to low humidity air (e.g., air that is substantially lower in humidity than the ambient air humidity), and/or elevated temperature (e.g., an air temperature greater than the ambient air temperature such as at least 40, at least 50, or at least 65° C.). The produce drying tunnel and/or produce drying process described in International Publ. No. WO2022/087632 may be employed.

Additionally, or alternatively, in some embodiments in which the treated agricultural product is wine grapes, at least some, substantially all, or all, of the treatment composition is removed during or after crushing the grapes (e.g., during or after primary fermentation). Such removal of the treatment composition may be accomplished via any suitable process. Examples of suitable such removal processes may include filtering, settling, or the like.

As previously discussed, the treatment can be applied in one layer or two or more layers. In some embodiments, the treatment comprises a multilayer treatment in which a first base treatment is applied, and then a second overlying treatment is applied (e.g., after the first treatment has dried). In multilayer treatment approaches, two or more of the applied treatments may be the same (e.g., to achieve a thicker overall applied treatment than possible with a single treatment application) or chemically different. While not intending to be bound by theory, in some embodiments, it may be advantageous to have two or more chemically different layers applied. For example, a first base treatment may provide a desired level of adhesion (e.g., either to keep the multi-layer treatment well adhered and/or facilitate easy removal of the multi-layer treatment, e.g., during washing) and a second overlying treatment may provide a desired barrier property (active and/or passive barrier property(s)), a first base treatment may provide a desired barrier property (active and/or passive barrier property(s)) and a second overlaying treatment may provide a surface resistance to wildfire smoke compounds and particles adsorbing onto the treatment surface in the first place and/or encouraging washing away of such wildfire-smoked derived particles and compounds. In some embodiments, the treatment is a multilayer treatment in which one of a base treatment and an overlying treatment has a higher passive barrier property relative to problematic taint compounds in wildfire smoke and the other treatment has a higher active barrier property (e.g., by virtue of including more binding component) than the other treatment. In some embodiments, the one or more treatment (e.g., the exterior-most treatment when two or more treatments are applied) is hydrophilic providing contact angles below 30 degrees, below 20 degrees, below 10 degrees, more preferably below 8 degrees. Not wishing to be bound by theory, a water loving treatment may act as a self-washing treatment as water displaces smoke particulate and materials leading to smoke taint.

As discussed previously, in some embodiments, the one or more treatment (e.g., the exterior-most treatment when two or more treatments are applied) is super hydrophobic providing contact angles with water of greater than 145 degrees, greater than 150 degrees, more preferably greater than 160 degrees, and even more preferably greater than 170 degrees. Not wishing to be bound by theory, a hydrophobic treatment may prevent smoke particulate and materials leading to smoke taint from adhering to the agricultural product. Such treatments could be a continuous film or a create a nanostructure surface that acts similar to how a lotus leaf sheds water.

In the preceding two paragraphs, contact angle may be determined relative to a drop of deionized water on the dried treatment surface. An optical tensiometer and image analysis software may be used to precisely determine the contact angle of the droplet relative to the surface being tested. An example of a useful optical tensiometer equipped with image analysis software is the DCA-100 contact angle tensiometer manufactured by First Ten Angstroms, Inc. of Portsmouth, Virginia, USA. Such an optical tensiometer may be used, for example, to measure the static contact angle of a 10-microliter sessile drop of room temperature deionized water measured 30 seconds after application at room temperature. Unless specifically indicated otherwise, all contact angles referenced herein are static contact angles (as, opposed, e.g., to dynamic contact angles such as advancing or receding contact angles). Typically, contact angles are reported as the average value of at least six separate measurements.

In some embodiments, the one or more treatment (e.g., the exterior-most treatment when two or more treatments are applied) is self-lubricating. Not wishing to be bound by theory, a self-lubricating treatment may prevent smoke particulate and materials leading to smoke taint from adhering to the agricultural product, as the self-lubricating material may wash off the agricultural product as it flows off the agricultural product upon washing. Examples of self-lubricating treatments, which are preferably non-Newtonian, could be prepared as outlined in U.S. Pat. No. 9,371,173.

The one or more treatment, and preferably the interior-most treatment when two or more treatments are applied, sufficiently wets out the surface of the agricultural product (e.g., the exterior skin of wine grapes which tend to be waxy) to minimize the amount of uncoated exterior, preferably forming a substantially continuous coating thereon. In some embodiments, the one or more treatment is formulated to have a surface tension at 25° C. of less than 72, less than 70, less than 65, less than 60, less than 50, less than 40, or less than 30 mN/m. An example of a useful procedure for assessing liquid surface tensions is ASTM D1331. To suitably wet out the surface of the agricultural product to be treated (e.g., wine grapes), in some embodiments, the one or more liquid treatment preferably exhibits a contact angle on one or both of carnauba wax or candelilla wax of less than about 80, less than about 70, less than about 60, less than about 50, less than about 40, less than about 30, or less than about 25 degrees.

An optical tensiometer and image analysis software may be used to precisely determine the contact angle of the droplet relative to the surface being tested. An example of a useful optical tensiometer equipped with image analysis software is the DCA-100 contact angle tensiometer manufactured by First Ten Angstroms, Inc. of Portsmouth, Virginia, USA. Such an optical tensiometer may be used, for example, to measure the static contact angle of a 10 microliter sessile drop of room temperature liquid to be tested measured 30 seconds after application at room temperature. Unless specifically indicated otherwise, all contact angles referenced herein are static contact angles (as, opposed, e.g., to dynamic contact angles such as advancing or receding contact angles). Typically, contact angles are reported as the average value of at least six separate measurements.

U.S. Pat. Publ. No. 2023/0232872 provides an example of method for measuring the contact angle of liquid coatings on fruit. In some embodiments, the one or more liquid treatment of the present disclosure exhibits a contact angle on the exterior of wine grapes (e.g., non-washed red wine grapes such as Cabernet Sauvignon) of less than about 80, less than about 70, less than about 60, less than about 50, less than about 40, less than about 30 degrees, or less than about 25 degrees.

The thickness of the surface-deposited hardened coating treatment employed may vary depending upon, for example, the agricultural product to be coated, cost considerations, and the desired level of coating performance. In some embodiments, the hardened surface-deposited treatment will be of substantially uniform thickness—at least with respect to treated exposed exterior surfaces. Examples of typical coating thickness include average thicknesses of less than about than about 200 microns, less than about 75 microns, less than about 20 microns, less than about 15 microns, less than about 10 microns, less than about 9 microns, less than about 8 microns, less than about 7 microns, less than about 6 microns, less than about 5 microns, less than about 4 microns, less than about 3 microns, less than about 2 microns, or less than about 1.5 microns. The hardened surface-deposited treatment will typically be used at an average coating thickness of at least about 0.01 micron, at least about 0.100 micron, at least about 0.5 micron, at least about 1 micron, at least about 1.5 microns, at least about 2 microns, at least about 2.5 microns, or at least about 3 microns.

In some embodiments, the wash solution is an aqueous solution that includes one or more organic solvents. The wash solution may include any suitable organic solvent, including any of those disclosed herein, with water-miscible organic solvent and/or food-grade organic solvents (e.g., food-grade ethanol being preferred) being preferred. The wash solution may include any suitable amount of organic solvent to facilitate effective removal of the hardened surface-deposited one or more treatments. When used, organic solvent may be present in an amount of at least 1, at least 2, at least 3, at least 4, at least 5, at least 10, at least 15, at least 20, at least 25, or at least 30 wt-%, based on the total weight of the wash solution.

In some embodiments, the wash solution includes one or more surfactants. Food-grade surfactants are preferred in some embodiments. Examples of such surfactants may include any of the emulsifiers discloses herein. When used, the surfactant will typically be present in an amount of at least 0.01, at least 0.1, at least 0.5, or at least 1 wt-%, based on the total weight of the wash solution. Although the upper amount of surfactant is not particularly limited, typically it will be used in an amount of less than 5, less than 2, or less than 1.5 wt-%, based on the total weight of the wash solution.

In some embodiments, an aqueous wash solution including a suitable amount of a base such as any of those disclosed herein (e.g., a dilute amount such as 5 wt-% or less, more typically 3 wt-% or less, or about 1 to about 3 wt-%), and more preferably a food-safe base (typically a weak food-safe base), may be used to facilitate removal of certain surface-deposited treatments of the present disclosure. For example, certain reversibly crosslinked surface-deposited treatments of the present disclosure can be removed (e.g., certain of those using PMCA's such as zinc-containing PMCAs and carboxyl-functional AHC) using a 3% solution of ammonium hydroxide in water.

The wash solution may have any suitable pH. For example, the wash solution may have a pH of at least about 9.5 or at least about 11. For suitable wash solutions having such alkaline pHs see, for example, the wash solutions described in U.S. Pat. No. 6,831,050 or U.S. Pat. No. 6,662,813. Typically, the wash solution has a pH of less than about 12.5. In some embodiments, the wash solution has a neutral or acidic pH such as, for example, a pH of 7 or less, 6 or less, 5 or less, 4 or less, or 3 or less.

The wash solution may include one or more of citric acid, limonene, ethanol, potassium hydroxide, sodium citrate, decyl glycoside, caprylyl/myristyl glycoside, calcium ascorbate, glycerin, potassium sorbate, or a combination thereof.

The one or more treatment composition (e.g., as a liquid composition prior to hardening) can include dispersed or suspended particles, which may include at least a portion of the organic components and/or the binding component. In some embodiments, the particles are organic, which may for, example, be colloidal particles and/or polymer particles such as, for example, biopolymer particles, preferably edible biopolymer particles. The particles may have any suitable particle sizes such as, for example, volume average particle sizes of less than about 100 microns, less than about 50 microns, less than about 20 microns, less than about 10 microns, less than about 5 microns, less than about 1 micron, less than about 0.5 micron, less than about 0.3 micron, or less than about 0.2 micron. In preferred embodiments, the particles exhibit a D50 pursuant to the aforementioned ranges.

In some embodiments, the one or more treatment compositions and/or wash solutions of the present disclosure include one or more of acetic acid, aconitic acid, adipic acid, alginic acid, benzoic acid, citric acid, ferulic acid, hyaluronic acid, lactic acid, malic acid, propionic acid, stearic acid, succinic acid, sulfuric acid, tannic acid, tartaric acid, a salt thereof, or a mixture thereof.

In some embodiments, the one or more treatment compositions and/or wash solutions of the present disclosure can include one or more of sodium acetate, sodium alginate, sodium benzoate, sodium bicarbonate, sodium carbonate, sodium citrate, sodium diacetate, sodium hydroxide, sodium hypophosphite, sodium lactate, sodium metasilicate, sodium propionate, sodium sesquicarbonate, sodium tartrate, sodium potassium tartrate, sodium potassium tartrate, sodium thiosulfate, or a combination thereof.

In some embodiments, the one or more treatment compositions and/or wash solutions of the present disclosure include one or more of potassium alginate, potassium bicarbonate, potassium carbonate, potassium chloride, potassium citrate, potassium hydroxide, potassium iodide, potassium iodate, potassium lactate, potassium sulfate, or a combination thereof.

In some embodiments, the one or more treatment compositions and/or wash solutions of the present disclosure includes one or more of ammonium alginate, ammonium bicarbonate, ammonium carbonate, ammonium chloride, ammonium hydroxide, ammonium citrate dibasic, amount phosphate monobasic, ammonium phosphate dibasic, ammonium sulfate, and mixtures thereof.

In some embodiments, the one or more treatment and/or wash solutions of the present disclosure includes one or more of agar, benzoyl peroxide, beta carotene, clove or its derivatives, copper gluconate, copper sulfate, corn silk extract, cuprous iodide, L-cysteine, L-cysteine monohydrochloride, dextrin, diacetylmorphine, dill or its derivatives, ethyl formate, ficin, garlic or its derivatives, gluco deltalactone, acacia (gum arabic), gum ghatti, guar gum, locust (carob) bean gum, karan gum (sterculia gum), gum tragacanth, hydrogen peroxide, inositol, isopropyl citrate, licorice or licorice derivatives, ground limestone, malt, maltodextrin, malt syrup (malt extract), methylparaben, monosodium phosphate derivatives of mono- and diglycerides, niacin, niacinamide, propyl gallate, propylene glycol, propylparaben, pyridoxine hydrochloride, riboflavin, riboflavin-5'-phosphate (sodium), rue, oil of rue, shea nut oil, sorbitol, stannous chloride (anhydrous or dehydrated), stearyl citrate, corn sugar, corn syrup, thiamine hydrochloride, thiamine mononitrate, α-Tocopherols, triacetin, tributyrin, triethyl citrate, urea, vitamin A, vitamin B12, Vitamin D, beeswax (yellow and white), candelilla wax, carnauba wax, whey, zein, or combinations thereof.

In some embodiments, the one or more treatment compositions and/or wash solutions of the present disclosure includes an essential oil (e.g., any of the essential oils listed in Title 21, Chapter 1, Section 182.20 of The Code of Federal Regulations (CFR), or combinations thereof).

As previously described, the treatment composition may be supplied as a concentrate that is diluted, typically with water, to obtain the final treatment composition. The concentrate may be a liquid concentrate or a dry concentrate (e.g., powder, pellets, tablets, or any other suitable form of solid material), more typically a liquid concentrate. Accordingly, in some embodiments, the present disclosure provides a kit that includes a concentrate for diluting with solvent (e.g., water and/or organic solvent such as, e.g., ethanol) to form the treatment composition. The kit preferably further includes instructions for one or both of (i) preparing the treatment composition from the concentrate and (ii) applying the treatment composition to the agricultural product. The instructions are preferably provided on or associated with a container in which the concentrate is provided (e.g., on a label adhered to the container, directly printed on the container, or otherwise associate with the container). The term "container" should be construed in its broadest sense and includes, for example, pales, cans, drums, bags, totes, other containers for liquids, and the like. Some or all of the instructions may be provided on a website associated with the container, typically via some indicia associated with the container such as, for example, a website address or a website identifier that can be accessed via a camera of a mobile computing device such as a tablet, mobile phone, a smart watch, or the like.

In commerce, a first party that manufactures compositions (e.g., one or more treatment compositions disclosed herein) may not directly treat an agricultural product (e.g., form a coating over a product from the composition), but may instead direct a second party (e.g., a farmer such as a wine grape grower) to apply a treatment composition to an agricultural product (e.g., by marketing the composition for such use and selling the composition to the second party). That is, even if the first party does not treat an agricultural product pursuant to the methods and compositions described herein, the first party may still cause a composition of the present disclosure to be applied to an agricultural product by providing instructions or recommendations as described above, including, for example, by marketing the composition for such use. Such instructions or recommendations, even if limited only to a marketing suggestion to use the composition to coat or otherwise treat agricultural products to protect against wildfire smoke-related issues, is considered to cause the composition to be used to coat or treat the agricultural product to protect against wildfire smoke-related issues.

In some embodiments, an agricultural product supply chain (e.g., wine grapes, wine, hops, etc.) and treatment application is managed by a distributed, or decentralized, ledger based on blockchain or by one or more blockchain smart contracts. The ledger or contract may also be programmed to trigger transactions automatically. Such transactions may, for example, be activated based upon a likelihood of wildfire smoke exposure, actual wildfire smoke exposure, an insurance company instruction, or treatment of wine grapes (or other smoke sensitive agricultural product such as hops) with treatment compositions of the present disclosure. Such a digital system can record transactions among multiple parties, as well as supporting access to financing or crop insurance claims. Inventory, orders, loans, and bills of lading, etc. in the blockchain ledger may be given unique identifiers, i.e., digital tokens. In addition, the blockchain ledger or smart contract, may pull in automated information from other blockchains or nodes, such as for example, using a decentralized network to bring real-time data, such as cryptographically signed weather, wind, wildfire, smoke, etc. data onto a blockchain network or ledger to trigger or modify transactions automatically. provide notifications, make forecasts, etc. In some embodiments, the process of treatment orders and application may be tracked through a blockchain ledger or by one or more blockchain smart contracts. For example, once insurance instructions are initiated, blockchain ledger can trace the area to be treated, crops to be protected, treatment to be ordered, application processes followed, including amounts applied, if a certified and trained application company was used, time of treatment application and removal, type of treatment, wildfire and smoke activity, etc. The parties in the blockchain may also have unique identifiers, such as digital signatures, to access the blocks which are added to the blockchain. The blockchain records all stages of the transaction on the digital token, as it passes from one party to the next. Thus, for example, blockchains may be used to track and communication information relating to the supply chain for wine grapes and whether, for example, the wine grapes were exposed to wildfire smoke, preventatively treated for wildfire smoke exposure, and/or assayed for wildfire smoke taint levels.

In some embodiments of the agricultural product supply chain, crop pesticide or fertilizer application is managed via blockchain wherein one or more applications of fertilizer or pesticide comprises calculating the area to receive one or more applications of fertilizer or pesticide, crops to receive one or more applications, fertilizer or pesticide to be ordered, application processes followed, amounts applied, and time of application.

In some embodiments cryptographically signed data determines when one or more of an application of a smoke taint inhibition treatment, fertilizer, or pesticide is to be applied, as required in a contract, such as for example a crop insurance contract. In some embodiments, artificial intelligence or machine learning may be applied to continually improve the process and calculations that will determine when one or more of an application of a smoke taint inhibition treatment, fertilizer, or pesticide is to be applied as required in a contract, such as for example a crop insurance contract. In some embodiments, an enterprise resource planning (ERP) system triggers transactions automatically. Such transactions may, for example, be activated based upon a wildfire smoke related trigger (e.g., a risk of exposure, actual exposure, application of treatment, and the like) or other customer preference. RFID tags or electronic product codes that adhere to GS1 standards (globally accepted rules for handling supply chain data) may also be used to track agricultural products in the supply chain.

The present disclosure also provides methods and systems for facilitating crop insurance policies, crop insurance claims, crop insurance premium pricing, and/or crop insurance payments relating to wildfire smoke exposure and/or taint. For example, a crop insurance policy for wine grapes or other wildfire taint susceptible agricultural products (e.g., hops) may require that wine grapes or the other agricultural product be treated with a treatment composition of the present disclosure in order for wildfire smoke exposure and/or taint claims to be covered by the crop insurance policy, fully covered by the crop insurance policy, and/or to keep the premium from increasing. All, some, or none of the process may include one or more blockchain ledgers or smart contracts. In some embodiments, treatment of the wine grapes or other agricultural products within a certain time window prior to smoke exposure (e.g., within 1-month prior to smoke exposure; within 2 weeks prior to smoke exposure; within 1 week prior to smoke exposure; or within 5, 4, 3, 2, or 1 day prior to smoke exposure) may be required in order for a claim to be covered by an insurance policy and/or for the premium to remain the same. Additionally or alternatively, in some embodiments, treatment of the wine grapes or other agricultural products may be required once a smoke exposure probability or forecast has exceeded a threshold (e.g., an at least 30%, at least 40%, at least 50%, at least 60%, etc. chance of smoke exposure or chance of exposure to a threshold level of smoke intensity). In some embodiments, the wine grapes or other agricultural products may be required to be treated within a certain time window after receiving an instruction to do so (e.g., from a smoke sensor network, a crop insurance company, etc.). For example, such instruction may be provided via a wired network or wireless network (e.g., internet, cellular, wired phone line and the like). In some embodiments, one or more instructions are provided via one or more communication means such as a phone voice call, a voice message, a text message, an email, a radio frequency communication, and/or a notification via an app on a phone, tablet, watch, glasses, hearing/listening/haptic device or other such device. In some embodiments, one or more smoke detection sensors (e.g., a sensor capable of detecting one or more volatile phenols such as any of those disclosed herein or another marker of wildfire smoke such as particulates) may be used to determine whether the agricultural product (e.g., wine grapes) should be treated with treatment compositions of the present disclosure. Such one or more smoke detection sensors may be located in proximity to a given growing location (e.g., a vineyard) or within a growing area (e.g., a wine appellation or sub-appellation). Typically, a plurality of sensors are provided that are geographically spread out in order to enable early detection and provide better smoke modeling and prediction.

Smoke sensors and smoke sensor system are commercially available, for example, from Thingy-IoT of Como, Australia, Aeroqual of Auckland, New Zealand, PurpleAir Inc. of Draper, Utah, and Outpost Environmental. Examples of suitable smoke sensors may include sensors capable of measuring one or more of the following smoke parameters: fine particulate matter (e.g., PM1.0, PM2.5, PM10, etc., with PM2.5 referring to particles having aerodynamic diameters of less than or equal to 2.5 micrometers), carbon monoxide, total volatile organic compounds (tVOCs), and black carbon. For example, Outpost Environmental offers a sensor capable of measuring all of CO, tVOC, and PM2.5.

The Air Quality Index value, or AQI value, calculated based on a formula from the Environmental Protection Agency (EPA), may also be a useful tool for determining whether to recommend and/or apply treatment composition. For example, a determined or forecast AQI of 200 or more, 250 or more, 300 or more, 350 or more, 400 or more, or 450 or more may be used to trigger such a treatment recommendation or treatment decision. In some embodiments, a measured PM2.5 value over a pertinent time period (e.g., 1-hour, 3-hour, 24-hours, etc.) may be used to trigger a treatment recommendation or treatment decision. For example, a determined or forecast PM2.5 value of more than 10, more than 15, or more than 20 micrograms per cubic meter for a 24-hour period may be used to trigger a treatment recommendation or treatment decision.

An AQI value and/or PM2.5 value may also be used to determine when it is safe to remove the surface-deposited treatment, if such removal is desired. While not intending to be bound by theory, it may be desirable to remove the surface-deposited treatment as soon as it is safe to do so to minimize the chances of any wildfire smoke taint compounds present in the coating from reaching the treated agricultural product over time and potentially leaching into it. For example, a measured or predicted AQI value falling below a threshold value such as, e.g., below 250, below 200, below 150, or below 125 may trigger a removal recommendation or decision. By way of further example, a measured or predicted PM2.5 value dropping below a threshold value such as, e.g., below 10, below 9, below 7.5, or below 5 micrograms per cubic meter may trigger a removal recommendation or decision.

A treatment instruction, recommendation, and/or other information relating to wildfire smoke may be provided to a given grower/grow location via any suitable communication means known in the art, including any suitable communication means described herein. In some embodiments, the treatment instruction itself, or notification of a pending treatment instruction, is provided via two or more different communication means (e.g., an email message and a text message) to increase the likelihood of the message being promptly received and considered. The transmitted information relating to wildfire smoke may include one or more of (i) a risk of smoke exposure for a geographical location encompassing where the agricultural product is located or (ii) a risk of smoke taint for the agricultural product. The transmitted information may include a recommendation relating to the type of treatment, treatment dosage (e.g., dilution level and/or amount sprayed per unit area such as linear foot of row or per acre/per hectare), timing of treatment, frequency of treatment, or any combination thereof. Preferably, the agricultural product (e.g., wine grapes) is treated based on the received information. In some embodiments, the grower or grow location transmits, via a same or a different communication network, one or more of: a type of agricultural product (e.g., a type of wine grape), a type of processed agricultural product to be made from the agricultural product (e.g., red wine, white wine, sparking wine, rose wine, etc.), or location information (e.g., a street address, GPS coordinates, an IP address, a cell phone tower location, etc.) associated with the agricultural product. Such information may be inputted and transmitted, for example, after receiving an inquiry for such information on the same or a different communication network. Such information may also be present in a database (e.g., due to grower/grow location information inputted in conjunction with sale of the treatment composition) and considered when determining the treatment instruction to be transmitted to the grower/grow location.

In some embodiments, the treatment instruction, recommendation, and/or other information relating to wildfire smoke is associated with an insurance policy, typically a crop insurance policy. For example, an instruction may be sent to treat the agricultural product in order for preferential premium pricing to be obtained or preserved and/or for the agricultural product to remain covered, or remain fully covered, under an insurance policy for smoke exposure and/or smoke taint insurance claims. The communication may be sent directly by an insurance company or by a third party on behalf of the insurance company. In some embodiments, the instruction to treat the agricultural product may be generated as a result of one or more of: (i) wildfire smoke sensor data (e.g., from a sensor network), (ii) satellite generated data, (iii) aerial drone generated data, and/or (iv) a wildfire occurrence prediction risk threshold being exceeded.

It is contemplated that the treatment compositions of the present disclosure may also have utility as an airborne spray in counteracting smoke taint compounds in the air prior to such compounds contacting the agricultural products. Such treatment may be in addition to, or as an alternative for, proactive treatment of the agricultural products with treatment compositions of the present disclosure such that a hardened surface deposited treatment is already present prior to smoke exposure. For example, the treatment compositions of the present disclosure may be sprayed, fogged, aerosolized and the like in a wine grape vineyard as wildfire smoke is present in the vineyard or other grow site. In such embodiments, the treat composition may be applied via aerial and/or ground drone(s) circulating throughout the vineyard or grow site. The treatment composition may additionally or alternatively be applied via mobile and/or fixed spray guns, spray heads, misters, foggers, atomizers, aerosolizers or combinations thereof, which are preferably dispersed throughout the vineyard or other grow site.

The treatment compositions of the present disclosure may have utility in other end uses as well. For example, it is contemplated that one or more treatment compositions may be applied (e.g., spray applied) to the exterior of plants or harvestable agricultural products to adsorb emitted compounds that may function as signaling compounds that attract problematic insect or other pests. By adsorbing such emitted signaling compounds, the one or more applied treatment compositions may reduce the prevalence of pests associated with the plants or harvestable agricultural products. In the case of treated edible harvestable agricultural products (e.g., fruits and vegetables), the compositions of the present disclosure may increase crop yields and/or crop quality. The same may be true of treated ornamental plants (e.g., flowering plants, ornamental foliage plants, and the like).

The treatment compositions of the present disclosure may also have utility in capturing toxic or otherwise problematic compounds. For example, dockworkers and other employees that open shipping containers can be exposed to dangerous gasses that have built up inside the shipping containers due to out-gassing from cargo, were intentionally introduced prior to shipping, or were residual from prior cargo shipped in the container. Examples of such compounds may include benzene, methyl bromide, formaldehyde, fumigants (e.g., phosgene), ethylene oxide, phosphine, and the like. Both acute and chronic exposure to toxic gases can pose health risks for workers. Treatment compositions of the present disclosure can be introduced into shipping containers at any suitable time including, for example, prior to loading the cargo, while loading the cargo, after loading the cargo, during transport, upon arrival at its destination, or any combination thereof. Likewise, the treatment compositions may be introduced into the shipping containers using any suitable application method. For example, one or more treatment composition of the present disclosure may be fogged, misted, sprayed, or blown (e.g., when in powder form) into a closed shipping container (e.g., prior to opening) through one or more ventilation holes in the shipping container and/or via cracking open the doors. One or more treatment compositions of the present invention may alternatively or additionally be introduced via absorbent pads, sachets, and the like placed inside the shipping container (e.g., prior to shipping).

Below are additional non-limiting embodiments to further illustrate the teachings of the present disclosure.

Embodiment 1 is a method of treating an edible agricultural product to reduce or prevent smoke taint from wildfire, the method comprising:
  applying one or more (e.g., one, two, or three) treatment composition to an exterior surface of the agricultural product to form a surface-deposited treatment, preferably prior to the agricultural product contacting wildfire smoke; and
  after the wildfire smoke taint risk has subsided, or after the agricultural product has been harvested, optionally washing the treated agricultural product and/or removing residual surface-deposited treatment.

Embodiment 2 is a method of reducing or preventing wildfire smoke taint of edible agricultural products that have not yet been harvested, the method comprising:
  spraying (and preferably fogging, atomizing, and/or aerosolizing) one or more liquid treatment composition in the vicinity of the non-harvested edible agricultural product in the presence of wildfire smoke;
  optionally continuing to spray (and preferably fogging, atomizing, and/or aerosolizing) the one or more liquid treatment composition in the vicinity of the non-harvested edible agricultural product until the wildfire smoke has diminished or is no longer present; and
  after the wildfire smoke taint risk has subsided, or after the agricultural product has been harvested, optionally washing the treated agricultural product and/or otherwise removing residual surface-deposited treatment.

Embodiment 3 is a method comprising:
  providing one or more treatment composition or one or more concentrate for making the one or more treatment composition; and
  causing the one or more treatment composition to be applied to an agricultural product, preferably prior to the agricultural product contacting wildfire smoke.

Embodiment 4 is a method comprising:
  providing wine grapes treated with one or more treatment composition to form a surface-deposited treatment effective in reducing or preventing smoke taint of wine grapes;
  optionally processing (e.g., washing) the treated wine grapes to remove at least some, or substantially all, or all, of the surface-deposited treatment;
  optionally drying the wine grapes or otherwise removing excess water; and processing the wine grapes to make wine.

Embodiment 5 is a product comprising an agricultural product, wherein an exterior surface of the agricultural product has one or more surface-deposited treatment present thereon, wherein the surface-deposited treatment is optionally and preferably hardened, and wherein the surface-deposited treatment is (i) formed from the application of one or more (e.g., one, two, or three) treatment composition and (ii) effective in reducing or preventing smoke taint of the edible agricultural product upon exposure to wildfire smoke.

Embodiment 6 is a kit comprising:
  one or more concentrates for combining (e.g., diluting) with water to form one or more liquid treatment composition; and
  instructions for preparing the one or more liquid treatment composition and applying the one or more treatment composition to an edible agricultural product susceptible to wildfire smoke taint to protect against smoke taint of the agricultural product.

Embodiment 7 is a treatment system comprising one or more treatment composition preferably effective for protecting an edible agricultural product against wildfire smoke.

Embodiment 8 is a method of any of Embodiments 1 to 3, the product of Embodiment 5, or kit of Embodiment 6, wherein the one or more treatment composition is applied to the edible agricultural product prior to harvest.

Embodiment 9 is a method of any of Embodiments 1 to 3 or 8, the product of Embodiments 5 or 8, or the kit of Embodiment 6 or 8, wherein the one or more treatment composition is applied prior to the edible agricultural product contacting wildfire smoke.

Embodiment 10 is a treated edible agricultural product of any preceding embodiment, wherein the agricultural product is a harvested agricultural product (e.g., harvested wine grape bunches).

Embodiment 11 is a method, treated edible agricultural product, kit, or treatment system of any preceding embodiment, wherein the one or more treatment is applied to the edible agricultural product after the agricultural product is harvested.

Embodiment 12 is a method, treated edible agricultural product, kit, or treatment system of any preceding embodiment, wherein the one or more treatment composition is spray applied (e.g., via an airblast or boom sprayer).

Embodiment 13 is a method of any preceding embodiment, wherein the method further comprises:
after the wildfire smoke exposure has ceased, or after harvest, processing the treated edible agricultural product to remove at least some, preferably substantially all, or all, of the residual surface-deposited treatment (e.g., to remove at least about 25%, at least about 50%, at least about 75%, at least about 80%, at least about 85%, at least about about 90%, at least about 95%, at least about 97%, or at least about 99% by weight of the residual surface-deposited treatment composition).

Embodiment 14 is a method of Embodiment 13, wherein processing comprises washing the treated agricultural product, prior to and/or after harvest, preferably with an aqueous wash such as water, which may optionally include one or more of (i) organic solvent such as, for example, ethanol to facilitate removal of the surface-deposited treatment, (ii) a cleaning agent such as, for example, a surfactant, which preferably is GRAS listed, or (iii) other solute to avoid swelling.

Embodiment 15 is a method, treated edible agricultural product, kit, or treatment system of any of Embodiments 1 to 3, or 5 to 14, wherein the edible agricultural product comprises a fruit. In an alternative embodiment, the edible agricultural product comprises hops.

Embodiment 16 is a method, treated edible agricultural product, kit, or treatment system of Embodiment 15, wherein the edible agricultural product comprises grapes.

Embodiment 17 is a method, treated edible agricultural product, kit, or treatment system of Embodiment 16, wherein the grapes are wine grapes.

Embodiment 18 is a method, treated edible agricultural product, kit, or treatment system of any preceding embodiment, wherein the agricultural product (e.g., fruit or hops) is substantially coated on its exterior with one or more surface-deposited treatment (e.g., on average, more than 50%, more than 60%, more than 70%, more than 80%, preferably more than 90%, even more preferably more than 95%, and even more preferably more than 99% of the exterior surface area of the agricultural product is coated). In the case of fruit, the aforementioned percentages refer to the percentage of the surface area of the fruit cuticle that has been coated.

Embodiment 19 is a method, treated edible agricultural product, or kit of any preceding embodiment, wherein the treated edible agricultural product comprises clusters or bunches (e.g., grape bunches) and wherein the clusters or bunches are substantially coated on its exterior surfaces with one or more surface-deposited treatment (e.g., on average, more than 50%, more than 60%, more than 70%, more than 80%, preferably more than 90%, even more preferably more than 95%, and even more preferably more than 99% of the exposed exterior surfaces (e.g., exterior exposed fruit cuticles) of the clusters or bunches are coated).

Embodiment 20 is a method, treated edible agricultural product, kit, or treatment system of any preceding embodiment, wherein the one or more treatment composition includes a liquid carrier.

Embodiment 21 is a method, treated edible agricultural product, kit, or treatment system of Embodiment 20, wherein the one or more treatment composition is applied as a liquid (e.g., spray applied liquid) that dries to form the surface-deposited protective treatment (e.g., a continuous or substantially continuous coating) on the exterior surface of the agricultural product.

Embodiment 22 is a method, treated edible agricultural product, kit, or treatment system of any preceding embodiment, wherein the one or more treatment composition is an aqueous composition, which may optionally include organic solvent (e.g., a water-miscible organic solvent such as ethanol).

Embodiment 23 is a method, treated edible agricultural product, kit, or treatment system of any preceding embodiment, wherein the one or more treatment composition includes at least 50, at least 60, at least 70, at least 80, at least 90, at least 95, at least 97, or at least 99 wt-% of water, based on the total weight of the composition.

Embodiment 24 is a method, treated edible agricultural product, kit, or treatment system of any preceding embodiment, wherein the one or more treatment composition includes at least 0.05, least 0.1, at least 0.15, at least 0.2, at least 0.25, or at least 0.50 wt-% of total solids, based on the total weight of the one or more treatment composition.

Embodiment 25 is a method, treated edible agricultural product, kit, or treatment system of any preceding embodiment, wherein the one or more treatment composition includes less than 30, less than 25, less than 20, less than 15, less than 10, less than 5, less than 4, less than 3, less than 2, less than 1, less than 0.75, or less than 0.50 wt-% of total solids. In embodiments in which the one or more treatment composition is prepared from a liquid concentrate, the liquid concentrate preferably includes a sufficient amount of total solids to yield a final liquid treatment composition (after dilution such as, e.g., 10-, 20-, 50-, or 100-fold dilution) having a total solids as disclosed above.

Embodiment 26 is a method, treated edible agricultural product, kit, or treatment system of any preceding embodiment, wherein the one or more treatment composition includes an organic component (e.g., a substituted or unsubstituted hydrocarbon).

Embodiment 27 is a method, treated edible agricultural product, kit, or treatment system of Embodiment 26, wherein the organic component comprises a non-volatile organic component.

Embodiment 28 is a method, treated edible agricultural product, kit, or treatment system of Embodiment 26 or 27, wherein the organic component comprises a substituted or unsubstituted hydrocarbon having at least 10 carbon atoms, at least 12 carbons atoms, at least 14 carbon atoms, at least 16 carbon atoms, at least 18 carbon atoms, at least 25 carbon atoms, at least 30 carbon atoms, at least 35 carbon atoms, or at least 40 carbon atoms.

Embodiment 29 is a method, treated edible agricultural product, kit, or treatment system of Embodiment 27 or 28, wherein the non-volatile organic component comprises a coating binder (or "film former").

Embodiment 30 is a method, treated edible agricultural product, kit, or treatment system of Embodiment 29, wherein the coating binder comprises an oligomer, a polymer, or a combination thereof.

Embodiment 31 is a method, treated edible agricultural product, kit, or treatment system of Embodiment 29 or 30, wherein the coating binder is bio-sourced.

Embodiment 32 is a method, treated edible agricultural product, kit, or treatment system of any preceding embodiment, wherein at least 10%, at least 20%, at least 40%, at least 50%, at least 60%, at least 80%, at least 90%, at least 95%, at least 99%, or 100% of the carbon present in the organic component is bio-sourced carbon.

Embodiment 33 is a method, treated edible agricultural product, kit, or treatment system of any of Embodiments 27 to 32, wherein the organic component comprises a saccharide component, a peptide component, a lipid component, or a combination thereof.

Embodiment 34 is a method, treated edible agricultural product, kit, or treatment system of any of Embodiments 27 to 33, wherein the organic component (e.g., the saccharide component, the peptide component, the lipid component, or a combination thereof) is present in the one or more treatment composition in an amount of at least 0.05, least 0.1, at least 0.15, at least 0.2, at least 0.25, or at least 0.5 wt-%, based on the total weight of the treatment composition.

Embodiment 35 is a method, treated edible agricultural product, kit, or treatment system of any of Embodiments 27 to 34, wherein the organic component (e.g., the saccharide component, the peptide component, the lipid component, or a combination thereof) is present in the one or more treatment composition in an amount of less than 10, less than 5, less than 4, less than 3, less than 2, less than 1, less than 0.75, or less than 0.50 wt-%, based on the total weight of the treatment composition.

Embodiment 36 is a method, treated edible agricultural product, kit, or treatment system of any of Embodiments 33 to 35, wherein the lipid component is present.

Embodiment 37 is a method, treated edible agricultural product, kit, or treatment of Embodiment 36, wherein the lipid component includes a fatty acid, a fatty acid salt, or a mixture thereof.

Embodiment 38 is a method, treated edible agricultural product, kit, or treatment of Embodiment 37, wherein the fatty acid and/or fatty acid salt is unsaturated.

Embodiment 39 is a method, treated edible agricultural product, kit, or treatment system of anyd of Embodiments 36 to 38, wherein the lipid comprises an ester (e.g., a mono- and/or di-ester) of one or more fatty acids or a salt thereof.

Embodiment 40 is a method, treated edible agricultural product, kit, or treatment system of Embodiment 39, wherein the ester of one or more fatty acids or a salt thereof comprises (i) an ester (e.g., a mono and/or diester) of glycerol and one or more fatty acids, (ii) an ester of ascorbic acid or a salt thereof and one or more fatty acids, or (iii) a mixture thereof.

Embodiment 41 is a method, treated edible agricultural product, kit, or treatment system of Embodiment 39 to 40, wherein the ester of one or more fatty acids comprises 2,3-dihydroxypropyl palmitate, 1,3-dihydroxypropan-2-yl palmitate, 2,3-dihydroxypropyl stearate, 1,3-dihydroxypropan-2-yl stearate, a monolaurin (1-monolaurin and/or 2-monolaurin) or a mixture thereof. In some embodiments, an ester of one or more fatty acids is used that is derived from grapes.

Embodiment 42 is a method, treated edible agricultural product, kit, or treatment system of any of Embodiments 39 to 41, wherein the ester of one or more fatty acids or a salt thereof comprises ascorbyl laurate, ascorbyl myristate, ascorbyl palmitate, ascorbyl stearate, a salt thereof (e.g., an ammonium salt of ascorbyl palmitate and/or an ammonium salt of ascorbyl stearate), or a combination thereof.

Embodiment 43 is a method, treated edible agricultural product, kit, or treatment system of any of Embodiments 36 to 42, wherein the lipid component includes a phospholipid.

Embodiment 44 is a method, treated edible agricultural product, kit, or treatment system of any of Embodiments 33 to 43, wherein the treatment composition includes the saccharide component.

Embodiment 45 is a method, treated edible agricultural product, kit, or treatment system of Embodiment 44, wherein the saccharide component comprises an oligosaccharide, a polysaccharide, or a combination thereof.

Embodiment 46 is a method, treated edible agricultural product, kit, or treatment system of Embodiment 44 or 45, wherein the saccharide component comprises pectin, agarose, agaropectin, alginate, carrageenan, arabinoxylan, chitosan, *psyllium*, carboxy methyl cellulose, hyaluronic acid, dextrin, starch (e.g., rice starch, corn starch, wheat starch, pea starch, tapioca starch, etc.), salts or derivatives thereof, or a mixture thereof.

Embodiment 47 is a method, treated edible agricultural product, kit, or treatment system of any of Embodiments 33 to 46, wherein the treatment composition includes the peptide component, Embodiment 48 is a method, treated edible agricultural product, kit, or treatment system of Embodiment 47, wherein the peptide component comprises a peptide, an oligopeptide, a polypeptide, or a combination thereof.

Embodiment 49 is a method, treated edible agricultural product, kit, or treatment system of Embodiment 47 or 48, wherein the peptide component comprises gelatin, zein, globulin, albumin (e.g., ovalbumin and/or conalbumin), whey protein, casein, hemp protein, brown rice protein, alfalfa protein, chia protein, pea protein, flax protein, silk fibroin, soy protein, egg white powder, isinglass, other protein isolates, salts or derivates thereof, or a mixture thereof.

Embodiment 50 is a method, treated edible agricultural product, kit, or treatment system of any preceding embodiment, wherein the one or more treatment composition includes ascorbic acid, a salt or other derivative thereof, or a mixture thereof.

Embodiment 51 is a method, treated edible agricultural product, kit, or treatment system of any preceding embodiment, wherein the one or more treatment composition includes a binding component capable of sequestering (e.g., binding, complexing, absorbing, and/or adsorbing) under ambient conditions one or more compounds present in wildfire smoke (e.g., one or more thermal degradation products of lignin such as a volatile phenol compound, sulfur dioxide, other sulfur-containing compounds (e.g., sulfides and mercaptans), nitrogen dioxide, other nitrogen-containing compounds, etc.).

Embodiment 52 is a method, treated edible agricultural product, kit, or treatment system of Embodiment 51, wherein the binding component comprises a material or compound capable of sequestering, under ambient conditions, one or more volatile phenols (e.g., one or more of guaiacol, 4-methyl guaiacol, 4-ethyl guaiacol, m-cresol, o-cresol, eugenol, thymol, syringol, or 4-ethyl phenol).

Embodiment 53 is a method, treated edible agricultural product, kit, or treatment system of Embodiment 51 or 52, wherein the binding component comprises a material or compound capable of sequestering, under ambient conditions, one or more volatile thiophenols.

Embodiment 54 is a method, treated edible agricultural product, kit, or treatment system of Embodiment 51, 52, or 53, wherein the binding component is present in an amount effective to reduce the amount of one or more, two or more, three or more, four or more, five or more, or all of guaiacol, 4-methyl guaiacol, 4-ethylguaiacol, 4-ethylphenol, m-cresol, o-cresol, or thiophenol in the treated agricultural product, relative to an untreated control of the agricultural product, when exposed under ambient conditions to smoke containing lignin thermal degradation products (e.g., wildfire smoke or simulated wild fire smoke).

Embodiment 55 is a method, treated edible agricultural product, kit, or treatment system of any of Embodiments 51 to 54, wherein the binding component includes one or more ingredient that is capable of binding one or both of guaiacol or 4-methyl guaiacol in an amount at least about as great as native alpha-cyclodextrin, preferably at least as great as native beta-cyclodextrin, on a per gram basis of the ingredient, wherein the ingredient is present in dry form and the guaiacol or 4-methyl guaiacol is present in vapor form.

Embodiment 56a is a method, treated edible agricultural product, kit, or treatment system of any of Embodiments 51 to 55, wherein the binding component includes one or more ingredient that is capable of binding one or both of guaiacol or 4-methylguiacol in an amount of at least about 1, at least about 3, at least about 4, at least about 5, at least about 10, at least about 20, at least about 30, at least about 40, at least about 50, at least about 60, at least about 70, at least about 80, at least about 90, at least about 100, at least about 150, at least about 200, at least about 250, at least about 300, at least about 350, at least about 400, at least about 450, or at least about 500 milligrams per gram of the ingredient, wherein the ingredient is present in dry form and the guaiacol or 4-methyl guaiacol is present in vapor form. Useful conditions for assessing binding may include, for example, 180 minutes at 60° C. in a sealed vessel. An example of a useful quantitative assay is head space GC-MS.

Embodiment 56b is a method, treated edible agricultural product, kit, or treatment system of any of Embodiments 51 to 55, wherein the overall treatment composition, when present in dry form (e.g., after hardening), is capable of binding one or both of guaiacol or 4-methylguiacol in an amount of at least about 1, at least about 3, at least about 4, at least about 5, at least about 10, at least about 20, at least about 30, at least about 40, at least about 50, at least about 60, at least about 70, at least about 80, at least about 90, at least about 100, at least about 150, at least about 200, at least about 250, at least about 300, at least about 350, at least about 400, at least about 450, or at least about 500 mg per gram of the dry treatment composition, wherein the guaiacol or 4-methyl guaiacol is present in vapor form.

Embodiment 57 is a method, treated edible agricultural product, kit, or treatment system of any of Embodiments 51 to 56b, wherein the binding component comprises a plurality of ingredients (e.g., two or more, three or more, four or more, etc.).

Embodiment 58 is a method, treated edible agricultural product, kit, or treatment system of any of Embodiments 51 to 57, wherein the binding component is present in the one or more treatment composition in an amount of at least about 0.05, at least about 0.1, at least about 0.15, at least about 0.2, at least about 0.25, at least about 0.5, at least about 0.75, or at least about 1 wt-% percent, based on the total weight of the treatment composition.

Embodiment 59 is a method, treated edible agricultural product, kit, or treatment system of any of Embodiments 51 to 58, wherein the binding component is present in the one or more treatment composition in an amount of less than 30, less than 25, less than 20, less than 15, less than 10, less than 5, less than 4, less than 3, less than 2, less than 1, less than 0.75, or less than 0.50 wt-%, based on the total weight of the treatment composition.

Embodiment 60 is a method, treated edible agricultural product, kit, or treatment system of any of Embodiments 51 to 59, wherein the binding component comprises a cyclic oligosaccharide.

Embodiment 61 is a method, treated edible agricultural product, kit, or treatment system of any of Embodiments 51 to 60, wherein the binding component comprises a cyclodextrin (e.g., containing from six to twelve glucose units, more typically six to eight glucose units).

Embodiment 62 is a method, treated edible agricultural product, kit, or treatment system of Embodiment 61, wherein the cyclodextrin is an uncomplexed cyclodextrin, more preferably a water-soluble uncomplexed cyclodextrin. The term "uncomplexed cyclodextrin" refers to cyclodextrin that has not been intentionally exposed to a compound that appreciably complexes with cyclodextrin. Examples of such compounds include certain agrochemicals such as, for example, lipophilic insecticides or other lipophilic pesticides, lipophilic hormones, lipophilic fungicides, lipophilic herbicides, and lipophilic fertilizers or other lipophilic nutrients that improve crop production.

Embodiment 63 is a method, treated edible agricultural product, kit, or treatment system of Embodiment 61, wherein the one or more treatment composition, prior to application to the agricultural product, includes at least some cyclodextrin that has been complexed with one or more agrochemical (e.g., an insecticide, pesticide, hormone, fungicide, or fertilizer that improves crop production).

Embodiment 64 is a method, treated edible agricultural product, kit, or treatment system of Embodiment 63, wherein the one or more treatment composition includes a molar excess of cyclodextrin relative to the one or more agrochemical, such as, for example, more than 1, more than 1.1, more than 1.2, more than 1.3, more than 1.5, more than 2, more than 3, more than 4, more than 5, more than 10, more than 20, more than 50, or more than 100 moles of cyclodextrin per mole of one or more agrochemical (e.g., lipophilic organic agrochemical).

Embodiment 65 is a method, treated edible agricultural product, kit, or treatment system of any of Embodiments 1 to 62, wherein the one or more treatment composition is not made using any agrochemicals.

Embodiment 66 is a method, treated edible agricultural product, kit, or treatment system of any of Embodiments 62 to 66, wherein the cyclodextrin comprises an alpha-cyclodextrin, a beta-cyclodextrin, a gamma-cyclodextrin, or a mixture thereof. In some embodiments, a mixture of different cyclodextrins may be desirable to provide a binding component capable of sequestering a broader range of compounds in wildfire smoke and/or sequestering a given compound with different kinetics.

Embodiment 67 is a method, treated edible agricultural product, kit, or treatment system of any of Embodiments 61 to 66, wherein the binding component comprises a modified cyclodextrin (e.g., an alkylated cyclodextrin, a hydroxyalkylated cyclodextrin, any of the other modifications disclosed herein, or a mixture thereof).

Embodiment 68 is a method, treated edible agricultural product, kit, or treatment system of any of Embodiments 61 to 67, wherein the cyclodextrin is present as one or more structural units of a polymer.

Embodiment 69 is a method, treated edible agricultural product, kit, or treatment system of any of Embodiments 61 to 68, wherein the cyclodextrin comprises a food-grade cyclodextrin (e.g., the CAVAMAX W6 Food, CAVAMAX W7 Food, or CAVAMAX W8 Food cyclodextrin products from Wacker-Chemie).

Embodiment 70 is a method, treated edible agricultural product, kit, or treatment system of any of Embodiments 51 to 69, wherein the binding component comprises a polymer.

Embodiment 71 is a method, treated edible agricultural product, kit, or treatment system of Embodiment 70, wherein the polymer includes a pyrrolidone group (e.g., present in a structural unit derived from a vinylpyrrolidone monomer such as, e.g., n-vinylpyrrolidone).

Embodiment 72 is a method, treated edible agricultural product, kit, or treatment system of 70 or 71, wherein the polymer comprises a polyvinylpolypyrrolidone (PVPP) or polyvinylpyrrolidone (PVP) polymer.

Embodiment 73 is a method, treated edible agricultural product, kit, or treatment system of any of Embodiments 51 to 72, wherein the binding component includes particles.

Embodiment 74 is a method, treated edible agricultural product, kit, or treatment system of Embodiment 73, wherein the particles are microporous particles.

Embodiment 75 is a method, treated edible agricultural product, kit, or treatment of Embodiment 73 or 74, wherein the particles have a D50 of less than about 50 microns, less than about 30 microns, less than about 20 microns, less than about 10 microns, less than about 5 microns, less than about 1 micron, less than about 0.5 micron, or less than about 0.3 microns.

Embodiment 76 is a method, treated edible agricultural product, kit, or treatment of Embodiment 73 or 74, wherein the particles have a D50 of greater than about 0.1 micron, greater than about 0.2 micron, greater than about 0.3 micron, greater than about 0.5 micron, greater than about 1 micron, greater than about 3 microns, or greater than about 5 microns.

Embodiment 77 is a method, treated edible agricultural product, kit, or treatment system of any of Embodiments 73 to 76, wherein the particles have a surface area that is greater than that of kaolinite (e.g., at least 5%, at least 10%, at least 20%, at least 50%, at least 100%, at least 200%, at least 300%, or at least 400% greater than kaolinite). To facilitate the comparison, the total surface area may be compared to kaolinite particles (e.g., kaolin particles) of a similar size.

Embodiment 78 is a method, treated edible agricultural product, kit, or treatment system of any of Embodiments 73 to 77, wherein the particles have an oil absorption of at least 30, at least 40, at least 50, at least 60, at least 70, at least 80, at least 90, or at least 100 grams of linseed oil per 100 grams of particles.

Embodiment 79 is a method, treated edible agricultural product, kit, or treatment system of any of Embodiments 73 to 78, wherein the particles have a surface area of at least about 200, at least about 300, at least about 400, preferably at least about 500, at least about 600, at least about 700, at least about 750, at least about 800, at least about 900, at least about 1,000, at least about 1,200, or at least 1,500 square meters per gram ($m^2/g$).

Embodiment 80 is a method, treated edible agricultural product, kit, or treatment system of any of Embodiments 73 to 79, wherein the particles include micropores, and wherein the total volume of micropores constitutes at least 10%, at least 15%, at least 20%, at least 25%, at least 30%, at least 35%, at least 40%, at least 45%, or at least 50% of the total pore volume of the particles.

Embodiment 81 is a method, treated edible agricultural product, kit, or treatment system of any of Embodiments 73 to 80, wherein the particles comprise carbonaceous particles, inorganic particles, organometallic particles, or a combination thereof, which may optionally be coated or encapsulated with one or more other materials (e.g., a cyclodextrin or another oligomer or polymer).

Embodiment 82 is a method, treated edible agricultural product, kit, or treatment system of Embodiment 81, wherein the particles comprise carbonaceous particles.

Embodiment 83 is a method, treated edible agricultural product, kit, or treatment system of Embodiment 82, wherein the particles comprise activated carbon particles.

Embodiment 84 is a method, treated edible agricultural product, kit, or treatment system of Embodiment 82 or 83, wherein the particles have a carbon tetrachloride activity of at least about 45, at least about 50, at least about 60, at least about 70, or at least about 80 (i.e., weight percent pickup of carbon tetrachloride).

Embodiment 85 is a method, treated edible agricultural product, kit, or treatment system of any of Embodiments 82 to 84, wherein the particles have an iodine number of at least about at least about 500, at least about 600, at least about 700, at least about 800, at least about 1,000, at least about 1250, at least about 1,500, at least about 1,750 or at least about 2,000 mg/g.

Embodiment 86 is a method, treated edible agricultural product, kit, or treatment system of any of Embodiments 81 to 85, wherein the particles comprise organometallic particles.

Embodiment 87 is a method, treated edible agricultural product, kit, or treatment system of Embodiment 86, wherein the particles comprise a metal-organic framework (MOF).

Embodiment 88 is a method, treated edible agricultural product, kit, or treatment system of any of Embodiments 81 to 87, wherein the particles comprise inorganic particles.

Embodiment 89 is a method, treated edible agricultural product, kit, or treatment system of Embodiment 88, wherein a feedstock material used to produce the inorganic particles is of volcanic origin.

Embodiment 90 is a method, treated edible agricultural product, kit, or treatment system of Embodiments 88 or 89, wherein the inorganic particles comprise a zeolite (e.g., a natural zeolite, a synthetic zeolite, or a mixture thereof), a clay mineral (preferably a smectite such as bentonite, montmorillonite, or a combination thereof), a diatomaceous earth (preferably from a deposit formed in a freshwater environment), a perlite, or a mixture thereof.

Embodiment 91 is a method, treated edible agricultural product, kit, or treatment system of any of Embodiments 71 to 90, wherein the particles comprise clay mineral particles.

Embodiment 92 is a method, treated edible agricultural product, kit, or treatment system of Embodiment 91, wherein the clay mineral is a swelling clay.

Embodiment 93 is a method, treated edible agricultural product, kit, or treatment system of Embodiments 91 or 92, wherein the clay mineral is classified as a 2:1 clay (i.e., two tetrahedral sheets for every one octahedral sheet).

Embodiment 94 is a method, treated edible agricultural product, kit, or treatment system of any of Embodiments 91 to 93, wherein the clay mineral comprises a smectite (e.g., montmorillonite), a vermiculite, a talc, or a combination thereof.

Embodiment 95 is a method, treated edible agricultural product, kit, or treatment system of any of Embodiments 51 to 94, wherein the binding component comprises one or more edible ingredients, and preferably the overall binding component is edible.

Embodiment 96 is a method, treated edible agricultural product, kit, or treatment system of any preceding embodiment, wherein the one or more treatment composition includes inorganic filler.

Embodiment 97 is a method, treated edible agricultural product, kit, or treatment system of Embodiment 96, wherein the inorganic filler comprises clay, a low-surface-area clay mineral (e.g. kaolin) and/or other low-surface-area mineral, a zinc oxide (or other suitable metallic oxide), or a combination thereof.

Embodiment 98 is a method, treated edible agricultural product, kit, or treatment system of Embodiments 96 or 97, wherein the inorganic filler is edible.

Embodiment 99 is a method, treated edible agricultural product, kit, or treatment system of any of Embodiments 96 to 98, wherein the inorganic filler comprises kaolin.

Embodiment 100 is a method, treated edible agricultural product, kit, or treatment system of any of Embodiment 51 to 99, wherein the binding component and/or the inorganic filler is negatively charged (e.g., a negatively charged clay colloid).

Embodiment 101 is a method, treated edible agricultural product, kit, or treatment system of any preceding embodiment, wherein the total amount of inorganic material present in the one or more treatment composition, based on the total amount of solids, is at least 10, at least 15, at least 20, at least 30, at least 40, at least 50, at least 60, at least 70, or at least 80 wt-%.

Embodiment 102 is a method, treated edible agricultural product, kit, or treatment system of any preceding embodiment, wherein the one or more treatment composition includes an anti-static agent (e.g., a surface-active quaternary compound), preferably in an efficacious amount to reduce the propensity of wildfire-derived particulates to deposit onto treated surfaces.

Embodiment 103 is a method, treated edible agricultural product, kit, or treatment system of any preceding embodiment, wherein the one or more treatment composition includes an antimicrobial preservative agent (preferably a food-grade such additive).

Embodiment 104 is a method, treated edible agricultural product, kit, or treatment system of any preceding embodiment, wherein the one or more treatment composition includes a metallic salt. While not intending to be bound by theory, certain metallic salts are able to bind sulfur-containing compounds (e.g., certain sulfides and mercaptans) that, for example, have molecular sizes too small to be effectively complexed with cyclodextrin.

Embodiment 105 is a method, treated edible agricultural product, kit, or treatment system of Embodiment 104, wherein the metallic salt comprises a water-soluble zinc salt (e.g., zinc chloride).

Embodiment 106 is a method, treated edible agricultural product, kit, or treatment system of any preceding embodiment, wherein the one or more treatment composition includes a water-soluble alkali metal carbonate and/or bicarbonate (e.g., sodium bicarbonate, potassium bicarbonate, potassium carbonate, sodium carbonate, and mixtures thereof). While not intending to be bound by theory, it is believed that such compounds can help protect against certain acid-type compounds which result from wildfire.

Embodiment 107 is a method, treated edible agricultural product, kit, or treatment system of any preceding embodiment, wherein at least 10%, at least 20%, at least 40%, at least 50%, at least 60%, at least 80%, at least 90%, at least 95%, at least 99%, or 100% of the carbon present in the organic component, the binder component, and/or the overall one or more treatment composition is bio-sourced carbon.

Embodiment 108 is a treated edible agricultural product or method of any preceding embodiment, wherein the agricultural product (e.g., grapes), after treatment, is still eligible for being labeled one or more, two or more, or all of: (i) organic (e.g., qualifies for use of the USDA organic seal), (ii) non-GMO, and (iii) vegan (e.g., fully complies with the 2020 certification standards of vegan.org for use of their trademarked "Certified Vegan" logo).

Embodiment 109 is a method, treated edible agricultural product, kit, or treatment system of any preceding embodiment, wherein the treatment is a mono-layer treatment (e.g., mono-layer coating).

Embodiment 110 is a method, treated edible agricultural product, kit, or treatment system of any preceding embodiment, wherein the treatment comprises a multi-layer treatment (e.g., a multi-layer coating with two or more compositionally different layers).

Embodiment 111 is a method, treated edible agricultural product, kit, or treatment system of Embodiment 110, wherein the top layer includes inorganic material (e.g., the top layer is formed from any of the treatment compositions recited in an earlier embodiment including an inorganic material).

Embodiment 112 is a method, treated edible agricultural product, or kit of Embodiment 111, wherein the top layer includes more inorganic material (by concentration) than the other one or more layers, which may optionally also include inorganic material.

Embodiment 113 is a method, treated edible agricultural product, or kit of any of Embodiments 110 to 112, wherein a first treatment is sprayed first and then a second treatment, and wherein the second treatment is optionally not applied until the first treatment has dried.

Embodiment 114 is a method of Embodiment 4 or the method, treated edible agricultural product, or kit of any of Embodiments 16 to 12, wherein the one or more treatment composition is applied on or after the onset of veraison, after veraison is complete, or both.

Embodiment 115 is a method of any preceding embodiment, wherein the one or more treatment composition is applied by a drone (e.g., an aerial or ground drone).

Embodiment 116 is a method of Embodiment 115, wherein the drone selectively sprays the agricultural product to be harvested (e.g., selectively sprays grape clusters).

Embodiment 117 is a method of any preceding embodiment, wherein the one or more treatment composition is applied via an installed spray or mist system (e.g., an installed such system in an orchard, vineyard, or agricultural field).

Embodiments 118 is a method or kit of any preceding embodiment, wherein the one or more treatment composition is applied (e.g., sprayed) in a vineyard, orchard, or other growing field in an amount of at least about 25, at least about 50, at least about 75, at least about 100, at least about 150, at least about 200, at least about 250, at least about 300, at least about 350, at least about 400, at least about 450, or at least about 500 gallons per acre. The aforementioned gallons are U.S. gallons which are equivalent to 3.785 liters. The aforementioned acre is U.S. acres which are equivalent to 0.405 hectares.

Embodiment 119 is a method or kit of any preceding embodiment, wherein the one or more treatment composition is applied (e.g., sprayed) in a vineyard, orchard, or other growing field in an amount of less than about 2,000, less than about 1,500, less than about 1,200, less than about 1,000, less than about 800, less than about 700, less than about 600, less than about 500, less than about 400, less than about 300, less than about 200, or less than about 100 gallons per acre.

Embodiment 120 is a method, treated edible agricultural product, or kit of any preceding embodiment, wherein the treated agricultural product comprises treated wine grapes that were exposed to wildfire smoke.

Embodiment 121 is a treated agricultural product (e.g., wine grapes) resulting from the method of any of Embodiments 1, 2, or 8 to 120.

Embodiment 122 is a method of any of Embodiments 1 to 3 or 8 to 121, wherein the treated product comprises treated wine grapes, and wherein the treated wine grapes are processed into wine (e.g., red wine).

Embodiment 123 is a treated edible agricultural product or method of Embodiment 122, wherein the wine (e.g., red wine) exhibits either no smoke taint or substantially reduced smoke taint (e.g., as compared to control wine made from otherwise identical untreated control wine grapes subjected to the same wildfire smoke conditions).

Embodiment 124 is a method of Embodiment 3 and any embodiment from Embodiment 8 to Embodiment 123 that refers back directly or indirectly to a method of Embodiment 3, wherein causing the one or more treatment composition to be applied to the edible agricultural product comprises marketing the composition for such end use.

Embodiment 125 is a method of Embodiment 124, wherein the one or more treatment composition is marketed as a treatment for protecting the agricultural products (e.g., wine grapes and/or hops) from wildfire smoke.

Embodiment 126 is a method of embodiment 125, wherein the one or more treatment composition is marketed for protecting wine grapes, or wine resulting from the wine grapes, from smoke taint.

Embodiment 127 is a method of Embodiment 3 and any embodiment from Embodiment 8 to Embodiment 126 that refers back directly or indirectly to a method of Embodiment 3, wherein causing the one or more treatment composition to be applied to the agricultural product comprises providing instructions for such end use.

Embodiment 128 is a method, treated edible agricultural product, or kit of any preceding embodiment, wherein the one or more treatment composition to protect against wildfire smoke is a combination treatment for one or more additional conditions (e.g., anti-sunburn treatment, anti-cracking treatment, anti-fungal treatment, insecticide, and/or other pest treatment).

Embodiment 129 is a method of any preceding embodiment, further comprising:
receiving, via a communication network, information relating to wildfire smoke.

Embodiment 130 is a method of Embodiment 129, further comprising:
transmitting, via the same or a different communication network, one or more of: a type of agricultural product (e.g., a type of wine grape), a type of processed agricultural product to be made from the agricultural product (e.g., red wine, white wine, sparking wine, rose wine, etc.), or location information (e.g., a street address, GPS coordinates, an IP address, a cell phone tower location, etc.) associated with the agricultural product.

Embodiment 131 is a method of Embodiment 129 or 130, wherein the information relating to wildfire smoke comprises one or more of (i) a risk of smoke exposure for a geographical location encompassing where the agricultural product is located or (ii) a risk of smoke taint for the agricultural product.

Embodiment 132 is a method of any of Embodiments 129 to 131, wherein the information relating to wildfire smoke comprises a treatment recommendation or instruction (e.g., type and/or timing of treatment).

Embodiment 133 is a method of any of Embodiments 129 to 132, wherein the agricultural product (e.g., wine grapes) is treated based on the information relating to wildfire smoke.

Embodiment 134 is a method of Embodiment 4 or any preceding embodiment further comprising, during or after crushing the wine grapes (e.g., during or after primary fermentation), removing at least some (e.g., via filtering, settling, or other separation process) at least some, substantially all, or all, of the surface-deposited treatment.

Embodiment 135 is the wine resulting from the method of Embodiment 134.

Embodiment 136 is the one or more treatment composition of any preceding embodiment.

Embodiment 137 is the kit of Embodiment 6, wherein the one or more liquid treatment composition is sprayable and the kit includes instructions for spray applying to wine grapes prior to harvest.

Embodiment 138 is the kit of Embodiments 6, 137, or any other kit referred to directly or indirectly in the preceding embodiments, wherein the instructions for preparing the one or more treatment compositions includes instructions to combine the concentrate with water in a mixing ratio in the range of 1:1 to 1000:1, preferably 5:1 to 500:1, more preferably 10:1 to 100:1 (water:concentrate).

Embodiment 139 is a method for determining treatment application data via blockchain, the method comprising:
storing, in a memory of a processing server, a blockchain comprised of a plurality of blocks, wherein each block is comprised of at least a block header and a plurality of transaction values, each block header including at least a wildfire location;
receiving, by a receiving device of the processing server, a wildfire proximity notification from one or more computing devices, wherein each wildfire proximity notification includes at least an agricultural field identifier and availability data;
generating, by a generation module of the processing server, a new transaction value, wherein the new transaction value includes at least the agricultural field identifier and availability data included in the received wildfire proximity notifications;
generating, by the generation module of the processing server, a new block header, wherein the new block header includes at least: i) a wildfire proximity, ii) a reference hash value generated via hashing of the block header included in a most recent block identified via the wildfire proximity included in the block header, and iii) a transaction hash value generated via hashing of at least the new transaction value;
generating, by the generation module of the processing server, a new block comprised of at least the new block header and the new transaction value; and electronically transmitting, by a transmitting device of the processing server, at least the generated new block to a node of a blockchain network causing the blockchain network to add the generated new block to the blockchain.

Embodiment 140 is the method of Embodiment 139, wherein the wildfire proximity data includes at least one of: an indication of requiring a treatment application.

Embodiment 141 is the method of Embodiments 140, wherein the indication of requiring a treatment application triggers insurance instructions.

Embodiment 142 is the method of Embodiment 141, wherein the insurance instructions comprise actions related to protecting the crops from wildfire smoke, including calculating the area to be treated, crops to be treated, treatment to be ordered, application processes followed, amounts applied, if a certified and trained application company was used, and/or time of treatment application and removal.

Embodiment 143 is a method for determining crop pesticide or fertilizer application data via blockchain, comprising:
 storing, in a memory of a processing server, a blockchain comprised of a plurality of blocks, wherein each block is comprised of at least a block header and a plurality of transaction values, each block header including at least a weather forecast of crop pest update; receiving, by a receiving device of the processing server, a weather forecast of crop pest update notification from one or more computing devices, wherein each weather forecast of crop pest update notification includes at least an agricultural field identifier and availability data;
 generating, by a generation module of the processing server, a new transaction value, wherein the new transaction value includes at least the agricultural field identifier and availability data included in the received weather forecast of crop pest update notifications;
 generating, by the generation module of the processing server, a new block header, wherein the new block header includes at least: i) a weather forecast of crop pest update, ii) a reference hash value generated via hashing of the block header included in a most recent block identified via the weather forecast of crop pest update notification included in the block header, and iii) a transaction hash value generated via hashing of at least the new transaction value; generating, by the generation module of the processing server, a new block comprised of at least the new block header and the new transaction value; and
 electronically transmitting, by a transmitting device of the processing server, at least the generated new block to a node of a blockchain network causing the blockchain network to add the generated new block to the blockchain.

Embodiment 144 is the method of Embodiment 142, wherein the crop pesticide or fertilizer application data includes at least one of: an indication of requiring one or more applications of fertilizer or pesticide.

Embodiment 145 is the method of Embodiment 144, wherein the indication of requiring one or more applications of fertilizer or pesticide comprises calculating the area to receive one or more applications of fertilizer or pesticide, crops to receive one or more applications, fertilizer or pesticide to be ordered, application processes followed, amounts applied, and/or time of application.

Embodiment 146 is the method of any of Embodiments 139 to 145, wherein cryptographically signed data determines when one or more of an application of a smoke taint inhibition treatment, fertilizer, or pesticide is to be applied as required in a contract, such as for example a crop insurance contract.

Embodiment 147 is the method of embodiment 146, wherein the determined data for an application is based upon machine learning or artificial intelligence.

EXAMPLES

These Examples are merely for illustrative purposes and are not meant to be overly limiting on the scope of the appended embodiments. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the embodiments, each numerical parameter should at least be construed in light of the number of reported significant digits and by applying ordinary rounding techniques.

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Missouri, or may be synthesized by conventional methods. The following abbreviations may be used in the following examples: RPM=revolutions per minute, ppm=parts per million; mL or ml=milliliter; L=liter; μl=microliter, m=meter, mm=millimeter, cm=centimeter, μm=micrometer, kg=kilogram, g=gram, min=minute, s=second, hrs=hour, °C.=degrees Celsius, CD=cyclodextrin.

Below is a listing of materials that were used in this Example section.

| Material List | | | |
|---|---|---|---|
| Name | CAS # | Supplier | Supplier Location |
| Guaiacol | 90-05-1 | TCI | 9211 N. Harborgate St. Portland, Oregon 97203 |
| 4-methyl guaiacol | 93-51-6 | TCI | 9211 N. Harborgate St. Portland, Oregon 97203 |
| 4-ethylphenol | 123-07-9 | TCI | 9211 N. Harborgate St. Portland, Oregon 97203 |
| 4-ethylguaiacol | 2785-89-9 | TCI | 9211 N. Harborgate St. Portland, Oregon 97203 |

-continued

Material List

| Name | CAS # | Supplier | Supplier Location |
| --- | --- | --- | --- |
| CAVAMAX W7 (FOOD) Beta-CD | 7585-39-9 | Wacker | 3301 Sutton Road Adrian, Michigan 49221 |
| CAVAMAX W6 (FOOD) Alpha-CD | 10016-20-3 | Wacker | 3301 Sutton Road Adrian, Michigan 49221 |
| CAVAMAX W8 (FOOD) Gamma-CD | 17465-86-0 | Wacker | 3301 Sutton Road Adrian, Michigan 49221 |
| Activated charcoal CP particles | 7440-44-00 | Calgon Carbon Corporation | 3000 GSK Dr. Moon Township, Pennsylvania 15108 |
| Coconut-based activated charcoal WCP particles | 7440-44-00 | Calgon Carbon Corporation | 3000 GSK Dr. Moon Township, Pennsylvania 15108 |

Cyclodextrin Phenol Capture Test:

The test was run in a sealed system with 0.2 ml of a given neat phenol (i.e., guaiacol, 4-methylguaiacol, 4-ethylguaiacol, or 4-ethylphenol) placed on the bottom of a 75 ml glass jar with a syringe. 0.4 grams of a given cyclodextrin (i.e., alpha-cyclodextrin, beta-cyclodextrin, or gamma-cyclodextrin) was placed in an aluminum tray. Each cyclodextrin sample was arranged in the tray such that each cyclodextrin run covered a similar amount of area of the aluminum tray and with a similar sample thickness. Aluminum foil was placed on the bottom of the jar and the tray was placed on top of the foil. The foil serves as a barrier between the tray and phenol to prevent contact between the liquid phenol and the tray, while still allowing the phenol to readily volatilize and enter the headspace of the jar. The mouth of the glass jar was then sealed with parafilm.

The sealed jar was placed in a 60° C. oven (LDF series bench top oven) for 180 minutes to volatilize a portion of the phenol. Small amounts of residual phenol could still be seen on the bottom of the jar after 180 minutes. The jar was then removed from the oven and cooled to room temperature. The cyclodextrin was removed from the jar and placed in a 40 ml glass vial (typically 3.95-4.00 grams of sample was recovered from the tray). 10 ml of THF was added to the vial as a solvent to extract the phenol. 10 μl of EGDE (ethylene glycol diethyl-ether) served as an internal standard for gas chromatography in accordance with ASTM: D6886-18. A magnetic stir bar was added to the vial and the vial was heated to 70° C. and stirred at 270 RPM for 90 minutes to release captured phenol from the cyclodextrin into the solvent. The vial was placed in a fume hood to equilibrate with room temperature for 10 minutes and immediately (within less than 5 minutes) filtered through an iPure PES 0.5 μm pore size syringe filter. If cooling and filtering does not occur in a timely manner, the phenol may be recaptured by the cyclodextrin. GC/MS measurements were tested on a GC/MS system (Agilent, 7890B model number), with a direct inject methodology. GC/MS test parameters were as follows: the equilibrium time was 0.25 minutes; the initial temperature was 50° C. and was held for 5 minutes; followed by a ramp at 20° C./min to a temperature of 250° C. and a held for 6 minutes; then heated at a rate of 30° C./min to 300° C. and held for 8.333 minutes; helium was used as the carrier gas at a flow rate of 30 ml/min.

Experiment 1

Guaiacol was tested with alpha-cyclodextrin, beta-cyclodextrin, or gamma-cyclodextrin via the phenol test procedure above to confirm that each cyclodextrins can capture guaiacol.

Control. Direct inject of guaiacol to confirm retention time

Run 1A. Guaiacol was used as the phenol with alpha-cyclodextrin

Run 1B. Guaiacol was used as the phenol with beta-cyclodextrin

Run 1C. Guaiacol was used as the phenol with gamma-cyclodextrin

Experiment 2

4-methylguaiacol was tested with alpha-cyclodextrin, beta-cyclodextrin, or gamma-cyclodextrin via the phenol test procedure above to confirm that each cyclodextrin can capture 4-methylguaiacol.

Control. Direct inject of 4-methylguaiacol to confirm retention time

Run 2A. 4-methylguaiacol was used as the phenol with alpha-cyclodextrin

Run 2B. 4-methylguaiacol was used as the phenol with beta-cyclodextrin

Run 2C. 4-methylguaiacol was used as the phenol with gamma-cyclodextrin

Experiment 3

4-ethylguaiacol was tested with alpha-cyclodextrin, beta-cyclodextrin, or gamma-cyclodextrin via the phenol test procedure above to confirm that each cyclodextrin can capture 4-ethylguaiacol.

Control. Direct inject of 4-ethylguaiacol to confirm retention time

Run 3A. 4-ethylguaiacol was used as the phenol with alpha-cyclodextrin

Run 3B. 4-ethylguaiacol was used as the phenol with beta-cyclodextrin

Run 3C. 4-ethylguaiacol was used as the phenol with gamma-cyclodextrin

Experiment 4

4-ethylphenol was tested with alpha-cyclodextrin, beta-cyclodextrin, or gamma-cyclodextrin via the phenol test procedure above to confirm that each cyclodextrin can capture 4-ethylphenol.

Control. Direct inject of 4-ethylphenol to confirm retention time

Run 4A. 4-ethylphenol was used as the phenol with alpha-cyclodextrin

Run 4B. 4-ethylphenol was used as the phenol with beta-cyclodextrin

Run 4C. 4-ethylphenol was used as the phenol with gamma-cyclodextrin

Results from Experiments 1-4 shown in Table 1 show phenol was detected in all samples and confirms all cyclodextrins can capture the volatile phenols present in wildfire smoke.

TABLE 1

| Run # | Capture agent | Phenol | Phenol retention time (min) | Phenol peak height | Phenol peak area |
|---|---|---|---|---|---|
| Control | Blank | guaiacol | 12 | 1407024 | 20678215 |
| 1A | Alpha-CD | guaiacol | 12 | 38006 | 561381 |
| 1B | Beta-CD | guaiacol | 12 | 59357 | 931948 |
| 1C | Gamma-CD | guaiacol | 12 | 541911 | 7931500 |
| Control | Blank | 4-methyl guaiacol | 12.87 | 19937393 | 38116955 |
| 2A | Alpha-CD | 4-methylguaiacol | 12.87 | 18352 | 321414 |
| 2B | Beta-CD | 4-methylguaiacol | 12.87 | 24616 | 435165 |
| 2C | Gamma-CD | 4-methylguaiacol | 12.87 | 83921 | 1420840 |
| Control | Blank | 4-ethylguaiacol | 13.54 | 2359703 | 33912874 |
| 3A | Alpha-CD | 4-ethylguaiacol | 13.54 | 23727 | 431241 |
| 3B | Beta-CD | 4-ethylguaiacol | 13.54 | 18418 | 318387 |
| 3C | Gamma-CD | 4-ethylguaiacol | 13.54 | 40944 | 686553 |
| Control | Blank | 4-ethylpheol | 12.55 | 2319524 | 33561681 |
| 4A | Alpha-CD | 4-ethylphenol | 12.55 | 34972 | 642762 |
| 4B | Beta-CD | 4-ethylphenol | 12.55 | 198564 | 3348360 |
| 4C | Gamma-CD | 4-ethylphenol | 12.55 | 153435 | 2607792 |

Experiment 5

To confirm the phenols were not just adsorbed on the exterior surface of the cyclodextrin, guaiacol was tested with beta-cyclodextrin, except instead of heating the THF, the solvent mixture was held at room temperature in a sealed 40 ml glass vial for about 12 hours. Upon analysis by GC-MS, no guaiacol was detected, confirming guaiacol is not simply adsorbed on the exterior surface, but rather captured in the cavity of beta-cyclodextrin via non-covalent Interactions requiring heating of the THF to force extraction.

Experiment 6

Guaiacol was tested with activated charcoals as capture agents using the same procedure noted above for cyclodextrin. Although activated charcoal and other solid particle organic and inorganics on their own do not do well as capture agents in a treatment, as they are difficult to disperse in water and have to stick to a crop, porous inorganics will provide added benefit in a treatment, with an organic binder. Porous organics and inorganics can act as a capture agent, as well as a barrier. The activated charcoals tested were activated charcoal CP and coconut based activated charcoal WPC. In all runs, guaiacol was detected, confirming porous organics and inorganics may be used as capture agents.

Experiment 7

Fourier transform infrared spectroscopy (FTIR) was also used to confirm beta-cyclodextrin can capture guaiacol. FTIR analysis was performed via transmission FTIR to confirm cyclodextrin can adsorb volatile phenols. All FTIR measurements were taken on a Thermo Scientific Nicolet iS10 with DTGS KBr bream detector and a KBr beam splitter. Each spectrum consists of 32 scans with 4.0 resolution.

Samples were prepared in a sealed system with 2 ml of guaiacol separated from 1 gram of beta-cyclodextrin. The sealed system was placed in a 60° C. oven (LDF series bench top oven) for 180 minutes to volatilize the phenol. The jar was then removed from the oven and cooled to room temperature. The cyclodextrin was removed from the jar and placed in a 40 ml glass vial (typically 3.95-4.00 grams of sample was recovered from the tray). 10 ml of THF was added to the vial as a solvent to extract the phenol. A magnetic stir bar was added to the vial and the vial was sealed. The vial was held a room temperature and stirred at 270 RPM for 20 minutes and then filtered through a iPure PES 0.5 μm pore size syringe filter. A few drops of the solution were placed on a Potassium Bromide (KBr) 10×10×5 mm crystal and analyzed by FTIR. The vial was resealed and heated to 90° C. and stirred at 270 RPM for 90 minutes to release the captured phenol from the cyclodextrin into the solvent. The vial was placed in a fume hood to equilibrate with room temperature for 10 minutes and immediately (less than 5 minutes) filtered through a iPure PES 0.5 μm pore size syringe filter. A few drops of the solution of the post heated sample were placed on the cleaned KBr crystal and FTIR analysis performed in the same manner as the sample that was not heat treated. Phenol capture by beta-cyclodextrin was confirmed by assessment on the broad ~3300-3600 cm−1 region, which is characteristic of the hydroxyl —OH in guaiacol's structure and the 1595 cm−1 and 1498 cm−1 bands of the spectrum, which are characteristic of the benzene ring in guaiacol. To confirm beta-cyclodextrin is capturing phenol, samples were analyzed before and after heat treatment. The FTIR spectrum of the sample tested before heat treatment, showed no broad band or peak at ~3500 cm−1, nor 1595 cm−1, and a very small peak at 1498 cm−1. This confirms guaiacol is not simply adsorbed on the exterior surface, but rather capture in the cyclodextrin cavity via non-covalent interactions requiring heating of the THF to force extraction. After heat treatment, where THF could extract guaiacol from the beta-cyclodextrin, the spectrum had a broad band ~3500 cm−1 and bands clearly present at 1595 cm−1 and 1498 cm−1, confirming the presence of guaiacol and that cyclodextrin does internally adsorb phenols.

Experiment 8: Coating Examples

Films of aqueous coating compositions composed of beta-cyclodextrin (B-CD) and carboxymethyl-cellulose (CMC) in water were evaluated for their propensity to adsorb guaiacol vapor. CMC served as a coating binder while B-CD served as a functional additive to adsorb guaiacol vapor. The coating compositions were made with either a weight ratio of 2:1 or 1:1 CMC to B-CD. Three films were prepared in total, two with a ratio of 2:1 and one with a ratio of 1:1. The 1:1 ratio film outperformed both of the 2:1 films as a guaiacol adsorbent but showed worse film properties when compared to the 2:1 films.

Three aqueous coating compositions were prepared as described in Table 2 below. All coating compositions were prepared in 200 ml glass jars. The solids were dissolved by lightly heating the water to about 40° C. and stirring with a magnetic stir-bar for 20 minutes.

TABLE 2

| Run Number | Solids in Water | Ratio of CMC:B-CD |
|---|---|---|
| Run 1 | 5% | 2:1 |
| Run 2 | 3% | 2:1 |
| Run 3 | 3% | 1:1 |

The coating compositions were prepared into hardened films before being exposed to guaiacol vapors by filling three aluminum weigh trays with each of the coating compositions. The weigh trays were then placed in a 60° C. oven for 6 hours to remove the water. Each dried film was then exposed to guaiacol vapors following the same procedure outlined in the cyclodextrin phenol capture test.

The weight of guaiacol captured by each sample of film was determined via GCMS analysis while taking into account the mass of the film sample and proportion of B-CD to CMC. The results of the analysis are reported below in Table 3.

TABLE 3

| Run Number | mg of Guaiacol Adsorbed | Grams of B-CD | mg of Guaiacol Adsorbed Per Gram of B-CD |
|---|---|---|---|
| Run 1 | 0.036279618 | 0.0838 | 0.4329 |
| Run 2 | 0.028177816 | 0.07377 | 0.3820 |
| Run 3 | 0.062833876 | 0.11065 | 0.5679 |

The results in the above Table 3 show that the amount of guaiacol adsorbed correlates with the amount of B-CD in the system. Inspection of the films showed that the 1:1 film was more brittle and had visual domains of B-CD present when compared to the 2:1 film. However, the coating with a 1:1 ratio, did form a film and, even with the visible domains, would work to protect a substrate from smoke taint. It is believe that the film performance of the 1:1 film can be improved upon via further formulation such as, for example, the selection of a CMC grade that is more compatible with B-CD and/or the use of one or more formulation additives such as a compatibilizer, a plasticizer, or other of the formulation additives disclosed herein. The films from Runs 1 and 2 (2:1 films) were uniform in appearance and undistinguishable as dried films.

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A method of treating an edible agricultural product to protect against compounds present in wildfire smoke, the method comprising:
   prior to harvest of the edible agricultural product, spray applying one or more liquid treatment composition that includes at least 0.05 wt-% and less than 30 wt-% of total solids, based on the total weight of the one or more liquid treatment composition, to an exterior surface of the agricultural product, wherein the applied one or more liquid treatment composition, when dry, forms a surface-deposited protective treatment, wherein the applied one or more liquid treatment composition includes:
      at least 0.05 wt-% and less than 30 wt-%, based on the total weight of the one or more liquid treatment composition, of a binding component comprising a cyclic oligosaccharide, wherein the cyclic oligosaccharide comprises a cyclodextrin; and
      at least 0.05 wt-% and less than 30 wt-%, based on the total weight of the one or more liquid treatment composition, of a non-volatile organic component comprising a saccharide component and
   after the wildfire smoke has subsided, or after the agricultural product has been harvested, optionally washing the treated agricultural product and/or otherwise removing residual surface-deposited treatment;
   wherein the edible agricultural product comprises wine grapes.

2. The method of claim 1, wherein the wine grapes comprise Cabernet Franc, Cabernet Sauvignon, Chardonnay, Grenache, Malbec, Merlot, Montepulciano, Petite Sirah, Pinot Gris, Pinot Noir, Sangiovese, Sauvignon Blanc, Syrah, Tempranillo, or Zinfandel.

3. The method of claim 1, wherein the binding component comprising a cyclic oligosaccharide binds one or both of guaiacol or 4-methyl guaiacol in an amount at least about as great as native alpha-cyclodextrin on a per gram basis of the ingredient, wherein the ingredient is present in dry form and the guaiacol or 4-methyl guaiacol is present in vapor form.

4. The method of claim 1, wherein the binding component comprising a cyclic oligosaccharide binds one or both of guaiacol or 4-methyl guaiacol in an amount at least about as great as native beta-cyclodextrin on a per gram basis of the ingredient, wherein the ingredient is present in dry form and the guaiacol or 4-methyl guaiacol is present in vapor form.

5. The method of claim 1, wherein the binding component comprising a cyclic oligosaccharide binds one or both of guaiacol or 4-methylguiacol in an amount of at least about 5 milligrams per gram of the ingredient, wherein the ingredient is present in dry form and the guaiacol or 4-methyl guaiacol is present in vapor form.

6. The method of claim 1, wherein the cyclic oligosaccharide comprising the cyclodextrin is present in the one or more liquid treatment composition in an amount of at least 0.1 wt-% and less than 30 wt-%.

7. The method of claim 1, wherein the cyclic oligosaccharide comprises two or more different cyclodextrins.

8. The method of claim 1, wherein the treatment composition further includes particles, which may optionally be filler.

9. The method of claim 8, wherein the binding component includes the particles.

10. The method of claim 9, wherein the particles have a surface area that is greater than that of kaolinite.

11. The method of claim 9, wherein the particles have a surface area of at least about 200 square meters per gram (m2/g) and a D50 of less than about 20 microns.

12. The method of claim 9, wherein the particles include micropores, and wherein the total volume of micropores constitutes at least 10% of the total pore volume of the particles.

13. The method of claim 9, wherein the particles have an oil absorption of at least 50 grams of linseed oil per 100 grams of the particles.

14. The method of claim 10, wherein the particle comprise inorganic particles selected from one or more of a zeolite, a clay mineral, a diatomaceous earth, or a combination thereof.

15. The method of claim 9, wherein the particles comprise carbonaceous particles, and wherein the carbonaceous particles have one or both of (i) an iodine number of at least about 500 mg/g or (ii) a carbon tetrachloride activity of at least about 45.

16. The method of claim 8, wherein the particles comprise clay mineral particles, wherein the clay mineral particles comprise a clay mineral classified as a 2:1 clay.

17. The method of claim 1, wherein the binding component and the non-volatile organic component are different.

18. The method of claim 1, wherein the non-volatile organic component comprising a saccharide component is present in the one or more liquid treatment composition in an amount of least 0.1 wt-% and less than 30 wt-%, and wherein the saccharide component includes a polysaccharide.

19. The method of claim 1, wherein the saccharide component comprises pectin, agarose, agaropectin, alginate, carrageenan, arabinoxylan, chitosan, *psyllium*, carboxy methyl cellulose, hyaluronic acid, dextrin, starch, salts or derivatives thereof, or a mixture thereof.

20. The method of claim 1, wherein the one or more liquid treatment composition further includes an agrochemical.

21. The method of claim 20, wherein the agrochemical comprises a fungicide.

22. The method of claim 1, wherein two or more chemically different liquid coating treatments are applied to form a hardened multi-layer surface-deposited protective treatment.

23. The method of claim 1, the method further comprising after the wildfire smoke taint risk has subsided, or after the wine grapes have been harvested, washing the treated wine grapes to remove residual surface-deposited treatment.

24. The method of claim 23, wherein the wine grapes are washed with an aqueous wash that includes water and one or more of (i) organic solvent to facilitate removal of the surface-deposited treatment, (ii) a cleaning agent, or (iii) other solute to avoid swelling of the wine grape.

25. An edible agricultural product comprising wine grapes treated by the method of claim 1.

26. A kit comprising:
one or more concentrates for combining with water to form one or more liquid treatment composition, wherein the one or more concentrates includes:
a binding component comprising a cyclic oligosaccharide, wherein the cyclic oligosaccharide comprises a cyclodextrin; and
a non-volatile organic component comprising a saccharide component and
instructions for preparing the one or more liquid treatment composition that includes at least 0.05 wt-% and less than 30 wt-% of the binding component and at least 0.05 wt-% and less than 30 wt-% of the non-volatile organic component, and spray applying the one or more treatment composition to wine grapes to protect against compounds present in wildfire smoke.

* * * * *